United States Patent [19]
Drake

[11] 4,024,371
[45] May 17, 1977

[54] WELDING MONITORING AND CONTROL SYSTEM

[75] Inventor: Charles J. Drake, Detroit, Mich.
[73] Assignee: Kelsey-Hayes Company, Romulus, Mich.
[22] Filed: Dec. 18, 1974
[21] Appl. No.: 534,342
[52] U.S. Cl. .................. 219/110; 235/151.1
[51] Int. Cl.² ........................ B23K 11/24
[58] Field of Search ........... 219/110, 108, 111; 235/151.1, 151.31; 324/65 R

[56] References Cited
UNITED STATES PATENTS

| | | | |
|---|---|---|---|
| 2,848,595 | 8/1968 | Van Sciver | 219/108 |
| 3,267,434 | 8/1966 | Clark et al. | 235/151.1 |
| 3,569,785 | 3/1971 | Durbeck et al. | 235/151.31 |
| 3,588,438 | 6/1971 | Vanderheist | 219/110 |
| 3,824,533 | 7/1974 | Adamson | 235/151.3 |
| 3,888,405 | 6/1975 | Jones et al. | 235/151.1 |

Primary Examiner—J. V. Truhe
Assistant Examiner—Clifford C. Shaw
Attorney, Agent, or Firm—Harness, Dickey & Pierce

[57] ABSTRACT

A monitoring and control system for use in conjunction with a pulsation type welder which utilizes a computer to calculate the impedance characteristics of a weld and compare these characteristics to a preselected set of characteristics to determine if a quality weld has been made. The system then controls the heat and cool time to increase or decrease the temperature of the weld and thus control the size of the weld nugget. The monitoring control system is utilized in conjunction with a standard pulsation welding control system, which standard system provides a series of heat impulses each followed by a cool interval, this cycle being repeated for a preselected number of cycles. The monitoring and control system senses the voltage and current in the welding load and feeds this data to a computer which, in turn, calculates the impedance of the weld. This calculation is then compared to a predetermined set of standards which are evolved as a result of processing a preselected number of previous welds, and corrections are made to assure the weld quality. If the weld is not developing sufficiently, the number of cycles in the cool portion of the impulse, and thus, the cool time, is reduced until the weld meets the set standards. On the other hand, if the weld exceeds the standard, the number of heat cycles, and thus the heat time, is reduced.

18 Claims, 32 Drawing Figures

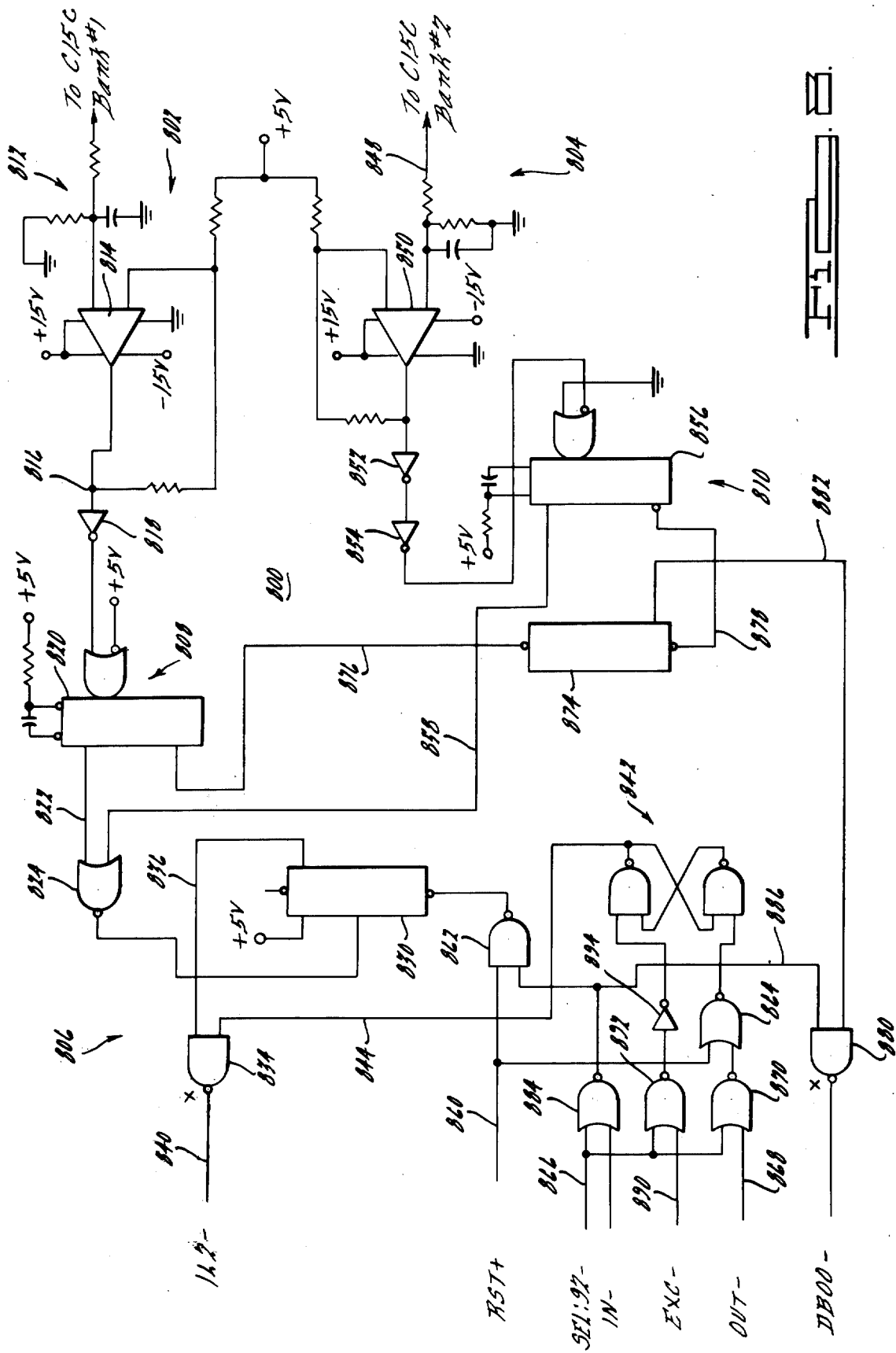

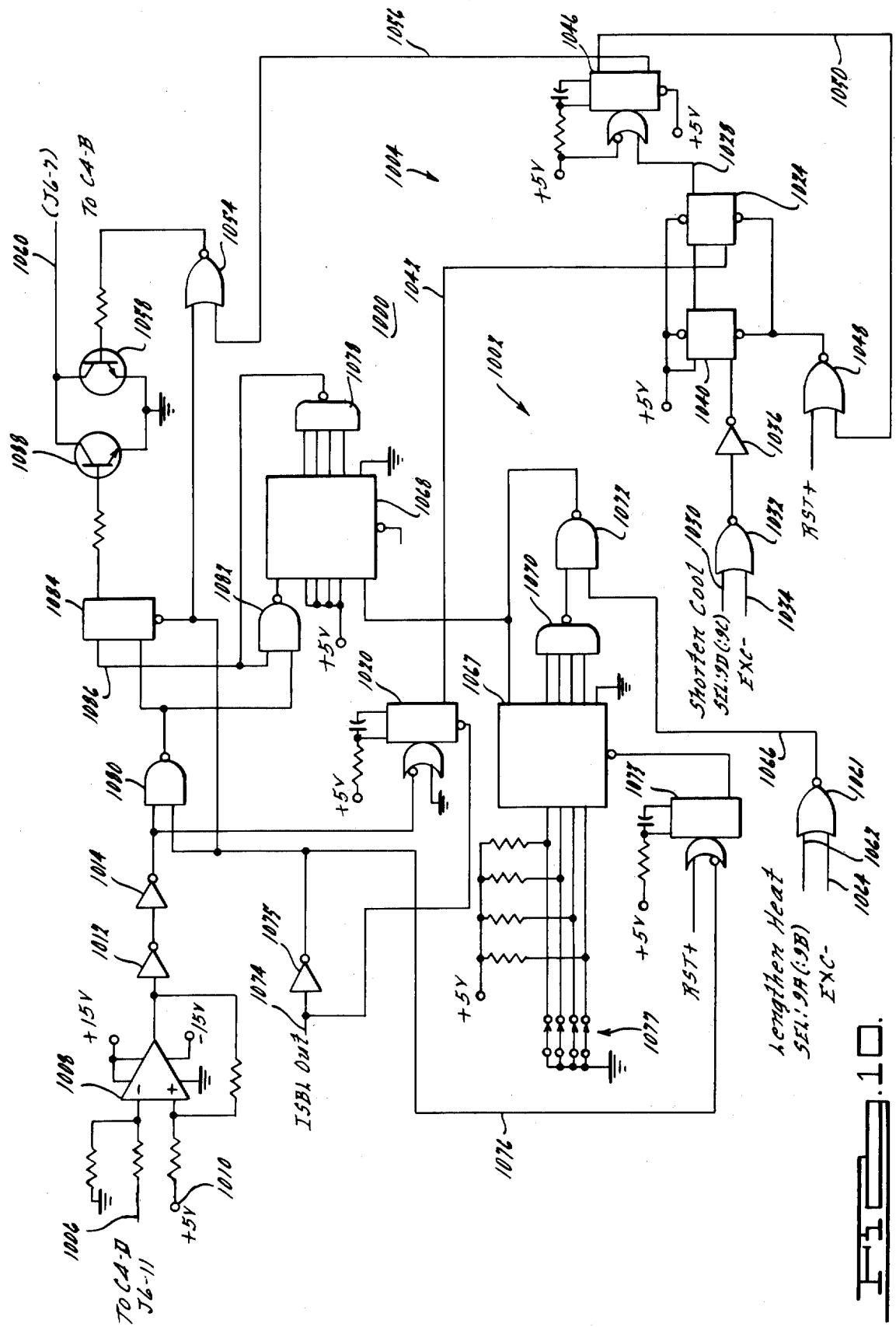

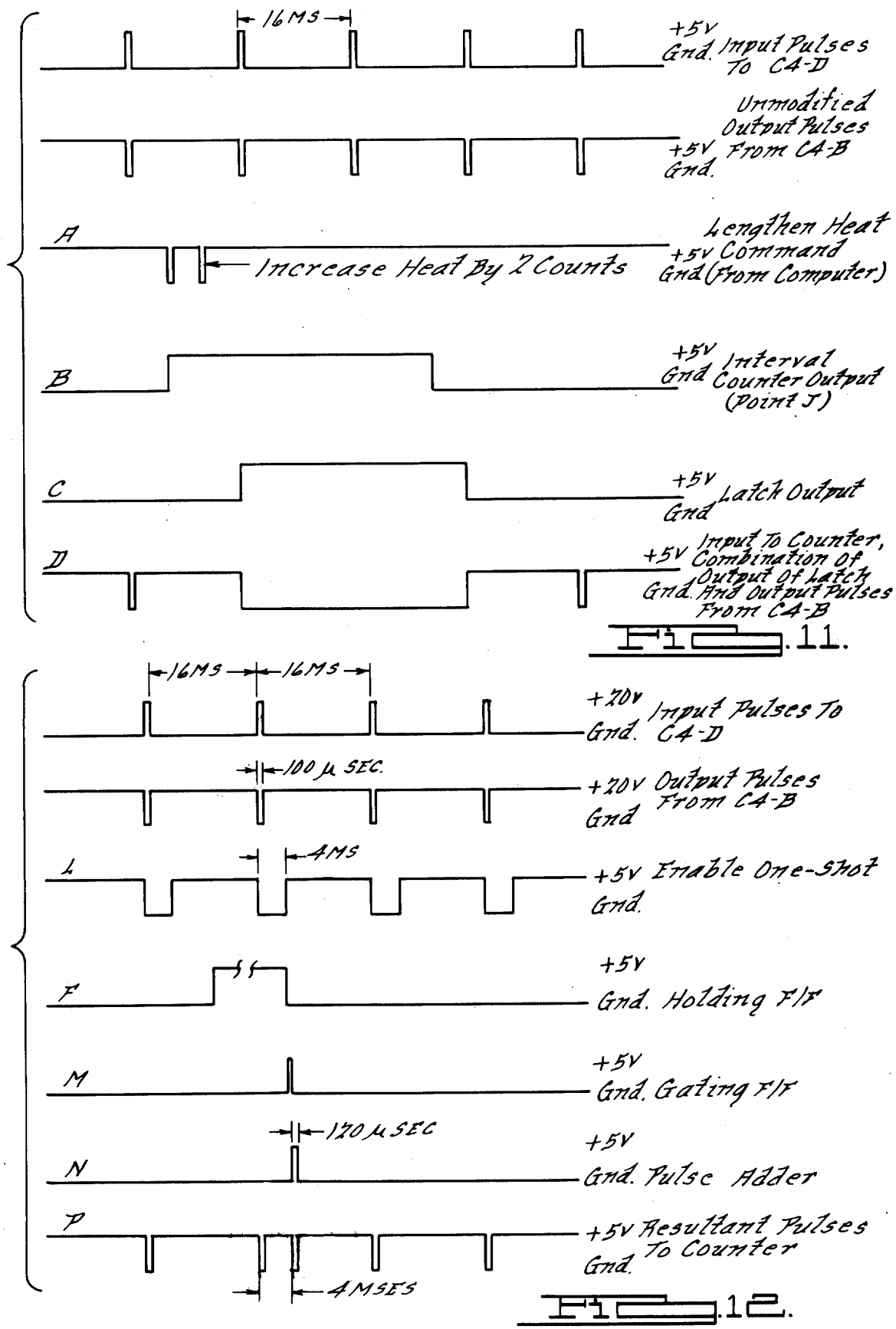

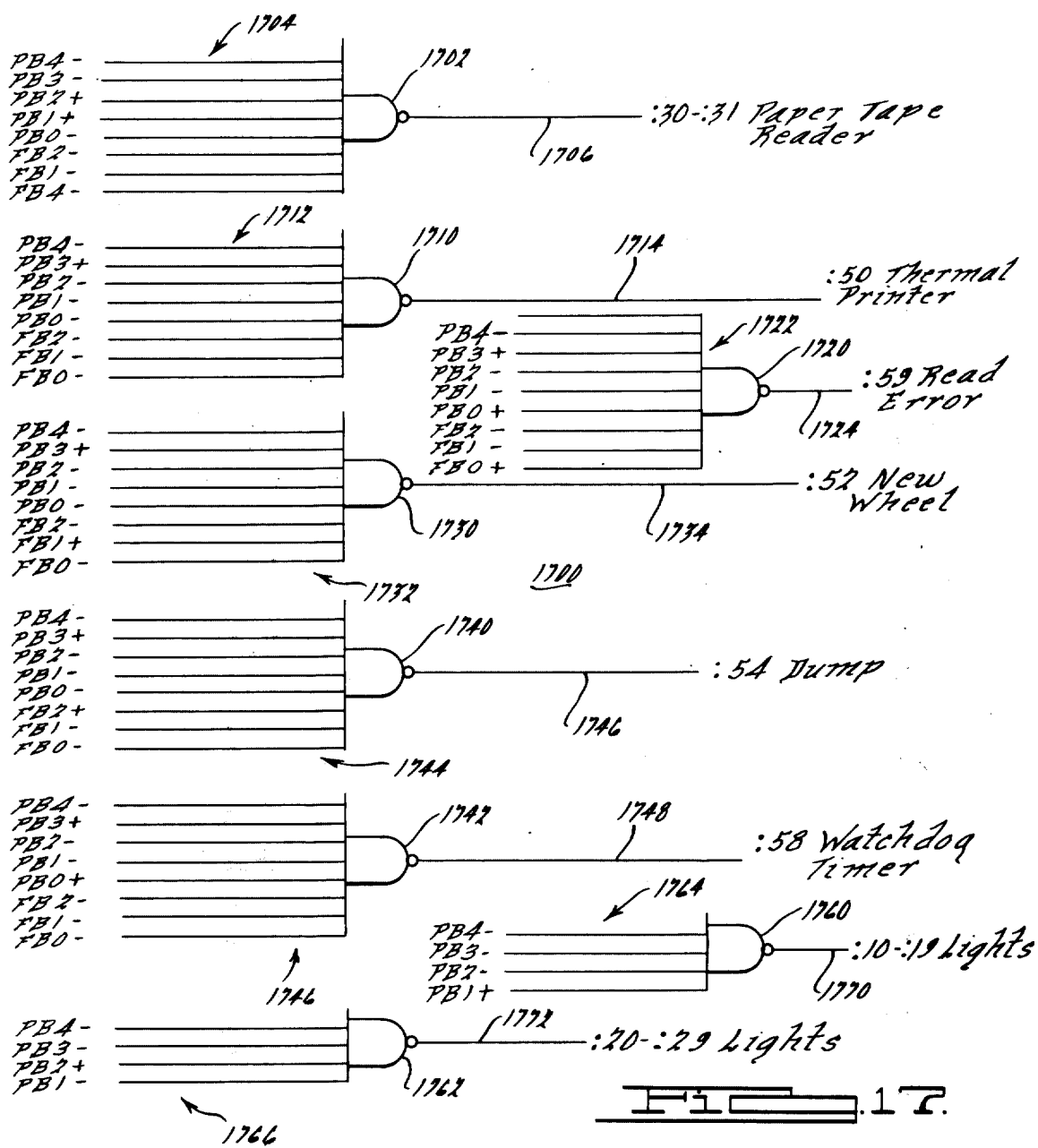
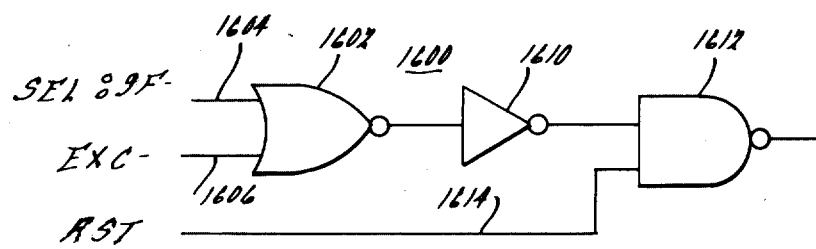

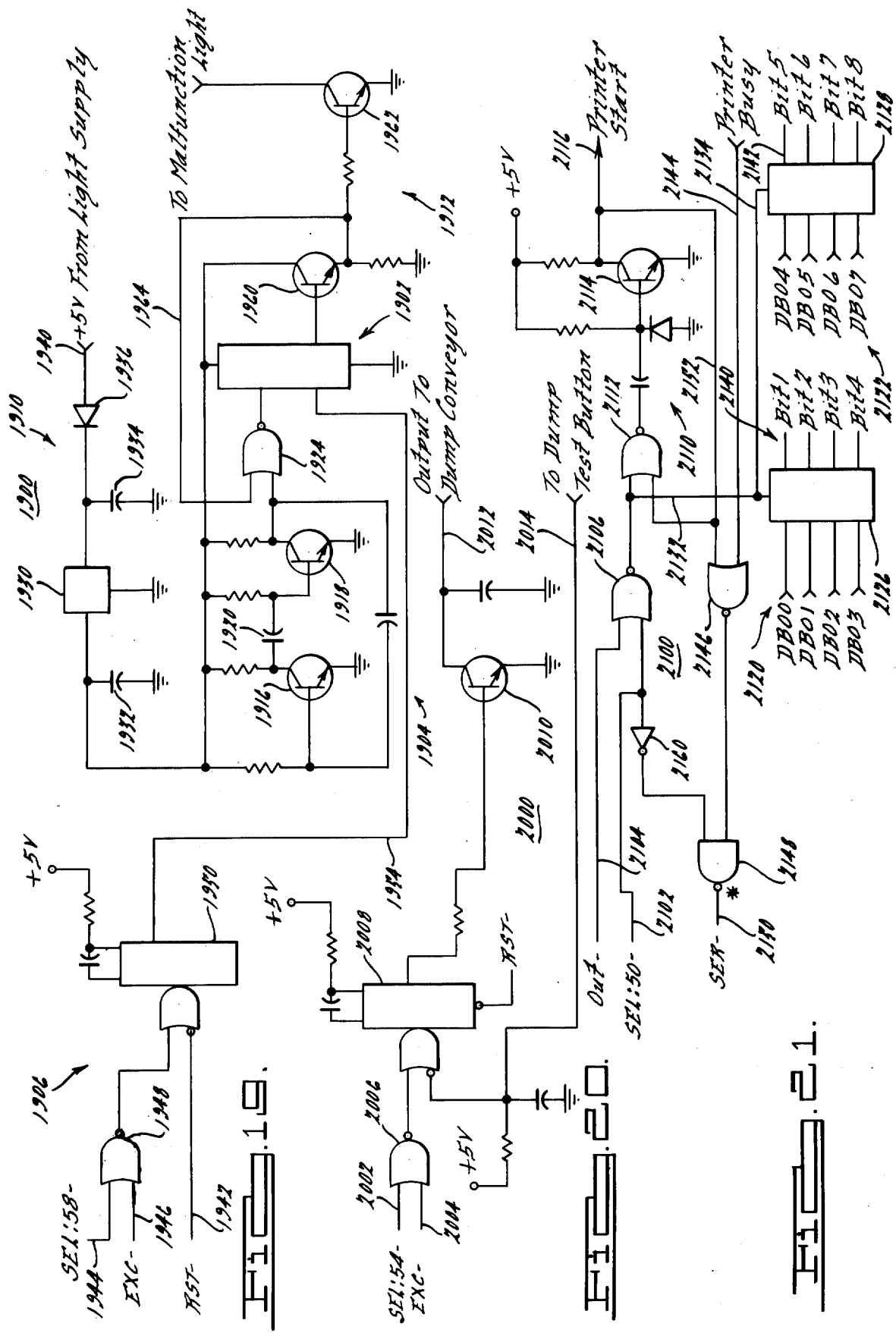

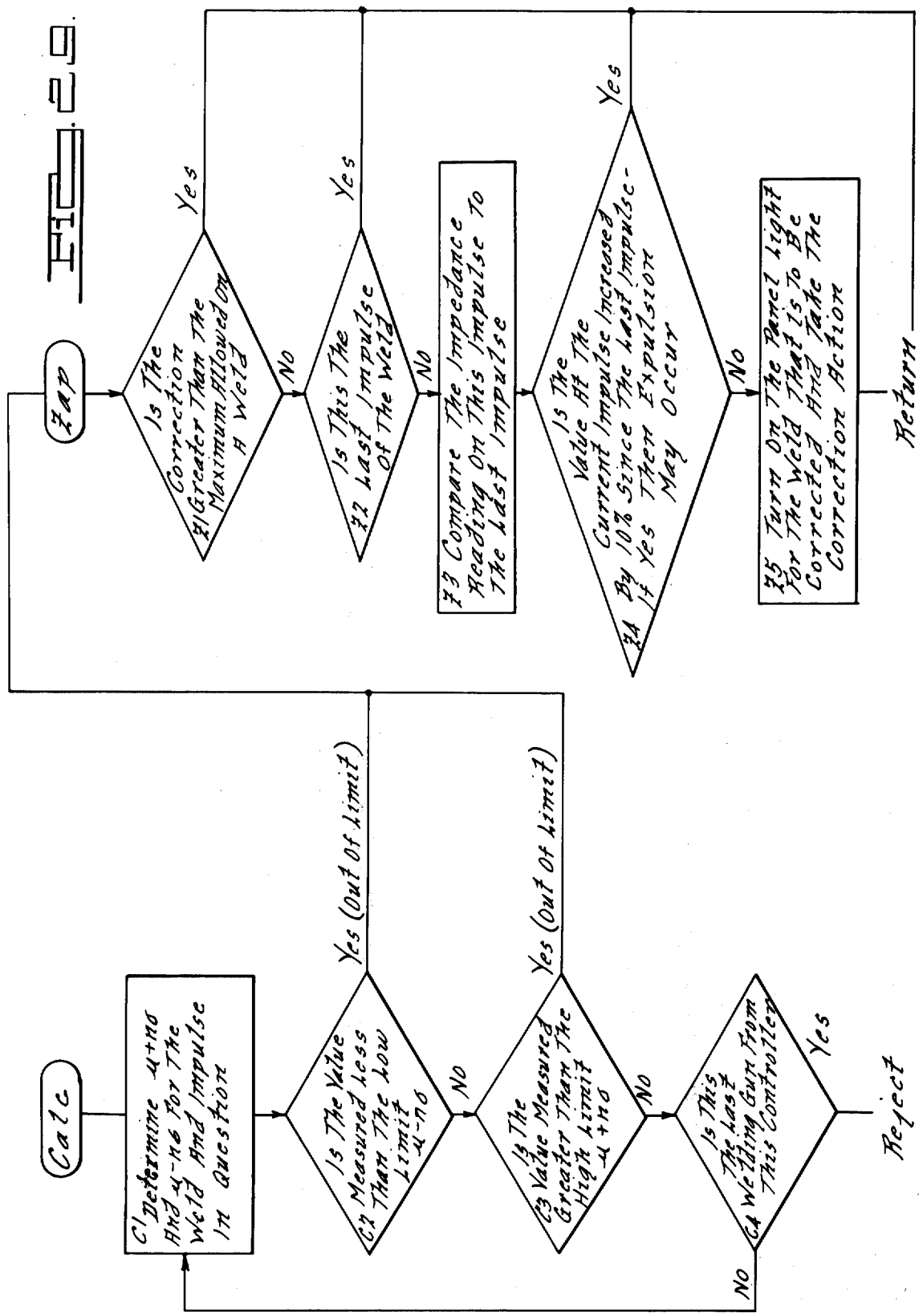

WELDING MONITORING AND CONTROL SYSTEM

The monitoring and control system monitors both the voltage and current flowing in the welding load, the load consisting of one or more welding heads, and this data is fed to the computer through an analog to digital converter. In the case of multiple heads, the voltage and current characteristics of the load are sequentially sensed. The voltage is initially sensed and momentarily stored and then the current is sensed with a short delay between measurements. This data is fed to the computer and the resistance or impedance calculation is made by the computer. The computer then compares the data for a particular head with the average and standard deviation representing acceptable welds and a determination is made whether correction is required to bring the weld within the required limits. If the data represents unacceptable levels, an out of limits circuit is actuated, which circuit may take the form of a system to eject the part or suitably mark the part. If the correction is within the limits allowed, a correction is made to bring the impedance closer to a mean value. Typically, a shortening or lengthening of the heat or cool time is made to minimize the amount of time required to complete a weld.

If a correction is to be made, a signal is sent from the computer to effect the correction, whether it be a shortening or lengthening of the cool time or heat time. In a typical standard pulsation welder controller, the heat and cool times are controlled by counting the number of cycles of the go-cycle power line occurring during the heat or cool time. If it is desired to shorten the heat time, an artificial pulse is generated by the computer and fed to the typical pulse weld controller to simulate an extra heat count. A similar situation occurs in connection with shortening the cool time. The typical pulse weld controller then counts the simulated pulse, in addition to the actual pulses generated, and turns off the heat or cool cycle in accordance with the number of actual and simulated pulses counted. As a further consideration, additional control of the weld could be obtained by absorbing a heat or cool time impulse generated within the standard pulse welder controller, thus changing the standard control circuit into operating with a greater number of pulses in the heat or cool cycle than have actually been generated. Thus, as a further control, the duration of the weld cycle (both the heat and cool times) could be lengthened or shortened. However, the most efficient use of the system occurs when the cool time is shortened to control weld quality.

The monitoring and control system further includes a program for updating the standard deviation parameters set within the computer. This is accomplished by continuously monitoring the deviation of the work being welded and accumulating the samples for the past welds. This data is weighted by a multiplier factor to weight the old and new data in accordance with the desired results to be accomplished by the monitor and control system, and the system also includes a print out for providing output information as to the past history of the welding production of a particular line.

The purpose of the foregoing abstract is to enable the Patent Office and the public generally, and especially the scientists, engineers or practitioners in the art who are not familiar with patent or legal terms or phraseology, to determine quickly from a cursory inspection the nature and essence of the technical disclosure of the application. The abstract is neither intended to define the invention of the application, which is measured by claims, nor is it intended to be limiting as to the scope of the invention in any way.

BACKGROUND AND SUMMARY OF THE DEVELOPMENT

This invention relates generally to a computer controller monitoring and control system for a welder and more particularly for a monitoring and control system for calculating the impedance of a welding load connected to a pulsation welder and utilizing this impedance information to determine the internal temperature of the weld and thus determine the quality of the nugget developed during the weld. This is accomplished by generating or absorbing certain counting pulses which are utilized to control the duration of the heat and cool time during the welding cycle.

As is commonly known, a spot weld is created by passing large current pulses, in the case of a pulsation welder, through the two pieces of metal to be welded. This current causes heating at the work-to-work interface, the bulk of the available energy being dissipated at this interface due to the fact that the highest electrical resistance point occurs at the interface. Other points in the electrode-to-electrode assembly may dissipate some energy due to resistance between the electrode and work, and certain other factors. Most conductive materials have a resistivity that depends on the material temperature. Thus, as the temperature increases, the resistivity also increases. Therefore, the resistance of a weld nugget is an indicator of its temperature and the impedance history of a spot weld provides an insight into the distribution of energy dissipated during the creation of that weld. Accordingly, by using selected instrumentation that allows for accurate measurement of the weld impedance, a nondestructive determination of weld quality may be made during the formation of the weld.

The object of the control system is to force the resistance or temperature of the weld to follow a prescribed path throughout the weld. In the system of the present invention, it has been found desirable to make the corrections in the early part of the weld cycle to force the weld up to the melt temperature without causing blowout. In resistance spot welding, the weld nugget is formed in two phases, the first phase being utilized to bring the work up to the melt temperature of the work material and the second phase being utilized to maintain the temperature to permit the nugget to grow. Accordingly, as the impulses during the heat portion of the cycle are sensed, the impedance is calculated and compared to the preselected desired curve and corrections are made to insure that the temperature of the weld, as it is being brought up to the preselected temperature, fits that curve.

The system to be described in presenting the concepts of the present invention include a standard pulsation welder controller presently available on the market. This standard controller typically comprises a system for counting impulses during alternate heat and cool cycles and a circuit for switching the control of the energy from heat to cool in an alternate fashion. The system of the present invention is adapted to be interconnected with the standard pulse welder to sense when a heat portion of the cycle is occurring and when a cool portion of the cycle is occurring. The novel system then determines whether a correction is to be made and whether that correction should be such to apply more or less heat to the work interface. If it is determined that more heat should be applied in a typical situation, the cool cycle will be shortened by generating one or more additional cool cycles within the novel system and feeding these additional cool impulses to the standard welder control to be counted by that standard control. Thus, the standard control is altered to change a pulse generated outside of the standard control to shorten the cool cycle. In the case of lengthening the cool cycle, one or more or the cool pulses is precluded from being counted by the standard control. This could occur by shunting a cool impulse or by maintaining a voltage level at the input circuit at the counter at a particular level such that it appears that an impulse has not been generated when in fact one or more impulses have been generated in a circuit prior to the counter.

The novel system includes a digital computer which is fed data from the welder heads and the computer is utilized to generate output commands to the standard controller. In one embodiment of the invention, voltage sensing leads are interconnected with the welder electrodes to sense the voltage across the work. Also, additional connections are made to accurately sense the current flowing through the work, these measurements being made by standard methods such as standard shunts connected to a portion of the welder load circuit, etc. It is presently contemplated that the voltage will be measured first and then stored for a short period of time until the current is measured. These signals are fed through an analogue to digital converter and control circuit to the computer, the voltage and current data being fed to the computer and control signals being fed from the computer to the converter to control when the voltage and current are sensed. The computer then calculates the impedance of the weld and produces control signals for use by the standard welder controller.

In a typical system, the computer is ordinarily set up to sense a preselected number of load welds, the welds being controlled to produce a desired nugget characteristic. The computer then calculates the impedance for these welds, the number of impulses being in the neighborhood of fourteen for each head being controlled and generates the desired mean curve. The computer then calculates standard deviations for that curve to set up maximum and minimum deviation limits which are acceptable for welds to be performed under the standards set up. The computer then compares future welds with the standards programmed into the computer to determine whether a correction is to be made and whether a correction can be made (the weld is out of limits). The computer also includes a system for updating and weighting additional data being fed during the future welds to permit following of the weld standards to any drift in the welding cycle which may occur as a result of deterioration in the weld electrodes or some other subtle drift in the weld quality.

The system further includes a welder interface circuit for interfacing the computer control signals with the standard welder control. Further, the system includes diagnostic circuits for indicating when a correction is being made and for indicating when a correction cannot be made to mark the work for discard or reworking. The system of the present invention is an improvement on the copending application of Truman Ted Van Sickle and Charles J. Drake, Ser. No. 338,453, filed Mar. 6, 1973, and assigned to the assignee of the instant application.

Accordingly, it is one object of the present invention to provide an improved welder control system.

It is another object of the present invention to provide an improved resistance pulse welding control system.

It is another object of the present invention to provide an improved control system for use in conjunction with a standard impulse welder control system.

It is a further object of the present invention to provide an improved system for calculating the impedance characteristics of a weld as it is being accomplished and comparing the calculated impedance characteristics with the preselected characteristics to determine the progress of the weld.

It is still another object of the present invention to provide an improved impulse welder control system which is capable of comparing weld characteristics with a preselected characteristic standard and applying corrections to the welder to force the weld characteristics to conform to the preselected standard characteristics.

It is still a further object of the present invention to provide an improved impulse welder control which is capable of controlling a multiple number of welder heads and calculating the weld impedance as each impulse of weld current is applied to the work.

It is still a further object of the present invention to provide an improved system such as described in the previous object and apply corrective action to the weld after each weld impulse is applied to the weld to insure that the weld conforms to preselected standards.

It is still another object of the present invention to provide an improved welder control system as described which has the capability of applying corrective action to the weld as it is being applied to the work by shortening or lengthening either the cool or heat portion, or both, of the weld cycle to insure that the temperature of the weld follows certain preselected standards.

It is another object of the present invention to provide an improved resistance welder control system which is capable of indicating when corrective action is being taken and when the weld is such that corrective action cannot be taken.

It is a further object of the present invention to provide an improved bank peak detector circuit for use in conjunction with an impulse welder control system.

It is a further object of the present invention to provide an improved interface state control counter for use in conjunction with an improved welder control system.

It is still a further object of the present invention to provide an improved analog to digital conversion control and timing circuit for use in conjunction with an improved impulse welder control system.

It is still another object of the present invention to provide an improved data control circuit for use in conjunction with an improved welder control system.

It is still a further object of the present invention to provide an improved multiplexer control circuit for use in conjunction with an improved impulse welder control system.

It is still a further object of the present invention to provide an improved analog multiplexer circuit for use in conjunction with an improved impulse welder control system.

It is still another object of the present invention to provide an improved shift register and gating circuit for use in conjunction with an improved impulse welder control system.

It is another object of the present invention to provide an improved analog to digital circuit for use in conjunction with the impulse welder control system described above.

It is a further object of the present invention to provide an improved increment data and data ready circuit for use in conjunction with the improved welder control system described above.

It is a further object of the present invention to provide an improved start impulse interrupt circuit for use in conjunction with the improved impulse welder control system described above.

It is a further object of the present invention to provide an improved sample bank control circuit for use in conjunction with the improved impulse welder control system.

It is another object of the present invention to provide an improved end of weld interrupt circuit for use in conjunction with the invention.

It is a further object of the present invention to provide an improved thumb wheel circuit for use in conjunction with the welder control system described above.

It is another object of the present invention to provide an improved new wheel control circuit for use in conjunction with the welder system described.

It is still a further object of the present invention to provide an improved welder impulse control circuit.

It is still another object of the present invention to provide an improved device address decoding circuit for use in conjunction with the impulse welder described above.

It is still a further object of the present invention to provide an improved control system for sensing malfunctions and dead welds and an improved thermal printer circuit for use in conjunction with the impulse welding system described above.

It is still another object of the present invention to provide an improved light control circuit and tape reader circuit for use in conjunction with the system described above.

It is a further object of the present invention to provide an improved impulse welder control system which is inexpensive to manufacture, easily installed and reliable in operation.

It is a further object of the present invention to provide an improved welder control system for correcting standard weld procedures and which is capable of being interconnected with standard resistance welding control circuits.

Other objects and features of the invention will become apparent from a study of the following specification, the appended claims, and the attached drawings in which:

FIG. 8 is a schematic diagram illustrating the end of weld interrupt circuit utilized in the system of the present invention;

FIG. 10 is a schematic diagram illustrating the details of the welder impulse control circuit of the present invention;

FIG. 11 is a timing diagram illustrating the relative timing pulses for the lengthen heat portion of the cycle;

FIG. 12 is a timing diagram illustrating the shorten cool portion of the system;

FIG. 16 is a schematic diagram illustrating the details of the reset circuitry incorporated in the control system of the present invention;

FIG. 17 is a schematic diagram of the common decoder circuitry utilized in the system of the present invention;

FIG. 19 is a schematic diagram illustrating the malfunction sensing circuit of the system of the present invention;

FIG. 20 is a schematic diagram illustrating the details of the reject control circuit incorporated in the system of the present invention;

FIG. 21 is a schematic diagram illustrating the details of the thermal printer control circuitry of the system of the present invention;

FIG. 25 is a schematic diagram illustrating the remaining details of the tape reader control circuit;

FIG. 26 is a flow chart illustrating the general program for the general purpose computer utilized in the system of the present invention;

FIG. 29 is a flow chart illustrating the calculate and zap sub-routines in the general program of FIG. 26;

DETAILED DESCRIPTION OF THE DRAWINGS

Figure 1:
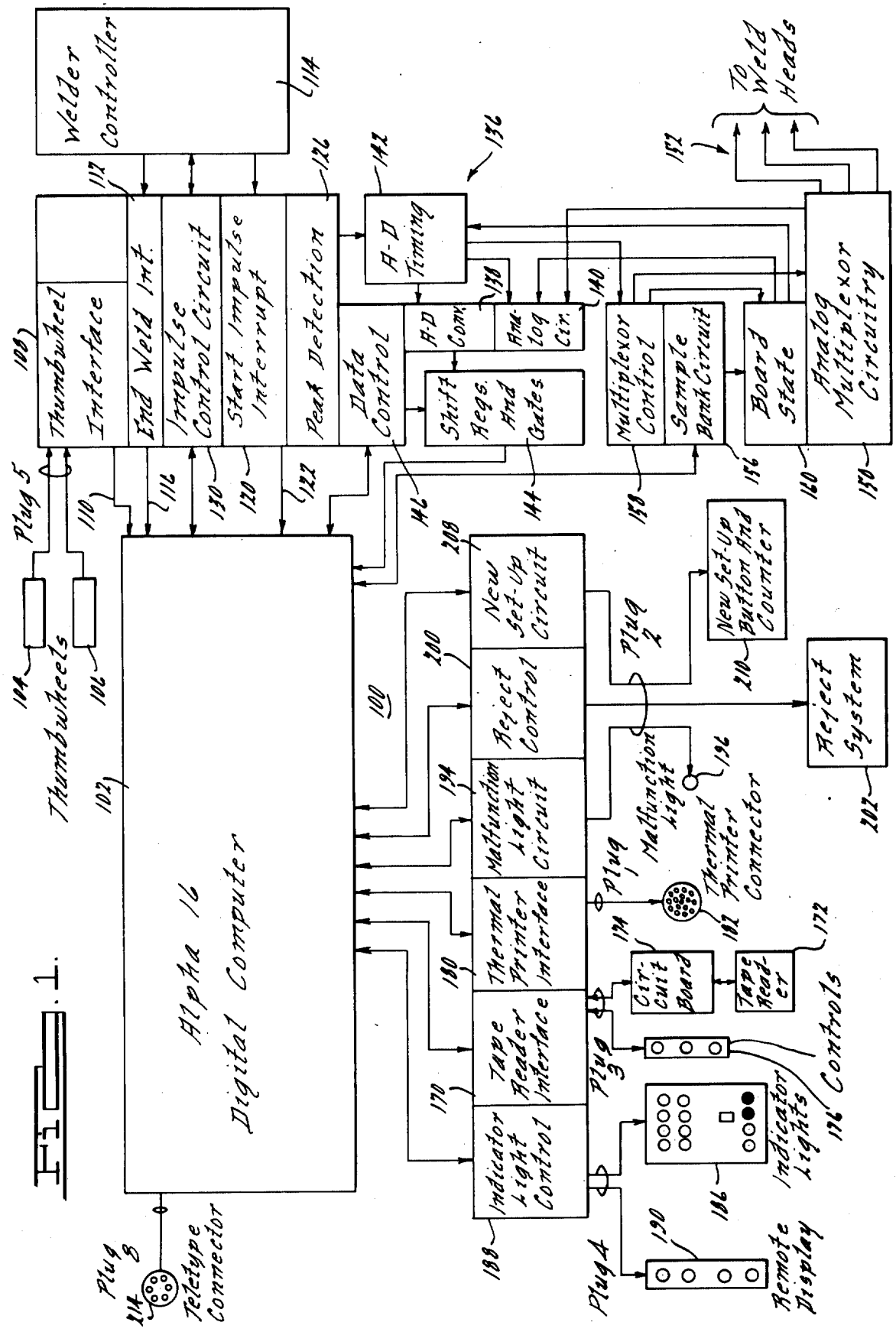
FIG. 1 is a block diagram illustrating the overall system of the present invention including the computer and interface adapted to be connected to the standard welder control system.

Referring now to FIG. 1, there is illustrated a schematic diagram 100 which depicts the sub-system composition of the system of the present invention. Particularly, the system includes a general purpose digital computer 102 which forms the basic data processor for the welder system, the computer being any minicomputer presently on the market, such as the alpha 16 minicomputer manufactured by Computer Automation, Inc. The digital computer 102, as described above, collects data from the welder heads and processes this data to create a hypothetical curve which is devised to be an ideal temperature curve for a particular weld. The computer then takes subsequent data and compares the impedance of subsequent welds to the ideal curve and causes corrective action to be taken during the progress of the subsequent weld if such corrective action is capable of bringing the temperature of the nugget within preselected limits of the ideal curve.

However, only a certain number of corrective actions should be taken in order to achieve the ideal curve. Accordingly, a pair of thumbwheel switches 104, 106 are provided to permit the operator to set the maximum number of corrections that the computer should take. These thumbwheel switches are the typical binary coded decimal switches which feed data into the computer representative of the maximum number of corrections which the operator desires to take. This data is fed through a thumbwheel interface circuit 108 and thence to the computer through a cable 110. Thus, during the operation of the system, the computer periodically checks the position of the thumbwheel switches to isure that the maximum number of corrections has not been changed from the previous computer cycle, and if they have been changed, to input this information to the computer.

The next sub-system is an end of weld interface circuit 112 which is connected between the computer 102 and a standard welding controller system 114, the standard welder controller system 114 being that typically provided by various welder control companies to control the number of impulses provided a weld during a particular pulsation welding cycle. In the preferred embodiment, the welder controller used is manufactured by Sciaky Bros., in Chicago, Illinois, and designated Model No. MGT-8. The end of weld interface derives data from the welder control circuit 114 which signals that the weld is ended. This data is transformed into data that the computer 102 is capable of utilizing, and is fed thereto by means of a cable 116. In this way, the computer is signalled directly by the standard welder 114 that the weld is complete.

The system also includes a start pulse interrupt circuit 120 which is connected to the computer by a means of a cable 122 and to the welder control 114. The start pulse interrupt circuit derives data from the welder control circuit 114 which signals that a heat pulse has started. This data is fed to the digital computer 102 for purposes to be explained in greater detail hereinafter.

The system also includes a peak detector circuit, which is synchronized to the welder controller 114 by the start impulse signal. The peak detector circuitry generates a timing pulse each time the weld voltage and current values are at their maximums. Its exact use is explained hereinafter.

As is stated above, the system of the present invention provides heat and cool control signals, particularly lenthen heat or shorten cool control signals, which are utilized to vary the number of weld impulses being fed to the weld heads by the welder control 114 to control the development of a weld nugget. Accordingly, an impulse control circuit 130 is provided which senses when the impulses are being fed from the welder controller to the welding heads and either absorbs one pulse or generates additional pulses to be fed to the welder controller from the computer in response to a lengthen heat or shorten cool command.

The next system to be discussed is the analog to digital circuitry 136 which includes an analog to digital converter 138, an analog circuit 140, an analog to digital timing circuit 142, a shift register and gate circuit 144, and a data control circuit 146. Basically, the analog to digital converter circuit receives analog data from the analog circuit 140, which data is derived from the welding heads and also samples data from other areas of the system. The analog circuit feeds the data to the analog to digital converter 138, the timing of the analog to digital converter circuit being controlled by the analog to digital timing circuit 142. This timing is in turn controlled by the peak detection timing pulses from circuit 126. The digital data from the analog to digital converter circuit 139 is fed to the shift register and gate circuit 144 for storage therein. The data is shifted into the shift registers as it is collected from the various areas of the system, including the weld heads.

When the computer requires the information stored in the shift register and gate circuit 144, a signal is generated in the data control circuit 146 to cause the data to be shifted from the shift register into the computer 102. In this way the data is shifted into the computer in the shortest possible time. The shifting of the data through the system is basically controlled by the data control circuit 146 and particularly the shifting of the digitally generated data. It is also to be noted that the analog circuit 140 includes a plurality of amplifiers which converts low voltage signals fed thereto from the welder heads, the signals being in the order of 2 volts, and converts this data to a five volt level. This five-volt level is required by the analog to digital converter.

The data is sensed at the welder heads by means of an analog multiplexer circuit 150 which is connected to the heads by means of a plurality of conductors 152. The analog multiplexer circuit is controlled by a sample bank circuit 156 and a multiplexer control circuit 158, the sample bank circuit determining which bank is to be sampled. This sample bank circuit generates a switching signal to switch from, for example, bank one to bank two, in response to a signal generated in the computer.

The final circuit in the sampling system is the board state circuit 160 which is a modular precounter. The board state circuit has three modes of operation, an idle mode, a sample mode and a transmit mode. The circuit is normally in the idle mode and the counter portion of the circuit is set at zero. When the sample bank circuit indicates that data is to be sampled, the board state circuit 160 switches to the sample mode and the analog multiplexer circuitry 150 commences gathering data values from the weld heads. When it is desired to transmit the data to the analog circuitry, the board state circuit 160 switches to the transmit mode and causes the analog multiplexer circuit 150 to transmit head data to the analog circuit.

The analog multiplexer circuit is basically a plurality of switches, the switches being analog in nature, that sequentially connect each voltage or current pair of pick-up wires connected to the weld heads to the analog circuitry. Thus, the analog multiplexer circuitry consists of a plurality of analog switches which are capable of selecting which head and whether the current or voltage data is to be fed to the analog circuit.

Referring now to the operation of the portion of the block diagram just described, as applied to the welding of automotive wheels, the cycle is initially started by feeding a wheel into a position between the welding heads. The wheel is then raised into contact with the welding heads or the heads are lowered into contact with the wheel. At the instant the welder starts the first impulse, the control system sends a signal to the start impulse interrupt circuit which interrupts the computer to indicate to the computer that a weld impulse is beginning. At that time, the computer sets an internal timer to wait a certain interval into that weld impulse before the data from the weld impulse is read back. This is due to the fact that a data value read at the beginning of impulse may not be meaningful in that the welding heads may not have seated properly or certain other conditions may exist which would provide a false reading. The computer waits approximately 50 milliseconds into the first impulse before the computer signals the system to start sampling data. This data is sampled through the data control circuitry 146 as the control circuit and the actual sampling is accomplished by the analog multiplexer circuitry 150. The system selects which bank, either bank one or bank two, depending on which bank is welding at that time, will gather current and voltage data from the welding heads. During this period, the board state control circuit 160 is in the sampling mode of operation.

In the above described mode, the peak detection circuit 126 synchronizes the time of sampling so that the sampling is accomplished when the welder controller 114 provides a peak in the welding impulse. In the actual operation of the circuitry, the peak detecting circuit indicates that a peak is to be detected and, if the board state control is in the sample mode, the welder heads will supply a signal indicative of the subsequent peak which occurs at the welding load. This information is fed through the analog to digital converter circuit and into the shift registers 144. The value of the peak is shifted into the shift registers in circuit 144 and the multiplex control counters to be described hereinafter are incremented. The next analog switch is then turned on and the operational amplifiers contained therein are given time to reach a steady state and the next sample is shifted into the shift register circuit through the analog to digital converter. This operation occurs eight times corresponding to the voltage and current values for the four welder heads.

At this time, the board state circuit 160 switches to the transmit mode of operation and a data ready signal is generated for the computer to tell the computer that valid data has been shifted into the shift register circuit 144. The computer then accepts the data from the shift register circuit and stores this data for use in generating a corrective signal and also to update the weld data stored in the computer from previous welds.

The computer does a mathematical analysis of the data stored in the storage banks corresponding to the previous welds and makes a determination as to whether the weld is progressing satisfactorily or not. If the weld is not progressing satisfactorily, corrective action is taken through the impulse control circuit 130 and the heat time is either lengthened or the cool time shortened. This is accomplished by either generating a false pulse to be fed to the welder controller which will shorten the cool time or a pulse generated within the welder controller 114 is absorbed by the system of the present invention to fool the welder into operating as though no pulse has been generated. This will lengthen the heat time as it will take additional pulses to be sensed by the welder controller before the end of weld period is achieved.

The system also includes peripheral equipment which is utilized to derive a print-out of data from the computer, to communicate with the computer to change programs, to input data through the computer manually, and to provide indications of the operation of the program.

The first such peripheral equipment is a tape reader interface circuit 170 which is utilized to interface a tape reader 172 with the computer 102. The tape reader 172 is connected to the tape reader interface circuit 170 through a circuit board 174 which merely provides the connections to the inferface from the tape reader. The tape reader interface circuit 170 is controlled by means of a control circuit for a control module 176 which controls the normal operation of the tape reader sub-system. The tape reader is typically used in a system of this type to change the program in the computer or to reload the program should something happen to the program during the operation.

A second circuit of the operator convenience type is a thermal printer interface circuit 180 which is utilized to interface a thermal printer (not shown) with the computer 102. The thermal printer is connected to the thermal printer connector 182, the thermal printer allowing the operator to print out numerical data values coming from the analog to digital converter. The printer also is utilized to provide a constant monitoring of the operation of the system.

The system further includes a panel 186 of indicator lights and a counter mechanism which is used to indicate when the corrective action described above is being taken. Also, the counter provides an indication as to how many times corrective action has been taken. The indicator light panel 186 is connected to the computer through an indicator light circuit 188 which controls the flow of information from the computer to the indicator light panel 186. The system also includes a remote display 198 which is utilized to provide a remote indication of the corrective action being taken on any particular bank.

The next peripheral circuit provided in the system is a malfunction light circuit 194 which is connected to the computer and to a malfunction light 196. Basically, the malfunction light circuit 194 is incremented by a multivibrator circuit and is constantly reset to zero by the computer program. Thus, each time the computer program goes through one cycle, the malfunction light circuit is reset to zero. If any malfunction should occur in the computer program, the counter within the malfunction light circuit 194 will not be reset to zero. Thus, the count will continue until an overflow condition is reached. When the count has reached this overflow condition, a signal is generated at the output circuit of the malfunction light circuit 114, this overload signal being fed to the malfunction light 196. In this way, the operator is signalled that the computer program is not operating properly.

The indicator light circuit 186 contains eight lights, one for each welding head. When corrective action is required, the computer will take the appropriate corrective action and the associated lamp will flash for approximately 1/20th of a second, the lamp corresponding to the had that has a weld that is progressing and corrective action is being taken.

The next circuit indicated in FIG. 1 is a reject control circuit 200 and a reject system 202 which provides a means for controlling the disposition of welds which have not met the standards set by the computer. For example, a preferred reject circuit would involve a reject conveyor which receives parts which have defective welds. Thus, when the computer signals that a weld has not been brought within standards, even though corrective action has been taken, a reject signal is generated by the computer, which signal is fed to the reject control circuit 200. This circuit in turn controls the reject system which may activate a ram to push the defective part, a defective work piece, onto a reject conveyor to convey the work piece to an area different from that area which receives the acceptable parts. Another indicator system may be a painting system whereby the reject circuit would activate a paint gun which would squirt a small portion of paint on the unacceptable work piece or part.

The system also includes the final system to be described which is a net setup circuit 208 and a new setup bottom and counter circuit 210. When the welding line has been changed for some reason, for example, new welding tips provided, transformer taps changed, different type of work piece being welded, the computer has to be provided with a new set of data with which to derive a new curve for use in comparing subsequent data. When this condition occurs, a button is pushed which causes the computer to switch to a set-up subroutine which is utilized to generate the new data. Thus, the system is updated with subsequent values of a weld to evolve a new curve for use in evaluating welds being performed. The system also includes a teletype connector 214 which is utilized to connect a peripheral teletypewriter for use in inputting information to the digital computer 102.

Figure 2:
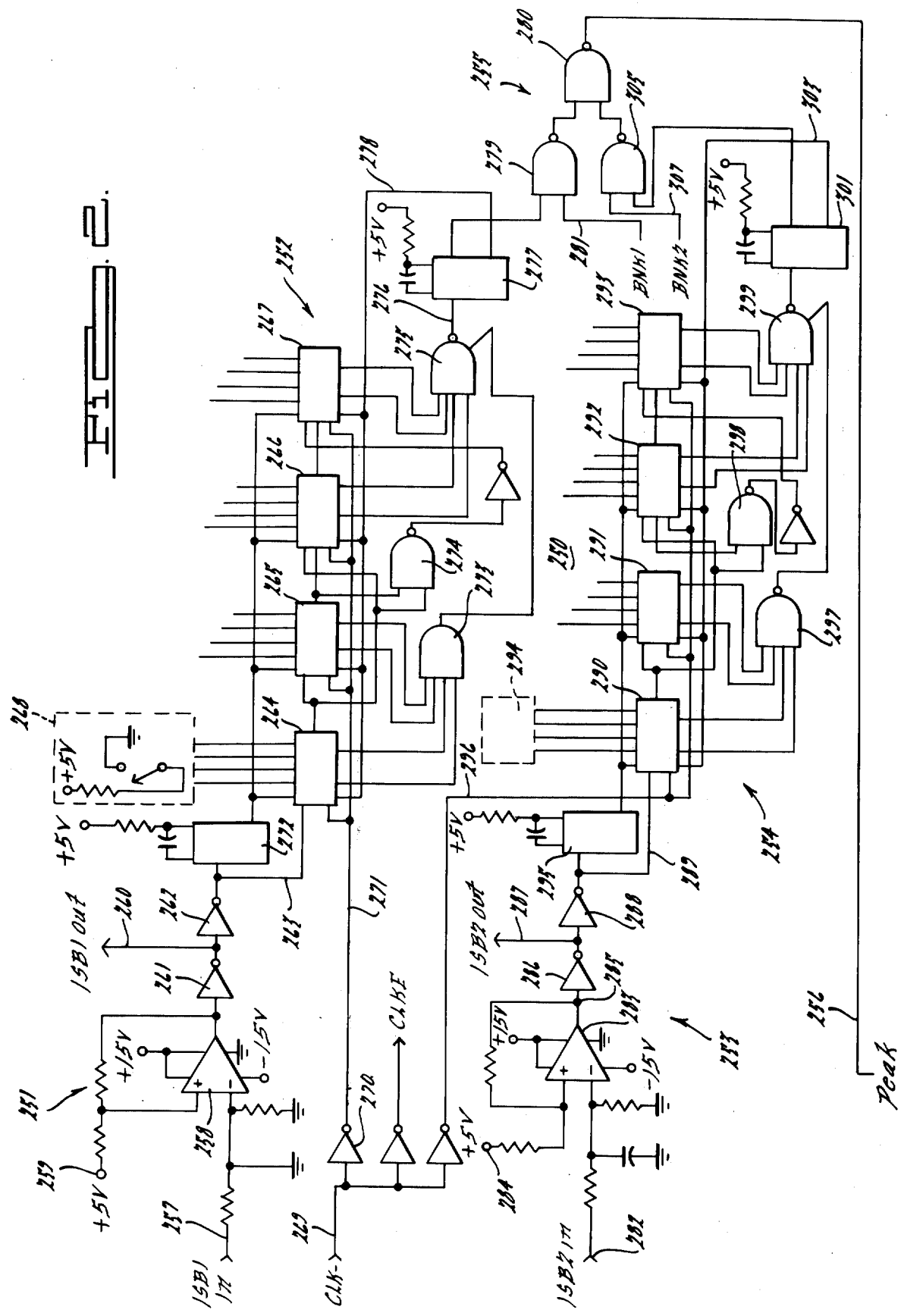
FIG. 2 is a schematic diagram illustrating the details of the bank 1 and bank 2 peak detector.

Referring now to FIG. 2, there is illustrated the bank one and bank two peak detector circuit 250 which is utilized to detect the peak of the welding pulse for the particular bank which is in the welding process, either bank one or bank two. The system 250 basically includes an input circuit 251, a binary coded decimal counter circuit 252 for bank one, an input circuit 253 and a binary coded decimal counter circuit 254 for bank two. The system 250 also includes an output circuit 255 which is utilized to feed an output peak signal on an output conductor 256.

The input circuit 251 includes an input conductor 257 which is connected to the negative input circuit of a comparator 158, the positive circuit of the comparator being connected to a source of five volt potential at input terminal 259. The comparator is basically utilized to convert the voltage level from the eighteen volts normally used in the control circuitry for the welder controller to a 5 volt level which is adapted to be utilized by the computer. The circuit 258 is a differential comparator that responds to the difference in signal level between the terminals 257, 259 and these circuits are utilized to provide a hysteresis effect at the input circuit whereby noise signals which are not to be transmitted through the input circuit are eliminated. Thus, the comparator circuit 258 is connected whereby a reference level is applied to the positive input such that when the input at terminal 257 exceeds the reference level, the comparator will switch states. In switching, the comparator switches from a logical one level (5 volts) to a logical zero level (0 volts).

The comparator 258 is utilized to generate an ISB1 out signal on an output conductor 260, the signal from the comparator 268 being inverted by means of an inverter circuit 261. The ISB1 out signal serves several functions throughout the system. The ISB1 out signal drops to a logical zero level whenever a weld impulse is occurring, and goes to a logical one level during cool intervals. This signal is fed to the computer to generate the interrupt to tell the computer that a weld interval is beginning.

The output of gate 261 is fed through a second inverter gate 262, which output is then fed to the input circuit of the binary coded decimal counter circuit 252 by means of a conductor 263. The binary coded decimal counter circuit 252 includes a plurality of counters 264, 265, 266, 267, which counters have been connected to count up to 5,555. The counters 264 – 267 are initially preset by preloading a number into the counters 264 – 267 by means of a switch assembly 268 and the other switch assemblies associated with the remaining counters 265 – 267. The counter is utilized to time a period from the start of the weld interval until the assumed occurrence of the peak.

The input circuits of the counters 264, 167 are also fed with a clock pulse at the input circuit 269, the clock pulses coming from the computer and being of a one megahertz frequency. This signal is generated in the computer by a crystal controlled circuit to provide a very precise frequency signal. The signal at terminal 269 is inverted by means of an inverter circuit 270 and fed to the input circuits of the counters 264 – 267 by means of a conductor 271.

The inputting of the preload number from the switches, including switch 268, is controlled by a single shot multivibrator circuit 272 which is connected to the input circuits of the counters 265, 267. Thus, when a count enable signal is generated at the output terminal of inverter gate 262, the single shot multivibrator circuit 272 generates a pulse which sets the preload number from the switches 268, etc. into the counters 264 – 267.

Assuming, for example, that a zero number is loaded into the various switches, including switch 268, the counters 265 – 267 will count to 5,555 at the end of 5.555 milliseconds. The next pulse will then switch all of the counters to zero. Accordingly, if it is desired to sense the switching of the loaded counters 265 – 267 to the unloaded or zero state after a preselected period of time, the switches 268 are set to a number which, when added to the desired time delay, will equal 5,555. Thus, if a 4.444 millisecond delay is desired, the switches 268 are set to four ones such that the clock pulse at input circuit 269 will generate 4,444 pulses to bring the counter 265 – 267 up to the 5.555 point.

The output of the counter circuit 252 is provided by means of a plurality of nand gates 273, 274, 275 which sense the output condition of the various counters 265 – 267. When the proper switching condition exists, that is switching from 5,555 to 0000, an output signal will be generated at conductor 276, which output signal is fed to the input circuit of a single shot multivibrator 277.

The output of single shot multivibrator 277 is fed to the reset circuit of the various counters 265 – 167 by means of a conductor 278. The output of single shot multivibrator 277 is also fed to the input circuit of a nand gate 279, the output of gate 279 being fed to the input circuit of a nand gate 280. The gate 279 is controlled by means of an enable circuit designated a bank one circuit which generates a signal on a bank one conductor 281 to indicate that bank one is in the welding state. Thus, when the proper conditions are true at the input circuit to gate 279, a peak output pulse will be generated at the output of nand gate 280. Thus, when the weld interval is indicated to have started by means of an ISB1 input signal at terminal 257, the counter 252 will then count sufficient pulses in accordance with the period determined to be the period at which a peak will occur. This selected period will then produce an output signal at conductor 256 corresponding to the expected peak pulse.

Referring now to the lower half of FIG. 2, there is illustrated the bank two peak detector circuit which is substantially identical to that described in conjunction with the bank one peak detector circuit. Specifically, the input circuit includes an input terminal 282, the signal on terminal 282 being fed to the input circuit of a comparator circuit 283. The positive input terminal of comparator 283 is connected to a source of five-volt potential at input terminal 24 to produce an output signal at node 285 in response to an ISB2 in signal which designates the second bank. As was the case above, this signal at node 285 is inverted by means of an inverter circuit 226 and fed to an output conductor 287. This output conductor is supplied with an ISB2 out signal for use in the remainder of the system.

The output of inverter 286 is also fed to a second inverter 288 and then to an enable circuit including conductor 289. The conductor 289 is connected to the input circuit of the first of a plurality of binary coded decimal counters 290, 291, 292, 293.

As was the case above, the binary coded decimal counters 290 – 293 are supplied with a preload input from a switch 294 which corresponds to the switch 268. As was the case above, the counters 290, 293 are capable of counting to the number 5,555 to provide an output signal at the switch point from the maximum number 5,555 to the minimum number 0000.

The number from the preload switches 294 is loaded into the counters 290 – 293 by means of a pulse generated at the output of a single shot multivibrator circuit 295, the multivibrator circuit 295 providing an output signal in response to the generation of the ISB2 out signal. As was the case above, the counters 290 – 193 are incremented by means of the clock pulse generated at the input terminal 269, this pulse being fed to the counters 290 – 293 by means of a conductor 296.

The output circuit of the counters 290 – 293 are connected to a plurality of nand gates 297, 298, 299, which nand gates sense the numerical condition of the binary coded decimal counters 290 – 293. When the proper conditions exist, the binary coded decimal counters 290 – 293 switch from the maximum to the minimum numerical state, the output gate 299 will provide an output pulse which is fed to the input circuit of a single shot multivibrator (SSM) 301. The output of the single shot multivibrator, as was the case above, is fed back to the reset circuit for the counters 290 – 293 by means of a conductor 303. The true output of the single shot multivibrator 301 is fed to the input circuit of a nand gate 305, the gate 305 being enabled by a bank two enabling signal generated on an input conductor 307. If the bank two circuit is being utilized the gate 305 is enabled and the pulse on a conductor connected to the input of the gate 305 will pass through the gate 305 to the input of gate 280. The output of gate 280 is connected to the peak conductor 256 as was described above. This peak signal is utilized to start the data sampling to be described in conjunction with the description of FIG. 3.

Figure 3:
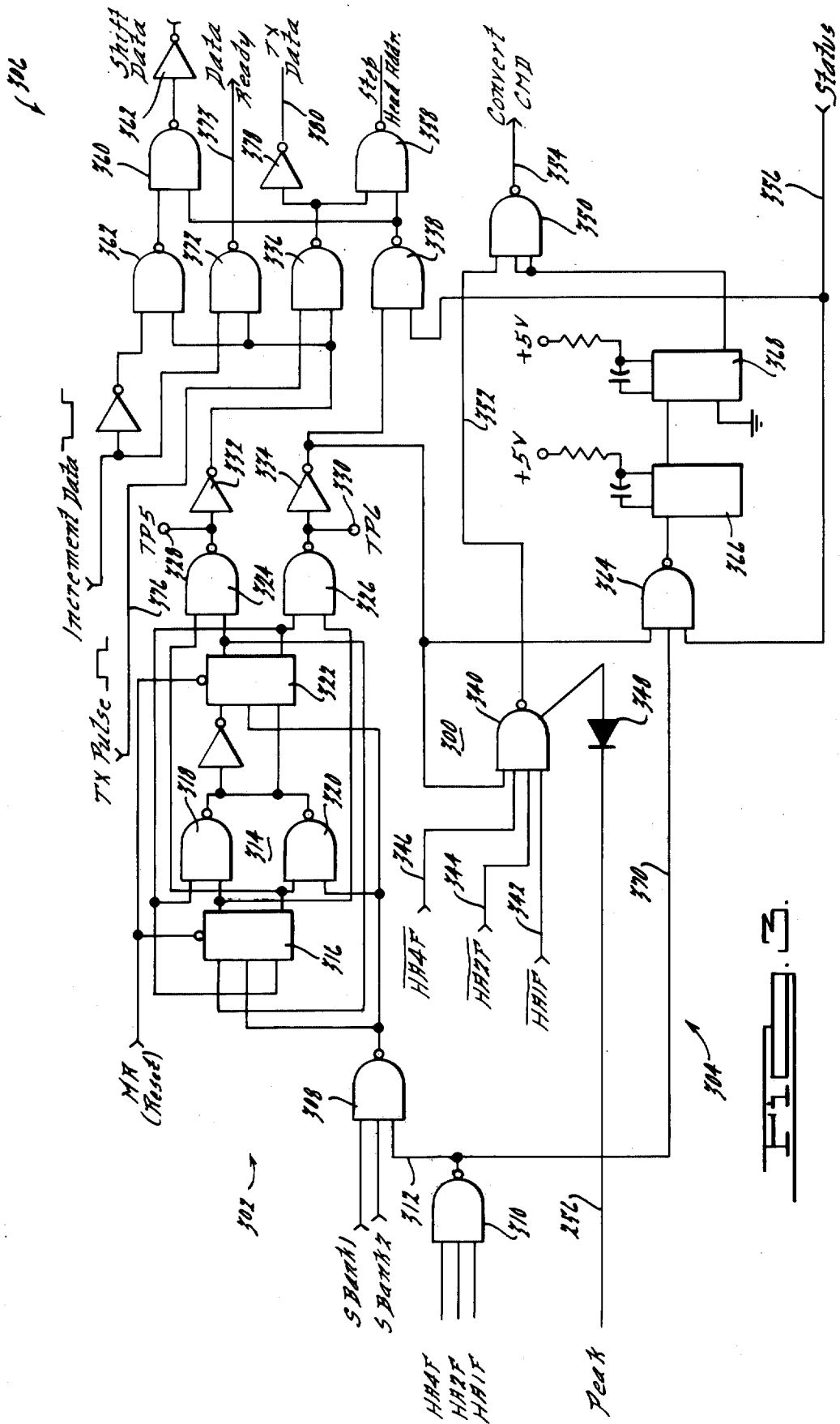
FIG. 3 is a schematic diagram illustrating the details of the interface state control counter circuit, the analog to digital conversion control and timing circuit and the data control circuit incorporated in the system of the present invention.

Referring now to FIG. 3, there is illustrated a system 300 including circuits to provide interface state control, analog to digital conversion control and timing and data control. Specifically, the circuit 300 includes an interface control counter circuit 302, an analog to digital conversion control and timing circuit 304 and a data control output circuit 306.

The circuit is initially in the sample mode and includes a bank one, bank two gate 308 which is provided input signals corresponding to the sample bank one or sample bank two modes of operation. The circuit is switched from the sample to the transmit mode by means of a gate 310, the gate 310 including input signals from the computer which are adapted to provide an output signal on a conductor 312 which will switch the modulo three counter 314 from the sample to the transmit mode.

The modulo three counter includes a flip-flop 316, the output of which is fed to a pair of gates 318, 320. The output of gates 318, 320 are fed to a second flip-flop circuit 322, the output of the second flip-flop circuit being fed to the input circuit of a pair of gates 324, 326. It will be noted that the input to the gates 324, 326 are also interconnected with the output circuit of the flip-flop 316.

The output of the gate 324 is connected to an output terminal which corresponds to the transmit mode output signal, the terminal 328 providing the computer with a transmit mode signal. On the other hand, the output of gate 326 is fed to a terminal 330 corresponding to the sample mode output terminal. Thus, the transmit mode and sample mode signals are generated on output terminals 328, 330. The output of gates 324, 326 are also fed to a pair of inverter gates 332, 334, the output of inverters 332, 334 being fed to a pair of gates 336, 338.

Thus, the sample mode of the output signal is generated and the output terminal of the inverter 334. This signal is also fed to the input circuit of a nand gate 340 which is fed the negative signals from the HA1F input terminal, HA2F terminal and HA4F terminal 342, 344, 346 respectively. The gate 340, through an expander connection, is fed the peak signal generated in conjunction with the operation of the curcuit of FIG. 2, by means of a conductor through a diode 348. The peak signal is fed through the gate 340 to the convert command output gate 350.

The sample mode signal is generated at the output of inverter 334, the signals on terminals 342, 344 and 346 indicating that the initial condition exists, and a peak signal is generated through the diode 348. This will cause an output signal to be generated on the conductor 352 to generate the convert command signal at output terminal 354. This convert command signal on conductor 354 is fed to the analog to digital converter to signal the converter to start the conversion. When the convert command is generated, the analog to digital converter will generate a status signal which is fed back to the circuit of FIG. 3 on the conductor 356. This status signal coming from the analog to digital converter goes low when the analog to digital converter is ready to convert and goes high when the analog to digital converter is not ready. Thus, when the convert command is generated and fed to the analog to digital converter, the status signal will go high until the analog to digital converter is finished with the converting operation. At this time, the status signal will then go to a logical low level.

When the status signal goes low, the status signal is fed to the input of the gate 338. When the gate 338 is in the sample mode and the status signal goes low, the gate 338 will generate an output signal which will cause a step head address gate 358 to provide an output signal at the output terminal thereof. This will cause the step head address signal to step ahead to the next position in the sequence of sampling.

The output of gate 338 is also connected to the input circuit of a shift data gate 360, which gate 360 includes an input signal from the gate 362. The shift data signal is utilized to shift the data from the head into the shift registers to be described hereinafter.

Accordingly, when the status signal goes low, again the heads are incremented by incrementing the mulitplex control counters to the next head. At the same time, the shift data signal is generated when you're in the sample mode to clock the shift registers and shift the data that's coming out of the analog to digital converter into the shift registers.

The status signal is also fed to a gate 364, the output of the gate 364 being fed to the input circuit of a first single shot multivibrator circuit 366 and a second single shot multivibrator circuit 368. It is to be noted that the next analog switch is turning on with the falling edge of the status signal. The single shot multivibrator circuits 366, 368 provide time for the circuitry receiving the convert command signal from the gate 352 to settle down and avoid any transients which may be present. When the next convert command signal is generated, the analog to digital converter causes the conversion of data and subsequently generates a status signal. The status signal is then utilized to step the head until the complete sequence of heads has been sampled.

When the seventh sample is taken, the single shot multivibrators 366, 368 time out to provide a convert command at the output conductor 354. The analog to digital converter circuit provides a status signal on conductors 356, which status signal goes from high to low. With the low signal, the head address is stepped to address number seven which actually is the eighth sample. This stepping shifts the data. However, during the taking of the eighth sample at head position number seven, the inputs to the gate 310 are such that the output terminal, and thus conductor 370 is low which effectively disables gate 364 to preclude any more pulses from activating single shot multivibrators 366, 368. However, these multivibrators have already been previously actuated for the eighth reading. Thus, the first multivibrator 366 times out for forty microseconds and the second single shot multivibrator 368 times out for one microsecond. With the timing out of the single shots 336, 368, the analog to digital converter is provided a convert command by means of conductor 354 and the status signal level on conductor 356 again goes low which steps the head values one more time to get the head address back to zero. At the same time the last sequence of data is shifted into the shift registers and the state control counter is switched to the transmit mode. This latter function is accomplished by line 312 going low which causes the gate 308 to provide an output signal to switch the modulo three counter 302 to the transmit mode of operation.

Once this system is in the transmit mode, a data ready signal is generated by output gate 372 on conductor 374, which data ready signal switches from high to low when the system is switched from the sample to the transmit mode of operation. Accordingly, with the system in the transmit mode, the data ready signal goes low to signal to the computer that the data is ready. The system is set up such that the computer provides an increment data signal which is fed to the output gate 362 by means of gates 360 to shift the data. Simultaneously, the increment data will disable gate 372 since a subsequent data ready is not generated during the time that the data is being shifted.

The shift data signal is the control signal that actuates the shift registers to move data into or out of the shift registers depending on the conditions of whether data is being sampled or data is being transmitted. When the system is in the sample mode, data is shifted into the shift registers and when you are in the transmit mode the data is shifted from the shift registers into the computer. With the data in the shift registers, the computer generates a transmit pulse on an input conductor 376, which pulse is fed to the input circuit of the gate 336, the output of which is connected to a transmit data output inverter 378. This inverter generates a transmit data pulse on an output conductor 380, the transmit pulse being connected to the shift registers.

When the computer generates the transmit pulse, and particularly on the rising edge thereof, data is taken from the shift registers and placed into the computer. On the falling edge, the computer reads the data from the input interface into the storage area of the computer.

Figure 4:
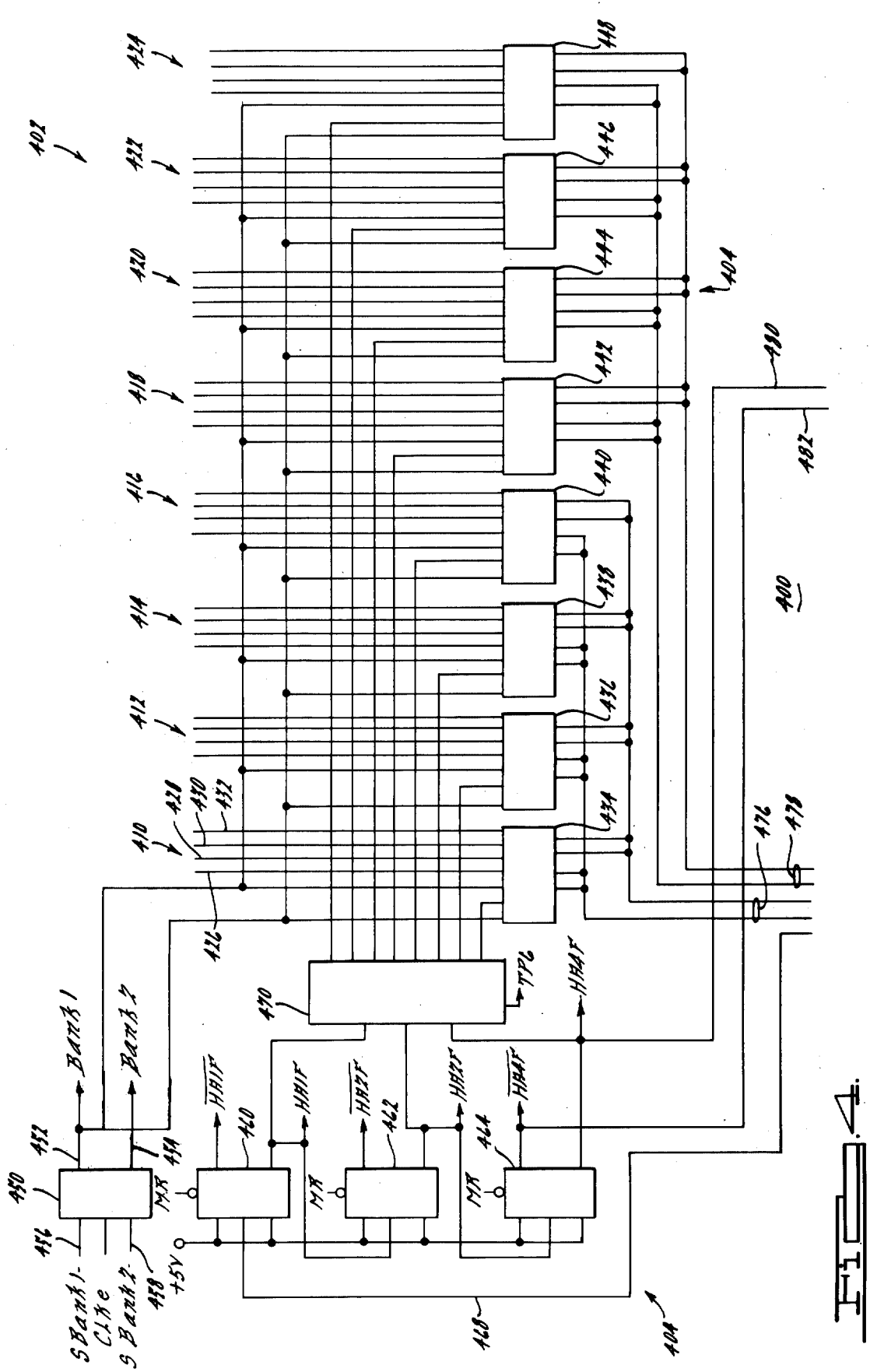
FIG. 4 is a schematic diagram illustrating the details of the multiplexer control circuit and the analog multiplexer circuit incorporated in the system of the present invention.

Referring now to FIG. 4, there is illustrated a circuit 400 which includes a plurality of leads 402 connected to the respective heads to sense the voltage and current at each welder head, the system further includes a plurality of analog multiplexer switches 404 which are adapted to switch the head from which particular data is being sensed. This switching is accomplished in response to the multiplexer control circuit 404, which multiplexer control circuit is incremented in response to the step head address signal described in conjunction with the description of FIG. 3. The system further includes an analog to digital converter and a shift register circuit which will be described in conjunction with FIG. 5.

The specific details of the system include a plurality of bank one and bank two voltage leads 410, 412, 414 and 416, and bank one and bank two current leads 418, 420, 422 and 424 corresponding to heads one through eight respectively, which in turn correspond to head addresses zero through seven respectively, each of the leads in the groups of conductors 410 – 424 include a current limiting resistor and include, referring specifically to the group 410, a pair of bank one voltage sensing leads 426, 428 and a pair of bank two voltage sensing leads 430, 432. This same grouping holds true for each of the remaining groups of leads 412 – 416. Also the bank one - bank two grouping holds true for the current sensing leads 418 – 424.

Each of the groups of leads 410 – 424 are fed to a plurality of analog switches 434 – 448, respectively. The analog switches 434 – 448 are capable of switching from head to head and from bank to bank depending on which bank is being welded at the time.

The bank switching is accomplished by means of a bank one, bank two flip-flop 450 which provides a bank one output signal on a conductor 452 and a bank two signal on an output conductor 454. The switching from bank one to bank two is accomplished by means of input signals generated at the input conductors 456, 458 which signals are inputted to the flip-flop 450 by means of clock pulse fed to the center conductor. The output signals on conductors 452, 454 are fed to each of the analog switching units 434, 448 to enable certain portions of the switching units 434, 448 in response to the bank one or bank two welding signal. The bank one or bank two signal is generated within the computer and is utilized to control this particular portion of the system.

Referring now to the multiplexer control circuit 404, there is illustrated a counter including a plurality of flip-flops 460, 462, 464 which are utilized to generate the HA1F, HA2F and HA4F signals. The negative signals are also generated at the ultimate output terminal of the flip-flops 460, 462, 464 respectively. Each of the flip-flops 460, 462, 464 is reset to initialize the flip-flops by means of a machinery reset signal fed at the reset input to the flip-flops 460, 462, 464 as indicated by the designation MR. This signal is generated by the circuit of FIG. 16 to be described hereinafter.

As was stated, the flip-flops are initially reset to zero such that the true output signal is at a logical one level and the signal level from the not true output terminal is at a zero level. When the step head address signal is generated at FIG. 3, an input signal is generated on the input conductor 468 which is fed to the first flip-flop 460. This will cause the incrementing of the counter 404 to provide the first output for selection of the second head. These output signals are fed to a one in eight decoder circuit 470 which takes the binary coded decimal signal being fed thereto by means of the flip-flops 460, 462, 464 and converts these binary coded decimal signals to a decimal output signal. This output signal will activate one of the analog switches 434 – 448, and particularly the first switch 434 in the case of the switching from the initialized to the first state.

After the initial data is sampled from the first head, as sampled by conductors 426, 428 and analog switch 434, the step head address will cause the flip-flops 460 – 464 to switch to the next state to select the second head. This will actuate switch 436 to cause data to be read from the head connected to conductors 412. The output circuits from the switches 434 – 440 are parallel such that the analog voltage data is provided on output conductors 470 and the analog current data is provided on output conductors 472. Accordingly, as each analog switch 434 - 440 is actuated, the corresponding voltage signal, in its analog form, is impressed on output conductors 476. Simultaneously, the analog current data is impressed on conductors 478 corresponding to the particular head which has been selected.

Figure 5:
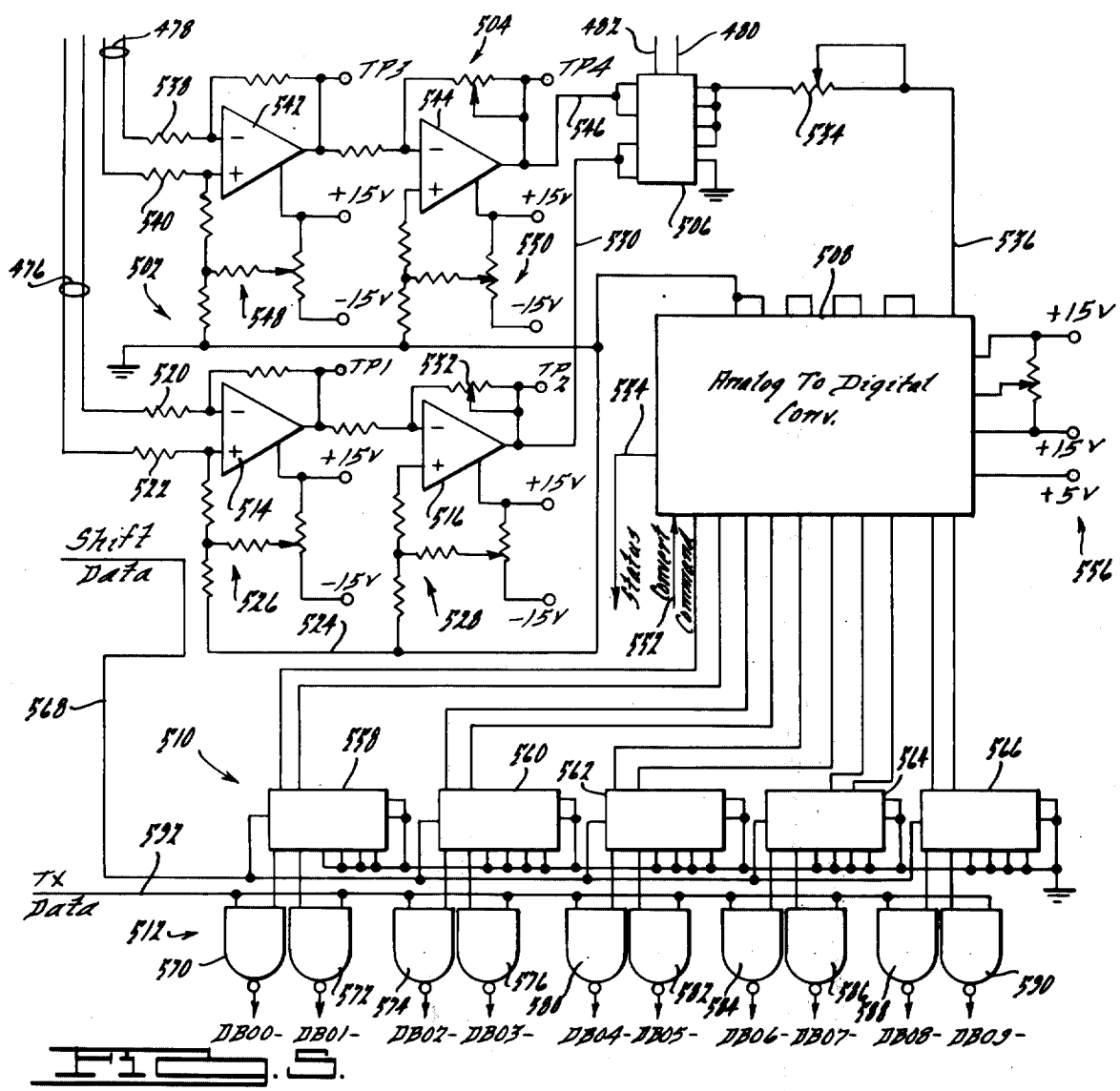
FIG. 5 is a schematic diagram illustrating the details of the analog to digital circuitry and the shift register and gating circuit incorporated in the system of the present invention.

As will be seen from a description of FIG. 5, the voltage and current switching are performed by sensing the change in the HA4F and HA4F signals as impressed on conductors 480, 482. These signals are fed to the circuit of FIG. 5 to provide switching from the voltage to the current in response to the state of the final flip-flop 464. This final flop-flop 464 switch is midway through the sequence to switch from voltage to current midway through the sequence.

Referring now to FIG. 5, it is seen that the voltage conductors 476 and the current conductors 478 are fed to a pair of operational amplifier circuits 502, 504 corresponding to the voltage and current links. The output of the analog amplifier circuits are fed through an analog switch unit 506 which, in turn, controls the feeding of either the voltage or the current to an analog to digital converter circuit 508. The analog to digital converter circuit output is fed to a plurality of shift registers 510 which, in turn, are connected to a plurality of output gates 512.

Referring back to the input circuits, the voltage conductors 476 are fed to a pair of cascaded operational amplifiers 514, 516, which operational amplifiers are connected with a balance differential input on both operational amplifiers. The voltage signal is fed through a pair of resistors 520, 522 to the input circuit of the operational amplifier 516. The output of the operational amplifier 514 is fed to the upper input of the second operational amplifier 516, the lower inputs being tied together by means of a conductor 524 and voltage divider circuits 526, 528. The output of the second operational amplifier 516 is fed to the input of the analog switching unit 506 by means of a conductor 530.

The voltage level at the welding head is approximately two volts worth of signal and thus the operational amplifiers 514, 516 are operated at approximately unity. The amplifier 202 is an adjustable gain amplifier, the adjustment being accomplished by means of the potentiometer 532, the amplifiers 514, 516 being operated in a single ended mode of operation. The output of the amplifier 516 is fed to the analog switch 506 for the sample mode of operation. When the first four samples are taken, the analog switch 506 is actuated such that the output of operational amplifier 516 is connected into the input circuit of the analog to digital converter 508 through the potentiometer 534 and the conductor 536.

For the second four samples, the current samples, the analog switch 506 is switched to its opposite state to connect the signal being fed from the conductor 478 to the conductor 536. This latter signal is fed through resistors 538, 540 to the first operational amplifier 542. The operational amplifier 542 is again connected in a single end of mode of operation, the output of which is fed to a second operational amplifier 544.

The operation of the amplifiers 542, 544 are identical to that described below with the exception that the gain of the amplifier 542, 544 is greater than the gain of the operational amplifiers 514, 516. This is due to the fact that current signal may vary between two-tenths and one-quarter of a volt for the current whereas the voltage signal had a magnitude of approximately two volts or ten times that value. Again, the operation of the amplifiers 542, 544 are varied by means by various resistors 548, 550 and the output of the operational amplifier 544 is fed to the analog switch 506 by means of a conductor 546.

As was stated above, the operation of the analog switch 506 is controlled from the flip-flop 464 described in conjunction with the description of FIG. 4. Thus, the four voltage signals are initially read and then the circuit is switched such that the four current signals are fed to the conductors 536. These signals are fed to the input circuit of the analog to digital converter 508 and are converted in response to the generation of a convert command on the input conductor 552. It will be recalled that the convert command signal was generated in the circuit described in conjunction with the description of FIG. 3 and is seen to be generated from the analog to digital converter and impressed on the conductor 554. Suitable bias for the analog to digital converter is provided by means of terminals 556.

The output of the analog to digital converter 508 is fed to the plurality of shift registers 510, including registers 558, 560, 562, 564 and 566. The operation of the shift registers are controlled by means of the shift data signal generated on the conductor 568, the shift data signal being generated by the circuit described in conjunction with the description of FIG. 3.

In operation, and during the sampling sequence, the four operational amplifiers in the analog to digital converter are active only during the sample interval. They are not operable or active at any other time. As the sampling sequence occurs, it reads first the voltage from welding head number one, then the voltage on welding head number two, the voltage on welding head number three, and finally the voltage on welding head number four. The analog switch 506 then switches and the current is read for each head one, two, three and four. After each data value is presented at the output of the analog to digital converter 508, the data is stored in the shift registers 558, 560, 562 and 566. Accordingly, each time the analog to digital converter derives a bit of data from the welding heads, the shift data signal on conductor 568 is actuated to cause that data to clock into the shift registers. This data is held until such time as the sampling sequence is completed and the computer is ready to take the data value from the shift registers.

When the sampling sequence is completed and all of the data is shifted into the five dual eight bit shift registers 558, 560, 562, 564, 566, the system essentially has a ten bit wide, eight bit long shift register. Thus, each ten bits are clocked into the shift register and moved in parallel until all 80 bits have been shifted into the shift register.

The output of the shift registers is connected to the output gates 512, including the data bit zero through data bit nine gates, 570 – 590. The control of the data being shifted from the shift registers 558 – 566 through the gates 570 – 590 is controlled by a transmit data line 592, the operation of which is described in conjunction with the description of FIG. 3. It will be recalled that the transmit data signal is generated in the computer in response to the system shifting to the transmit mode of operation and a transmit signal being generated in the computer.

Figure 6:
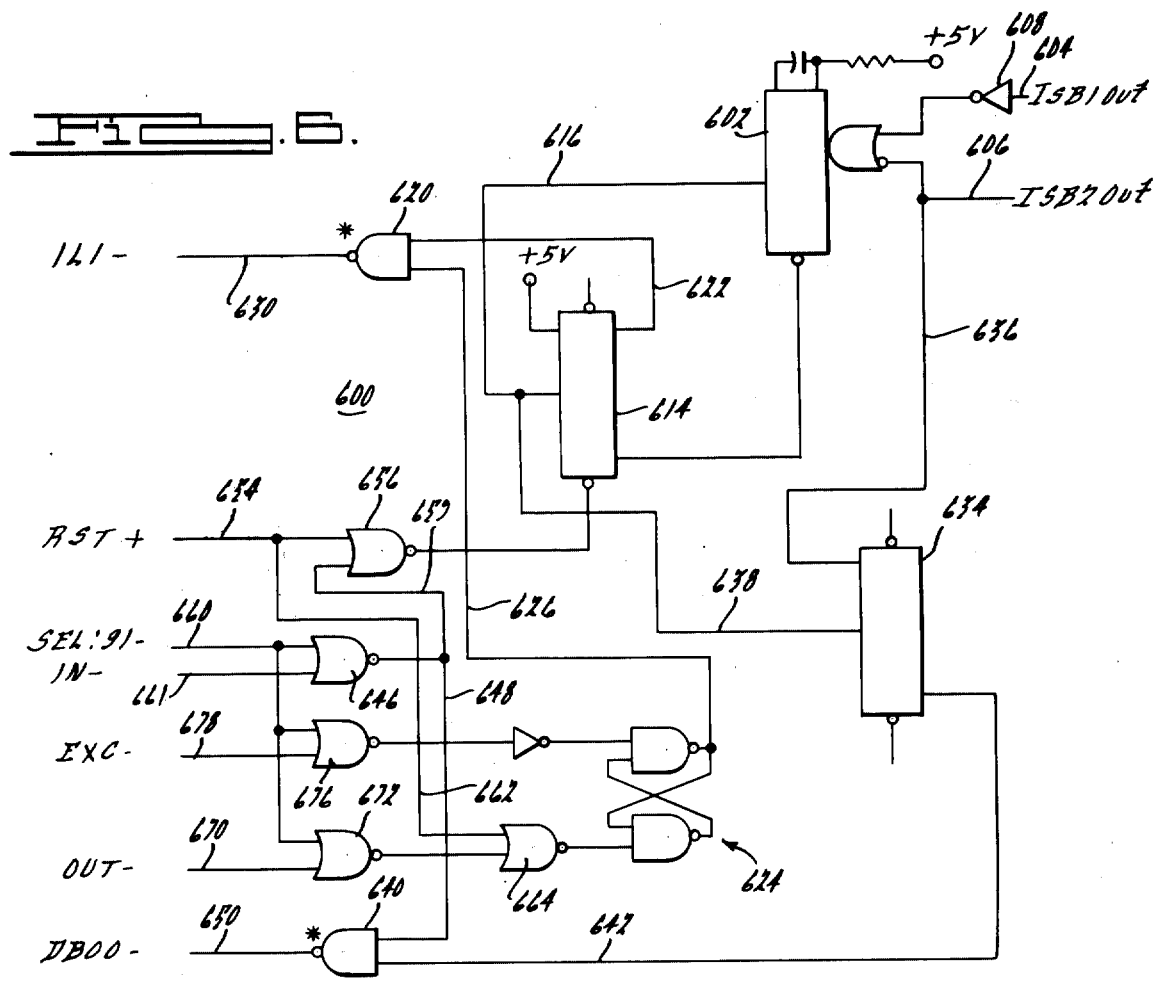
FIG. 6 is a schematic diagram illustrating the details of the start impulse interrupt circuit.

Referring now to FIG. 6, there is illustrated the start impulse interrupt circuit which generates an interrupt signal for use by the computer. This circuit also includes an interrupt disabling circuit which disables the interrupt circuit any time that the computer is performing a function that should not be interrupted.

Specifically, an interrupt circuit 600 includes a single shot multivibrator circuit 602 which is fed by the ISB1 output signal on input conductor 604 or the ISB2 out signal on input conductor 606. The ISB1 out signal is inverted by means of an inverter circuit 608 and fed to the input circuit of the signal shot multivibrator 602. Specifically, the input circuit includes an or gate which is an integral part of the single shot multivibrator 602. The ISB2 output signal is fed directly to the input or gate.

The output of the single shot multivibrator circuit 602 is fed to the clock input of a D flip-flop circuit 614 by means of a conductor 616. This signal, which is about one microsecond in duration, sets the flip-flop 614, the Q output of which is fed to the input circuit of a nand gate 620 by means of a conductor 622.

The other input to the nand gate 620 is fed from an interrupt disable flip-flop 624 by means of a conductor 626, the interrupt disable flip-flop 624 enabling or disabling the gate 620 in response to the operation of the computer. If the signal is such on conductor 626, for example high, the gate 620 is enabled and the output signal on conductor 622 will pass through the gate 620. It will be noted that the D flip-flop 614 responds to the clock pulse fed to the input circuit by means of conductor 616 due to the fact that the D input is tied to a positive five volt potential. When the Q output goes to a logical one state, both of the inputs to the gate 620 will be plus thereby providing a low output at the output conductor 630.

Thus, with the input signal from either ISB1 out or ISB2 out from conductor 604, 606, the interrupt flip-flop will be set to provide an output signal at conductor 630 if the enable flip-flop 624 is set. However, the computer must now know which bank created the interrupt. This is accomplished by a bank indicator flip-flop which signals which bank has generated the interrupt.

If bank one generated the interrupt, the ISB2 input signal 606 would be high. This signal would be fed to the D input of flip-flop 634 by means of a conductor 636. This condition would be clocked into the flip-flop 634 by means of the output of single shot multivibrator circuit 602 through a conductor 638. If the ISB2 out signal was high thereby setting the bank indicator flip-flop 634, the Q output of the flip-flop 634 would be a logical zero level. This logical level is fed to the bank indicator output gate 640 by means of a conductor 642. This information is read by actuating the select 91 gate 646 which provides an enabling signal on conductor 648. When this enabling signal appears, the signal level on conductor 642 will be fed to the data buss output conductor 650.

On the other hand, if it was a bank two interrupt, ISB2 output signals on conductor 606 would be low and the flip-flop 634 will be reset by the output of single shot multivibrator circuit 602. This would provide a logical one input to the gate 640 due to the fact that the Q output of flip-flop 634 would be a logical one. This signal is fed to the computer when the select 91 signal is generated.

After the signal levels of conductor 650 and 630 are read, the computer generates a reset signal. This resetting pulse is generated when the select 91 circuit and the in-signal are active by means of a signal level on conductors 660 and 661. This signal is fed through the gate 646 to conductor 648. This signal is ored with the signal RST and the signal on conductor 654 so that either signal will reset flip-flop 614. The signal RST+ on conductor 654 is also fed to the enable flip-flop 624 by means of a conductor 662 and the or gate 664. This signal will reset the flip-flop 624 in response to the generation of a select 91 signal on conductor 660 and an out-signal on conductor 670. These two signals were ored by means of a gate 664 to enable the reset gate 664.

The enable flip-flop 624 is initially set by means of a gate 676, the gate 676 being enabled by means of the select 91 signal on conductor 660 and an execute signal on conductor 678. The combination of these two signals will initially set the flip-flop 624.

Figure 7:
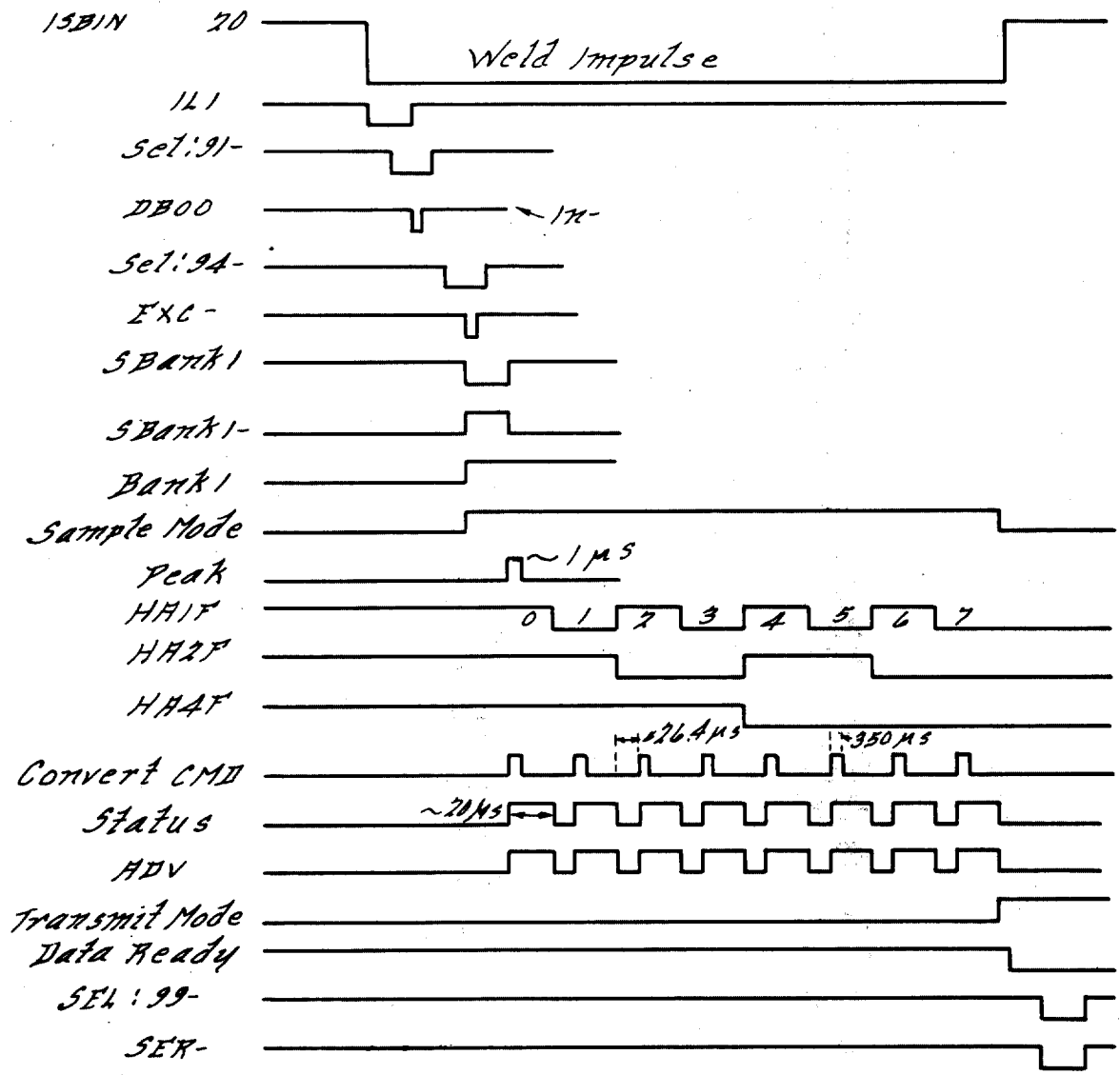
FIG. 7 is a timing diagram which illustrates the timing of the various pulses formed in certain portions of the circuitry of FIGS. 2 to 6.

Referring now to FIG. 7, there is illustrated a timing diagram which is correlated with the operation of FIGS. 2 - 6. For example, it is seen that the weld impulse signal is generated which starts the sequence of pulses flowing through the system. Further it is seen that the executed select 94 and the sample bank signals switch the system to the sample mode of operation. The one microsecond signal is generated to sample the peak pulse fifty milliseconds after the occurrence of the weld impulse. The welding heads are then sequenced by means of the particular combinations of the HA1F, HA2F and HA4F signals to enable the four welding heads within a particular bank. The convert command signal is generated in response to the peak pulse and the analog to digital converter generates a status pulse to be fed back to the control circuit. The advance pulse advances the head number to sense the next bit of data from the subsequent head. After the data has been collected, the system switches to the transmit mode of operation.

Referring now to FIG. 8, there is illustrated a circuit 800 which is utilized to generate the end of weld interrupt signal for use by the computer. Specifically, the circuit includes a bank one input circuit 802 and a bank two input circuit 804 which are utilized to transmit the end of weld signal from the standard welding controller to the output circuit 806. The intermediate circuit includes a bank one flip-flop 808 and a bank two flip-flop 810 which are utilized to store the interrupt signal prior to transmitting the signal to the output terminal. Specifically, the input signal from bank one is fed through a resistor network 812 to a differential comparator circuit 814, which circuit provides an output signal at a node 816 corresponding to the bank one end of weld signal from the standard welding controller. This signal is inverted by means of an inverter circuit 818 and fed to the input of a single shot multivibrator circuit 820. The single shot multivibrator 820 has approximately a one microsecond time constant and produces an output signal on an output conductor 822 corresponding to a one microsecond pulse.

This signal is fed through an or gate 824 to clock an interrupt flip-flop 830. The interrupt flip-flop, when set by the output signal from or gate 824, provides an output signal at the Q output terminal thereof which goes to a logical one in the set state. This output signal is fed to the input circuit of a nand gate 834 by means of a conductor 836, the output of which is impressed on a conductor 840 to provide the interrupt signal if an interrupt enable flip-flop 842 is in the set condition. This provides a logical one signal level on a conductor 844.

The bank two circuit is identical to that described above in that a bank two input signal is fed to an input terminal 848. This signal is fed through a differential comparator circuit 850, the output of which is inverted by means of an inverter circuit 852. The bank two circuit includes a second inverter 854, which was not present in the circuit described above, the output of which is fed to a one microsecond single shot multivibrator circuit 856. The output of the single shot multivibrator circuit 856 is fed to input circuit of the nor gate 824 by means of a conductor 858.

When the output signal is generated on the input conductor 840, the computer, after receiving that signal, generates a reset pulse. This pulse is impressed on input conductor 860 and is fed through the gate 862 to reset the interrupt flip-flop 830 and also to reset the flip-flop 842. The resetting of the flip-flop 842 is accomplished through a gate 864. The gate 864 is also rendered responsive to an input signal from the select 92 input conductor 866 and an out signal on conductor 868. These two signals are anded by means of a gate 870 to enable the gate 864.

The computer also determines which bank generated the interrupt signal, whether it is bank one or bank two. In order to accomplish this, the bank one single shot multivibrator circuit 820, in particular the Q̄ output terminal thereof, is fed to the set circuit of a flip-flop 874 by means of a conductor 876. The Q̄ output of single shot multivibrator 856 is fed to the reset side of the flip-flop 874 by means of a conductor 878. Thus, if the single shot multivibrator circuit 820 provides an output pulse due to the bank one end of weld interrupt signal, the flip-flop 874 will be set. On the other hand, if it was the bank two signal which caused the interrupt, the flip-flop 874 will be reset. This set or reset condition of flip-flop 874 is fed to the input circuit of a data buss output gate 880 by means of a conductor 882 connected to the Q̄ output of the flip-flop 874. The input circuit of gate 880 is also connected to the output of an address gate 884, the output thereof being connected to the input of the gate 880 by means of a conductor 886. In this way, the computer can determine which bank generated the end of weld interrupt.

The flip-flop 842 is set to enable state by means of an execute signal generated on an input conductor 890, this signal being fed to the input circuit of the gate 892. The input circuit of gate 892 is also rendered responsive to the address signal of conductor 886. The output of gate 892 is inverted by means of an inverter gate 894 and fed to the set side of flip-flop 842. Thus, the flip-flop 842 is initialized to the set state to enable the interrupt output gate 834.

Figure 9:
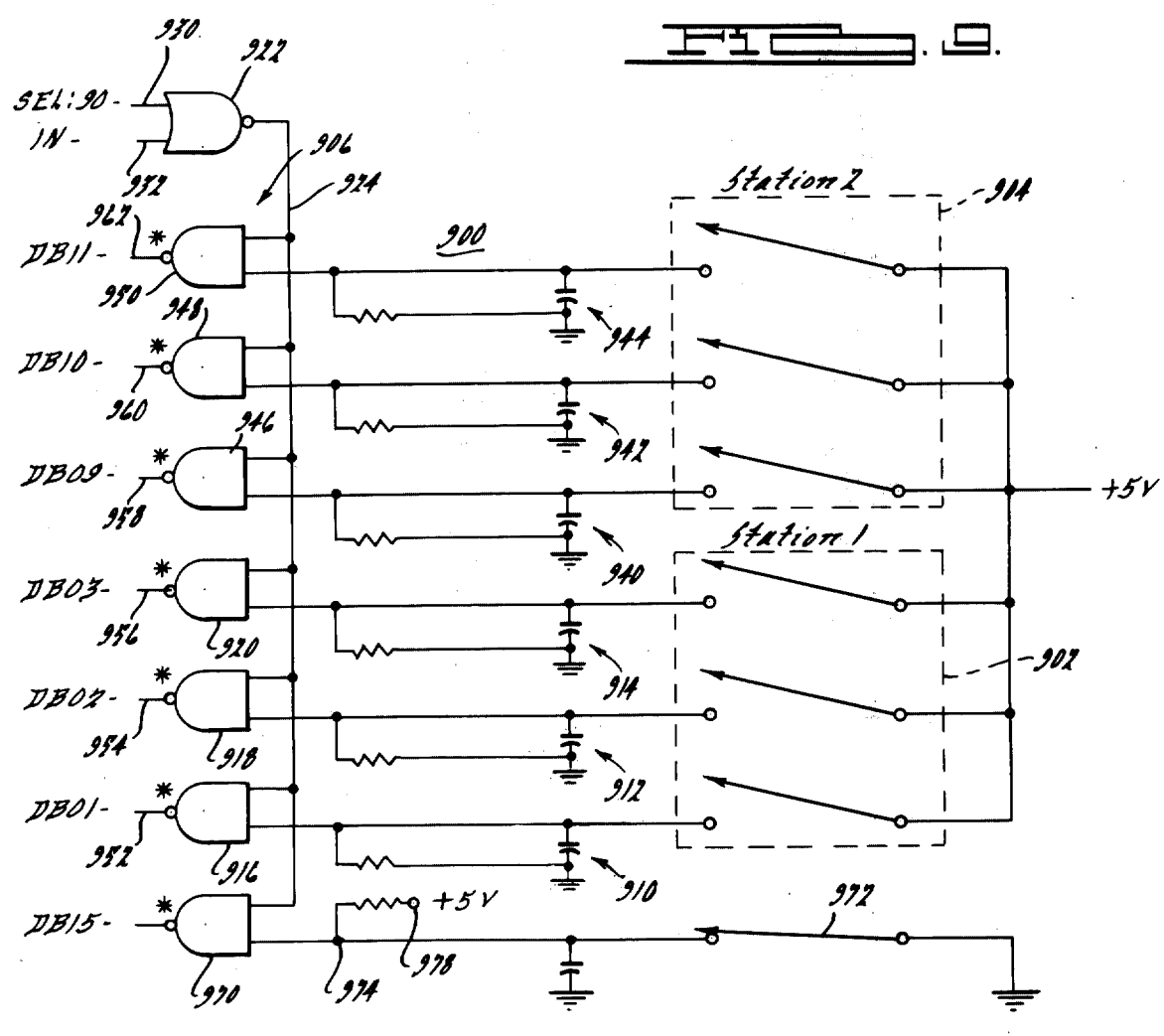
FIG. 9 is a schematic diagram illustrating the thumb wheel circuitry incorporated in the system of the present invention.

Referring now to FIG. 9, there is illustrated a circuit 900 which is utilized to provide an input signal to the computer to signal the computer the number of pulses the computer may lengthen the heat time. The circuit 900 includes a pair of binary coded decimal switches 902, 904 which are typically in the form of thumbwheel switches which input binary coded decimal data into the system by means of a plurality of gates 906. The switches have been connected to provide input signals which include the even digits, for example 0, 2, 4, 6 and 8. The switches are only coded for the even numbers to insure that the heat cycle is lengthened by an even number of pulses to preclude the tranformer from becoming unbalanced. A welding transformer imbalance would occur if an odd number of pulses were set into the switches 902, 904. The output of the switches 902 are fed, by means of three RC timing circuits 910, 912, 914 to individual gates 916, 918 and 920. The input of the gates 916, 918, 920 is also fed with an enabling signal from an enable gate 992, the output of which is connected to the gates 916, 918 and 920 by means of a conductor 924.

The input of gate 922 is connected to the computer and is enabled in response to a select 90 address which is a select device address, as impressed on input conductor 990, and an input signal as impressed on input conductor 932. With both of these signals true, the input signal indicating that the computer is doing an input operation, the conductor 924 is provided with a signal which will enable gates 916, 918 and 920.

The switch 904 is connected in an identical manner whereby the output conductors are connected to a second plurality of RC filter circuits 940, 942, 944. These circuits are, in turn, fed to the input circuits of a plurality of gates 946, 948, 950. The output of gates 916 – 920 and 946 – 950 are connected to a plurality of output conductors 952, 954, 956, 958, 960 and 962, which output conductors are fed to the input circuit of the computer to signal the proper number of lengthen heat pulses.

A further gate 970 is provided, the gate 970 also being fed with the enabling input signal from the conductor 924. The input circuit of the gate 970 is further connected to a switch 972, which switch is grounded at one end thereof and the other end is fed to the input circuit of gate 970 through a node 974. If the switch 972 is open, the node 974 is connected to a positive five-volt source of potential at input terminal 978. If the switch 972 is closed, the node 974 is grounded through the switch 972. This provides the computer with additional information, particularly, the switch 972 signals the computer whether to float data limits with time or not to float the data.

Referring now to FIG. 10, there is illustrated a circuit 1000 which may be referred to as the welder impulse control circuit and is utilized to provide the lengthen heat and shorten cool functions of the system of the present invention. The circuit of FIG. 10 will be described and then the timing diagrams of FIGS. 11 and 12 will be described, which FIGS. 11 and 12 describe the timing operation of the circuit of FIG. 10. Basically, the heat input interval in the sciaky controller is controlled by a counter which is incremented at a 60 hertz frequency from pulses derived from one phase of a 3-phase 60 hertz power line. The circuit of FIG. 10 actually fools the standard welder controller into believing that either a certain number of pulses have been generated, those pulses are generated within the standard controller and passed directly through without being affected by the system of the present invention or the number of pulses generated by the standard controller are modified. In the former case, the heat and cool cycles are left unchanged. If a heat cycle is to be lengthened, a standard controller generated pulse is absorbed by the system of the present invention so that the heat cycle is left on for a longer period of time in order to count the number of pulses required by the standard counter before the heat cycle is turned off. On the other hand, if the cool cycle is to be shortened, a pulse is generated within the system of the present invention and fed to the standard controller. This latter externally generated pulse is counted by the standard controller as though it were generated by the 60 hertz source. This fools the standard controller into operating as though a greater period of time has actually passed, thereby shortening the cool cycle.

Stated another way, the system of the present invention either masks off pulses generated by the standard controller to slow down the counting rate and thereby increase the heat cycle or it generates an extra counting pulse to speed up the counting rate of the standard counter to shorten a cool interval.

Basically, the circuit 1000 consists of two parts, that is, the lengthen heat circuit 1002 and the shorten cool circuit 1004. These circuits are interconnected with the standard controller by paralleling the nor gate between the pulse generating circuit of the standard controller and the pulse counting circuit of the standard controller. The input of that nor gate is connected to the input of the welder impulse circuit 1000 and the output of the welder impulse control circuit 1000 is connected to the output of that nor gate.

The standard welder controller is a counter that does not respond to signal levels but rather responds to level changes, that is, falling and rising edges and particularly to a transition from a high logic level to a low logic level. This transition has to be a fairly rapid transition due to the fact that the input of the standard controller interval counter is capacitively coupled so that it only responds to sharp edges.

Referring particularly to the details of FIG. 10, it is to be understood that FIG. 10 is the illustration for bank one and it is to be understood that there is a duplicate circuit provided for bank two.

Referring to the particular details of the system, the input circuit includes a conductor 1006 which is connected to the input circuit of the nor gate described above in conjunction with the description of the standard controller. This input conductor feeds hundred microsecond duration pulses, which pulses are 16 milliseconds apart, to the input circuit of an input comparator 1008. The input comparator 1008 is provided with the necessary source voltage connections to the positive and negative source of fifteen-volt potential and to a five-volt potential at input terminal 1010. The output of the comparator 1008 is fed through a pair of inverter circuits 1012, 1014, the output of the inverter 1014 being fed to the input circuit of an enable single shot multivibrator circuit 1020. The inverters 1012 and 1014 are utilized to clean up the pulses coming from the comparator 1008.

The enable single shot multivibrator circuit 1020 provides an output signal at the $\overline{Q}$ output thereof which is fed to the input circuit of a gating flip-flop 1024. The signal goes from a logical zero to a logical one level 4 milliseconds after cool counting pulse has occurred to set the gating flip-flop. Assuming that the computer has decided to shorted a cool interval, and the gating flip-flop is set due to the fact that the enable single shot multivibrator circuit 1020 has been fired and the gating flip-flop will provide the output signal at its Q output conductor 1028.

This assumes that the computer has decided to shorten a cool cycle which is indicated by means of a signal fed to an input conductor 1030, the input conductor being connected to a gate 1032 which is provided with an execute input conductor 1034. With both input conductors 1030 and 1034 in the proper state, the output of gate 1032 will be inverted by means of an inverter circuit 1036 to set a holding flip-flop 1040. The holding flip-flop is set sometime during the computer program cycle irrespective of when it occurs prior to the occurrence of the cool portion of the weld. Accordingly, with the holding flip-flop set to the set state, the gating flip-flop 1024 will pass the rising signal level on a conductor 1042 through to the output conductor 1028. This signal level is fed to the input circuit of a single shot multivibrator circuit 1046. This single shot multivibrator circuit performs two functions. It has a time constant of approximately 120 microseconds which is approximately the same length of times as a normal counting pulse being generated within the standard controller. The output signal of the Q output terminal of the single shot multivibrator 1046 is fed back to a reset gate 1048 by means of a conductor 1050. This reset gate is utilized to reset both the holding and gating flip-flops 1040, 1024, respectively. These gates are reset to their original state so that on the next cool interval the computer can direct that another shorten cool cycle be generated.

In addition, the same 120 microsecond pulse is fed through a nor gate 1054 by means of a conductor 1056, the output of the nor gate being fed to the gate electrode of a switching transistor 1058. The switching transistor 1058 is utilized to generate an additional counting pulse which is fed to the input of the standard controller to shorten the cool interval, this pulse being fed thereto by means of an output conductor 1060.

To reiterate, and in particular concentrating on the operation thereof, the computer designates that a cool interval will be shortened by generating a shorten cool pulse on input conductor 1030 and an execute pulse on conductor 1034. These pulses set the holding flip-flop 1040, the output of this holding flip-flop 1040 setting the gating flip-flop 1024 to a state such that an input signal fed to the clock input thereof will be passed through to a single shot multivibrator circuit 1046. Upon the generation of the counting pulse in the standard controller connected to input terminal 1006, the enable single shot multivibrator circuit 1020 is actuated to generate a four microsecond pulse, which pulses pass through the gating flip-flop 1024. This gating flip-flop triggers the single shot multivibrator 1046 which provides an input signal to the transistor 1058. The transistor 1058 is connected to generate an additional pulse at output conductor 1060. This conductor 1060 is connected at the output terminal of the nor gate discussed in conjunction with standard controller circuit, which, therefore, connects the conductor 1060 to the input of the standard controller.

The amount of time that the gating flip-flop 1024 remains in the set state is a very small period of time and particularly the time is equal to the propagation delay of the single shot multivibrator 1046 and the gate 1048. The four millisecond period has been selected to insure that the added pulse is spaced from the normal pulse generated by the standard controller. The normal period for the standard controller pulses is approximately 16 milliseconds and the pulse generated by the single shot multivibrator 1046 occurs approximately eight milliseconds or 180° out of phase on the 60 cycle signal of the original counting pulse. With regard to the originally generated pulse, it will be recalled that the pulses pass through the nor gate discussed above in conjunction with the discussion of the standard controller. This pulse is merely passed through the nor gate and the additional pulse added by the transistor 1058 is inserted into the stream of pulses passing through the nor gate at the output of the nor gate.

The lengthen heat circuitry 1002 operates by masking a pulse that is generated within the standard controller and being passed through the controller nor gate. This masking operation is accomplished by clamping the output circuit of the nor gate to ground for a preselected period of time to absorb one or more of the pulses being generated within the standard controller. Thus, the counter within the standard controller does not sense the masked pulse and therefore does not count that pulse. Accordingly, the standard controller acts as though the pulse had not been generated and it waits for a sufficient number of pulses which has been present into the system to be generated before the heat cycle is terminated. By masking pulses, it takes longer for the counter to reach its full count and thus the heat interval is lengthened. The lengthen heat circuit differs from the shorten cool circuit in the sense that it can mask several pulses in sequence while the preferred embodiment of the shorten cool circuit is devised to only add one pulse between two pulses generated in the standard controller.

Referring now to the remaining portion of FIG. 10, which relates to the lengthen heat portion of the circuitry, the computer generates a lengthen heat signal, which signal is fed to the input of a gate 1061 by means of a conductor 1062. The computer also generates an execute signal, which signal is fed to conductor 1064 to cause the gate 1061 to generate an output on a conductor 1066. The signal on conductor 1066 is utilized to increment a limit counter 1067 and an interval counter 1068. The limit counter is utilized to limit the number of times you can mask a pulse, thus limiting the amount of time you can lengthen the heat portion of the cycle.

This limiting is accomplished by setting the limit counter to the particular desired limit and then the limit counter is incremented until the desired number of lengthen heat pulses are masked. Upon reaching this level, a signal is provided at a gate 1070, which gate is connected to the input circuit of a gate 1072. That gate 1072 is utilized to pass pulses from the gate 1061 to the limit counter 1067 and the interval counter 1068. With a signal generated at the output of gate 1070, the gate 1072 is disabled, thereby precluding any further pulses from passing through the gate 1072.

The limit counter is loaded with the preselected number by a single shot multivibrator 1073, which single shot multivibrator is actuated when the ISB1 out signal is generated on an input conductor 1074. This signal is fed through an inverter gate 1075 and then is fed to the input of single shot multivibrator circuit 1073 by means of a conductor 1076. Thus, the counter is loaded with the preselected number when the cool cycle is just ending and the system is going into the heat portion of the cycle.

The output signal from the single shot multivibrator 1073 is actually a clocking signal which clocks the setting of a plurality of switches 1077 into the input of the limit counter 1067. Thus, the operator would set the switches 1077 to a particular combination of open and closed switches. This combination is sensed by the limit counter and set into the limit counter when the clock pulse is generated from the single shot multivibrator 1073. This clock signal is generated when the ISB1 (start heat impulse signal) transitions from a high to a low level indicating the initiation of the heat interval.

Upon initiating the lengthen heat portion of the cycle, the output of the nand gate 1070 is high because the output of the counter 1067 connected thereto is low due to the fact that the maximum count has not been reached. Accordingly, the nand gate 1072 is enabled so that pulses from gate 1061 can pass through the gate 1072.

Accordingly, the first lengthen heat pulse goes through gate 1061, through gate 1072, to increment the limit counter 1067 from, for example, 13 to 14 count. The pulse from gate 1072 also increments the interval counter, for example, from a zero to a one count. The second pulse then passes through gate 1061 and gate 1072 to increment the limit counter 1067 and the interval counter 1068 from, for example, 14 to 15 and 1 to 2, respectively. In the preferred embodiment, the counter 1067 is set to run at a limit of two lengthen heat pulses. Accordingly, when the counter 1067 reaches a count of 15, the output therefrom will cause gate 1070 to go low thereby disabling gate 1072. Accordingly, any further lengthen heat pulses from gate 1061 will be precluded from passing through gate 1072.

Referring particularly to the interval counter, the counter is initialized at a zero count and all of the outputs are at a logical high level when the count on the interval counter is zero. When the counter 1068 is incremented, one of the outputs goes low, which low output is fed to a nand gate 1078, the output of which goes high whenever the interval counter 1068 has a count other than zero.

The interval counter 1068 is reset to zero at the end of each heat portion of the welding cycle. The standard welder control pulses during the heat portion of the cycle are fed to the input circuit of the interval counter 1068 by means of a gate 1080 and a nand gate 1082. It will be remembered that the lengthen heat pulses from the computer are also fed to the interval counter 1068 by means of the gate 1072. Thus, the interval counter is incremented in accordance with the count received from the computer due to the lengthen heat pulses and decrements by the pulses from the standard welder controller by means of gates 1080, 1082. As long as the counter 1068 is not zero, the output of gate 1078 will be at a logical high level to enable gate 1082. The output of gate 1078 is also fed to the input circuit of a latch flip-flop 1084 by means of a conductor 1086. This actuation of the counter 1068 from a zero count to any other count permits further pulses to be passed through to the counter until such time as the counter 1068 is decremented and again reaches zero. This will disable gate 1082 to preclude any further pulses from passing to the interval counter 1068.

The normal counting pulses from the standard controller do not pass through the gate 1080 except during the time that the ISB1 out input at conductor 1074 is a logical low level, that is, the system is in a heat interval.

Accordingly, with the clock input of latch flip-flop 1084 enabled by gate 1080, pulses are passed through the standard controller nor gate except when the interval counter provides an input to the data terminal of the latch flip-flop 1084 by means of conductor 1086. The latch flip-flop is the device which controls the conductive condition of an output transistor 1088. The turning on of the transistor 1088 causes conductor 1060, connected to the nor gate in the standard controller, to be latched down such that the pulses will be grounded instead of being counted by the standard controller.

In operation, the computer provides a lengthen heat pulse which is fed to the counter 1068 and particularly to the count up input thereof. This increments the interval counter 1068 to a count which is equal to the number of pulses which are to be masked from the standard controller. The standard controller then provides input pulses to the count down input of interval counter 1068 through the gate 1082. As long as the counter 1068 is not at a zero count, the output of gate 1078 will be at a logical high level which is fed to the gate 1082 and the latch flip-flop 1084. The pulses from the standard controller are fed both to the latch flip-flop 1084 and to the gate 1082. As long as the interval counter 1068 is at a count other than zero, the output of gate 1078 is high to preclude the standard pulses from being fed through the latch flip-flop 1084. Simultaneously, the standard controller pulses are fed through gates 1080 and 1082 to the count down input of interval counter 1068. This causes the interval counter 1068 to decrement until such time as the interval counter 1068 is decremented to a zero count.

Upon reaching the zero count, the gate 1078 disables gate 1082 and provides an enabling signal to the data input of the latch flip-flop 1084. This enabling signal permits pulses from the standard controller to pass through the nor gate in the standard controller due to the fact that the output thereof is not grounded by the latch flip-flop 1084. The latch flip-flop 1084 causes the transistor 1088 to relieve the ground signal from the conductor 1060 thereby permitting the standard controller to count the pulses generated therein in a normal fashion.

Referring now to FIG. 11, there is illustrated a timing diagram which demonstrates the operation of the lengthen heat cycle and the circuitry described in conjunction with the description of FIG. 10. Specifically, the first timing diagram illustrates the series of pulses generated within the standard controller which are used to time the heat portion of the cycle. These pulses are generated and impressed immediately before the nor gate within the standard controller. The second timing diagram illustrates the timing pulses at the output of the nor gate, these pulses being unmodified by the system of the present invention.

The A diagram illustrates the pulses generated by the computer to lengthen the heat cycle. As seen from diagram A, the computer has commanded that the heat cycle be increased by two counts. The two negative going pulses illustrated in diagram A are the two pulses that are fed to the input conductor 1062 and which ultimately increment the interval counter 1068 of FIG. 10.

As was described above, the interval counter 1068 will be moved from a zero count to a count of two by the increased heat pulses generated from the computer. This causes the output of gate 1078 to rise to a high level as illustrated in curve B. This curve remains at that level until the pulses generate within the standard controller again decrements the interval counter 1068 to a zero count. Accordingly, the two pulses in curve A will cause the counter 1068 to move from a zero to a two count and the subsequent two pulses from the standard controller illustrated in the uppermost figure which occur after the two pulses from the computer will then decrement the interval counter to a zero count. Curve C illustrates the operation of the latch flip-flop output 1084 wherein the combination of the output of gate 1078 and the generation of a pulse within the standard controller causes the latch flip-flop to switch to its opposite state. When the standard controller generates another pulse after the interval counter output has dropped back to zero, the latch flip-flop 1084 output will again drop back to the normal state.

Curve D indicates the output of the nor gate as pulses are fed to the counter within the standard controller. As is seen from diagram D, the first pulse generated by the standard controller passes through the nor gate. However, the second pulse generated by the standard controller causes the above operation to occur which holds the output of the nor gate at the logical zero level. This state remains until the latch flip-flop output has again risen to a logical one level. Upon this occurrence, the output of the nor gate is released to permit pulses generated within the standard controller to pass through the nor gate and be counted by the standard controller.

Referring now to FIG. 12, there is illustrated a timing diagram for the shorten cool portion of the cycle. In this case, the system of the present invention generates additional pulses to be counted by the standard controller thus causing the standard controller to count more pulses than were generated within the standard controller. In this way, the timing period for the cooling portion of the cycle is reduced.

As was the case with FIG. 11, the first two diagrams illustrate the pulses generated within the standard controller and fed to the input circuit of the nor gate within the standard controller and the unmodified pulses as seen from the output circuit of the nor gate, the pulses being of opposite polarity. Timing diagram L illustrates the pulse configuration of the enable single shot multivibrator circuit 1020, the pulses from the enable single shot multivibrator being correlated with the pulses being generated within the standard controller. As was seen from the description of FIG. 10, these pulses are generated by the standard controller and fed to the enable single shot multivibrator circuit 1020. Curve F illustrates the operation of the holding flip-flop 1040 as it is controlled by the computer in response to the shorten cool command generated within the computer. As was stated above, only one shorten cool pulse is generated within the computer to shorten the cool cycle in the preferred embodiment of the present invention.

The diagram M illustrates the operation of the gating flip-flop as it correlates signals from the enable single shot multivibrator circuit 1020 and the holding flip-flop circuit 1040. The correlation of these two output circuits causes the gating flip-flop to switch from a logical zero to a logical one level. This pulse is fed to the pulse added circuit 1046, which pulse adder circuit generates an output pulse of a 120 microsecond duration. This output pulse is fed to the output circuit of the nor gate within the standard controller by means of the gate 1054 and the transistor 1058. Thus, an additional pulse is fed into the stream of pulses being fed from the nor gate within the standard controller.

Figure 13:
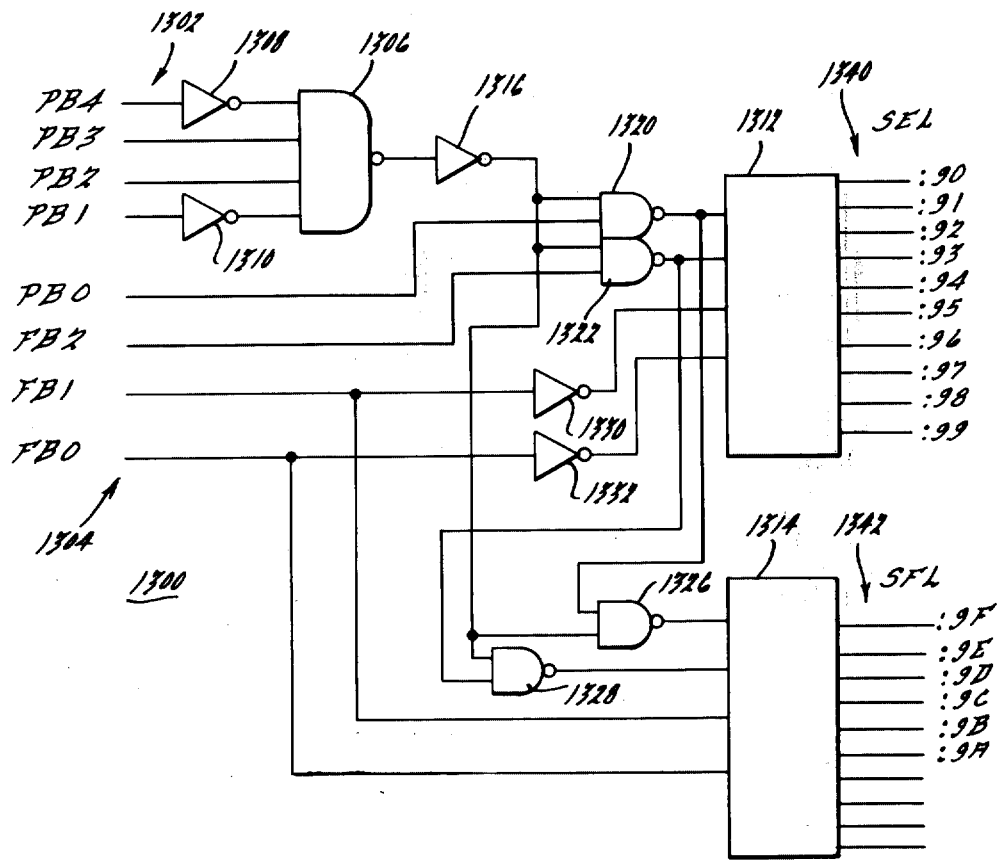
FIG. 13 is a schematic diagram illustrating the details of the device address decoding circuit of the system of the present invention.

Referring now to FIG. 13, there is illustrated a device address decoding circuit 1300 which is utilized by the computer to control the particular device which is desired to be energized and utilized at a particular instant of time. Thus, the computer is able to select a particular circuit within the system by generating one of the output codes designated in FIG. 13. By generating one of the output codes, the signal level on the output circuit goes low to select a particular circuit board within the system.

The computer address device address works in binary bits and particularly in an 8-bit binary configuration. However, the particular circuit to be selected is addressed by means of a binary address to be abbreviated here in the form of hexadecimal numbers, for example, :90, :91, :92, etc. For purposes of this disclosure, a colon preceding an address number or any other number indicates a hexadecimal number. Accordingly, a decoding circuit is required to convert from the binary configuration provided by the computer to the particular configuration required by the particular output circuit to be addressed. The computer generates two 4-bit binary numbers and feeds those 4-bit binary numbers to a first group of 4-bit input conductors 1302 and a second group of 4-bit binary numbers is fed to a second group of input conductors 1304. Taking the first 4-bit grouping of binary digits, the signals fed to input conductors 1302 are fed to a nand gate 1306, the PB4 signal being inverted by means of an inverter circuit 1308 and the PB1 signal being inverted by means of an inverter circuit 1310. The output of the nand gate 1306 is fed to a pair of one in ten line decoders 1312, 1314 through an inverter circuit 1316.

Specifically, the lower order binary address is fed to the upper one in ten line decoder 1312 through a pair of nand gates 1320, 1322. The same signal is fed to the lower one in ten line decoder 1314 by a second pair of nand gates 1326, 1328. The output of the gates 1320, 1322 are also fed to the input circuit of gates 1326, 1328. The lower order binary bits are also fed to the input circuits of the one in ten line decoders 1312, 1314 as illustrated, the FB1 snd FB0 signals being fed through inverter circuits 1330, 1332. With the configuration shown, the one in ten line decoders will decode the binary input numbers being generated by the computer to the hexadecimal address numbers shown and one output line 1340 will go low in response to each set of binary numbers generated. The lower order numbers being generated by the one in ten line decoder 1314 are actually the inversion of the upper numbers generated by one in ten line decoder 1312 to produce the additional six numbers required for the system of the present invention. Thus, the upper one in ten line decoder 1312 generates the first ten numbers and the lower one in ten line decoder 1314 generates the additional six numbers to produce a total of sixteen addresses. The additional four lines in the output conductors 1342 are unused in the system of the present invention.

Figure 14:
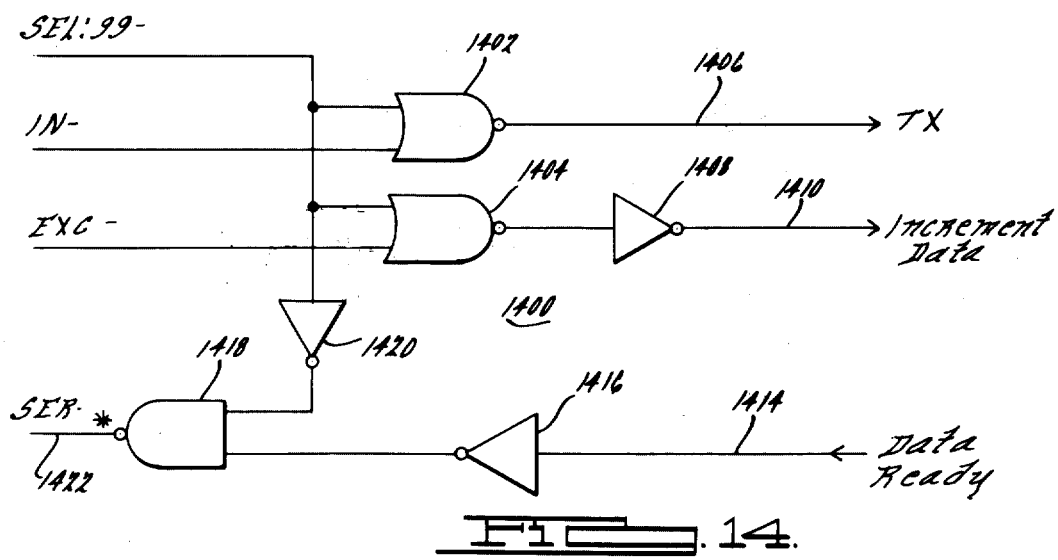
FIG. 14 is a schematic diagram illustrating the details of the increment data and data ready circuitry utilized in the system of the present invention.

Referring now to FIG. 14, there is illustrated a circuit for generating the increment data pulse, characerized in the drawing as the TX pulse, and the SER signal which is generated from the data ready signal. This TX signal is a gating signal that clocks the shift registers to shift the next group of data bits into the interface shift registers. Also, the data ready signal is used to inform the computer that the samples of data have been taken and are in the shift registers ready to be transmitted into the computer.

Referring specifically to FIG. 14, there is the circuit 1400 which includes a pair of nor gates 1402, 1404, the gate 1402 being enabled by a select :99 signal generated in the circuit described in conjunction with the description of FIG. 13. The select :99 signal is also fed to the nor gate 1404 which generates the increment data signal. The output of gate 1402 is transmitted as a TX signal on conductor 1406 and the increment data signal is generated by transmitting the output of nor gate 1404 through an inverter circuit 1408 to an output conductor 1410.

The fact that the data is in the shift registers and ready for transmission is sensed by means of a data ready signal impressed on input conductor 1414, this signal being inverted by means of an inverter circuit 1416. The data ready signal is fed to a nand gate 1418, the gate 1418 also including an inverted select :99 signal from an inverter circuit 1420. The output circuit of gate 1414 is connected to an SER output conductor 1422 which is connected to the computer to inform the computer that the data is ready.

Figure 15:
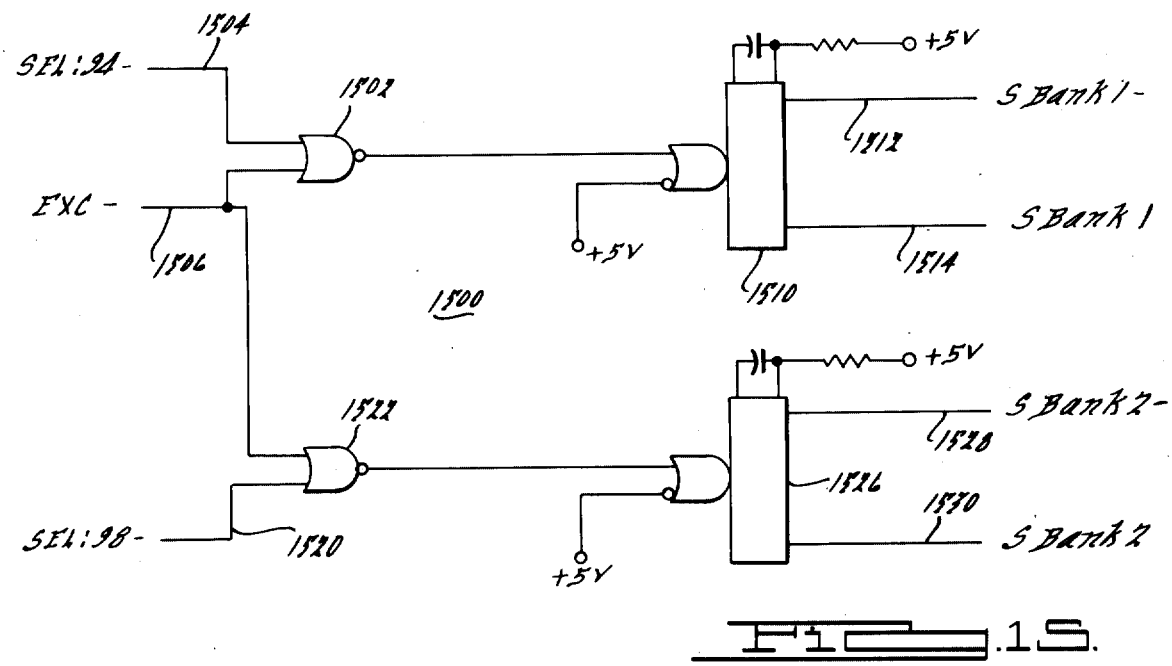
FIG. 15 is a schematic diagram illustrating the details of the sample bank control circuit.

FIG. 15 illustrates a sample bank control circuit 1500 which is utilized to provide the sample bank signal utilized in the sampling circuits of FIGS. 3 and 4. It is these signals that enable the circuitry of FIGS. 3 and 4 to sample the voltage and current signals generated in banks one and two for transmission to the computer. The circuit 1500 is selected by means of a select :94 address in the case of bank one and a select :98 address in the case of bank two.

Referring specifically to the circuit 1500, it is seen that nor gate 1502 is fed a select :94 signal from an input conductor 1504 and an execute signal from a conductor 1506. These signals provide an output signal to trigger a single shot multivibrator circuit 1510 which generates an output pulse of a specific duration, these output pulses being transmitted to an output conductor 1512 corresponding to sample bank one for one polarity signal and a second conductor 1514 for the sample bank one signal of the opposite polarity.

On the other hand, the sample bank two clocking signal is selected by means of the select :98 address impressed on input conductor 1520. This signal is fed to a second nor gate 1522, the input circuit of the nor gate 1522 also being connected to the execute input conductor 1506. The output of gate 1522 triggers a second single shot multivibrator circuit 1526, the upper output of which is connected to a sample bank two output conductor 1528 and the lower output terminal of which is connected to a sample bank two output conductor 1530, the latter conductor having a signal impressed on it which is opposite in polarity to the signal on conductor 1528.

Referring now to FIG. 16, there is illustrated a reset circuit 1600 which is utilized to reset the data gathering interface under the control of the computer. The computer generates a reset pulse which allows the computer, through the device address decoding circuit and an internal signal, to generate a reset pulse to the interface under program control.

Specifically, the circuit includes an input nor gate 1602 which is supplied with an address signal, specifically, select :9F, impressed on input conductor 1604. The gate 1602 is also provided with an execute input signal on a conductor 1606, the output of gate 1602 rising to a logical high when the execute and address signals go low, the time of generation of the MR signal. The output of the gate 1602 is inverted by means of an inverter circuit 1610 and fed to a first nand gate 1612, the nand gate also receiving the reset signal generated within the computer by means of an input conductor 1614. The output of the nand gate 1612 is inverted by means of a nand gate 1620 to provide the MR signal which is the interface reset signal.

Referring now to FIG. 17, there is illustrated a circuit 1700 which is a device address decoding circuit which serves substantially the same function as the circuit described in conjunction with FIG. 13 except that the addresses are not consecutive but are rather arbitrary binary numbers. It is also to be noted that the circuit of FIG. 17 also utilizes the positive and negative going signals for the same binary number, the negative going signal being generated by merely inverting the signal from the computer through an inverter circuit (not shown). The device address decode circuit is utilized to control the operation of various systems withing the overall system of the present invention as, for example, the paper tape reader, the thermal printer, etc.

Specifically, the paper tape reader is controlled by means of a nand gate 1702 which is addressed by means of a plurality of binary coded address input conductors 1704 in accordance with the configuration shown to the left of the conductor 1704. When the proper binary number has been generated within the computer, taking into account the positive and negative forms of the signal, a paper tape reader signal is generated on an output conductor 1706.

Similarly, the thermal printer in controlled by means of a nand gate 1710 which is fed a binary coded address by means of input conductors 1712 which are either directly or indirectly connected to the computer. With the proper binary address being generated within the computer, again taking into account positive and negative signals, a thermal printer address code is generated on an output conductor 1714.

The read error signal is generated by means of a nand gate 1720, the gate 1720 being fed input signals from a plurality of input conductors 1722. Again, with the proper input address, the read error signal is generated on an output cnductor 1724.

Figure 18:
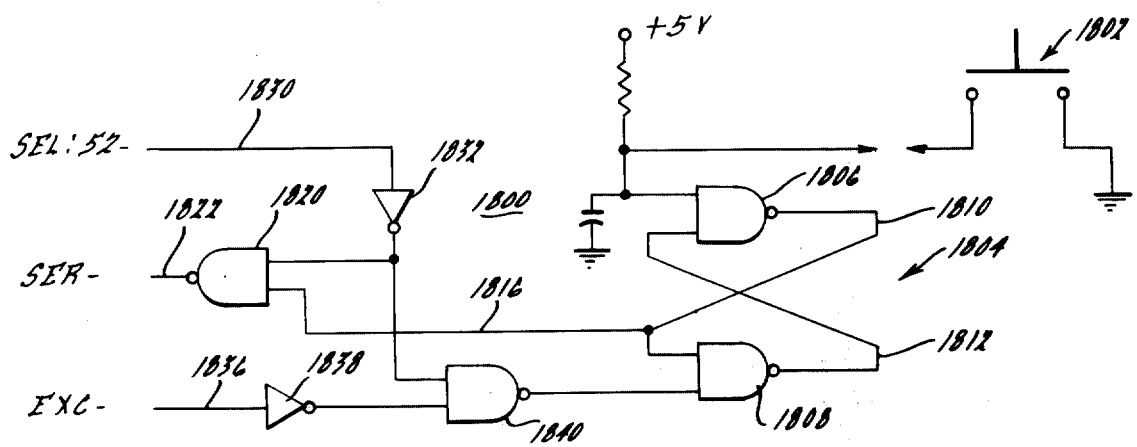
FIG. 18 is a schematic diagram illustrating the new wheel control circuitry for the system of the present invention.

The new wheel control signal to be utilized by the circuit of FIG. 18 is specifically generated by a nand gate 1730 which is fed binary coded input address by means of a plurality of input conductors 1732. The select 52 address corresponding to the new wheel control code is generated on an output conductor 1734, the new wheel address: 52 being fed to the circuit of FIG. 18 to be described hereinafter.

Similarly, the dump and watchday timer coded addresses are generated by means of nand gates 1740, 1742, the gates 1740, 1742 being fed binary coded input signals by means of conductors 1744, 1746, respectively. With the proper binary coded address being generated from the computer and impressed on conductor 1744, an output dump signal is generated on an output conductor 1746. Further, the watchdog timer signal is generated on an output conductor 1748 when the proper binary coded addresses are fed to input conductor 1746.

Two light signals are generated by means of a pair of nand gates 1760, 1762, the gates being energized by signals fed to a pair of four input conductors 1764, 1766. When the proper binary address is generated on the input conductor 1764, 1766, the light signals are generated on output conductors 1770, 1772.

Referring now to FIG. 18, is illustrated a new wheel control circuit 1800 which is utilized by the computer to sense when the new wheel button has been pushed by the operator. As was described above, and will be described hereinafter in conjunction with the description of the software, when it is desired to set up a new set of limits within the computer within which the subsequent welds are to be controlled, the operator pushes the new wheel button and generates a new wheel signal for the computer which will then set up the computer to sense new values and evolve a new curve against which subsequent welds are to be compared.

Specifically, the circuit includes a new wheel button 1802 which grounds the upper input of a flip-flop circuit 1804. The flip-flop circuit includes a pair of nand gates 1806, 1808 which are cross-coupled by a pair of conductors 1810, 1812. When the upper input to the nand gate 1806 is grounded, the flip-flop switches to its set state to provide an output signal on an output conductor 1816. This output conductor is fed to a new wheel nand gate 1820 which provides an output signal to an SER output conductor 1822.

The computer is continually sensing the condition of the flip-flop 1804, as exhibited by the SER signal, by generating the proper address for the new wheel circuit 1800. This address is SEL:52 and the address signal is impressed on input conductor 1830. This signal is inverted by means of an inverter circuit 1832 and fed to the input of the gate 1820. Thus, the combination of the select :52 and the set state of flip-flop 1804 will generate the output signal on conductor 1822. Further, the flip-flop is reset with each machine cycle of the computer by means of an execute input signal fed to input conductor 1836, the signal beng inverted by an inverter circuit 1838 and fed to the input of a nand gate 1840. The nand gate also includes the select :52 input signal as inverted by inverter 1832. The output of the inverter circuit 1840 is fed to the reset input of flip-flop 1804 and particularly to the input circuit of the nand gate 1808.

Referring now to FIG. 19, there is illustrated a malfunction circuit 1900 which is utilized to sense a computer malfunction or a program malfunction, for example, a loss of power, a fuse being blown or some other reasons for the computer failing to maintain a machine cycle which is normal for that computer. The system basically includes a counter circuit 1902, a flip-flop 1904, an input circuit 1906 which is utilized to reset the counter circuit 1902 and a power supply circuit 1910. The output of the system 1900 is fed to a malfunction light output circuit 1912 which signals the operator that a malfunction within the computer or program has occurred.

Specifically, the counter 1902 is a CMOS counter which has a capability of counting to an extremely large number. The input to the counter is supplied by means of the free running multivibrator circuit 1904 which consists of a pair of transistors 1916, 1918. The transistors 1916, 1918 are cross-coupled by a capacitor 1920 as is typical in multivibrator circuits of this type. The output of the multivibrator circuit 1904 is fed to the input of the counter 1902 by means of a nand gate 1924. Thus, as long as the multivibrator 1904 is running and the gate 1924 is enabled, the counter circuit 1902 will count pulses from the multivibrator circuit.

The malfunction detection circuitry 1900 includes a separate source of power, for example, block 1930, the power supply also including suitable filter capacitors 1932, 1934, as is typical. A five-volt direct current source is fed through the power supply 1930 by means of a diode 1936 and a conductor 1940, the diode 1936 insuring that power from the supply 1930 is not fed back to the input terminal 1940.

In accordance with the above description, the counter 1902 will continue to count pulses from the free running multivibrator 1904 in the absence of being reset. However, the computer is set up to generate a reset signal on a periodic basis, which reset signal is fed to an output conductor 1942. The reset signal can be programmed to be generated at any time and is preferably selected to be generated every one-half second. The computer also generates a circuit address code, for example, select :58 and it presses this signal on input conductor 1944. Also, the computer generates an execute signal on input conductor 1946, these latter two signals being fed to a nand gate 1948.

The anded select and execute signals are fed to the input circuit of a single shot multivibrator circuit 1950, as is the reset signal on input conductor 1942. Upon the coincidence of all of the signals described above, the single shot multivibrator circuit 1950 will generate a five microsecond output pulse which is utilized to reset the counter 1902 to zero. This signal is fed by means of a conductor 1954 and, as stated above, occurs approximately every half second.

In the event that the counter 1902 is not reset within a preselected period of time, for example, ten seconds, the counter 1902 will generate an output signal which energizes an npn transistor 1960, the emitter of which is connected to a second npn output transistor 1962. The transistor 1962 is connected to the malfunction light to energize the light upon sensing the fact that the counter 1902 has not been reset. The output of the transistor 1960 is also fed back to the input circuit of the nand gate 1924 by means of a conductor 1964 to disable the nand gate 1924 upon conduction of the transistor 1960. This precludes any further pulses from being fed to the counter 1902.

Referring now to FIG. 20, there is illustrated a reject circuit 2000 which is utilized to actuate a conveyor mechanism which causes the conveyor of the parts being welded to dump a part which has failed to meet the standards set within the computer.

Specifically, the computer generates a select code, sel:54, and impresses this coded signal on an input conductor 2002. Also, an execute signal is generated within the computer and fed to a conductor 2004. These two signals are anded by means of a nand gate 2006, the output of which is fed to the input circuit of a single shot multivibrator circuit 2008.

The single shot multivibrator circuit 2008 generates a pulse of aproximately .3 seconds in duration, the output pulse being fed to a dump transistor 2010 to turn on the transistor 2010. When the transistor 2010 is turned on, a signal is fed to an output conductor 2012 to cause the conveyor mechanism to be actuated and thus dump the defective part. In the event it is desired to test the dump mechanism, a dump test button is provided which is connected to an input conductor 2014. The conductor 2014 is, in turn, connected to the input circuit of the single shot multivibrator 2008. Upon actuation of the dump test button, the .3 second pulse is generated from the single shot multivibrator circuit 2008 to turn on the transistor 2010.

Referring now to FIG. 21, there is illustrated a printer control circuit which is utilized to control a thermal printer provided with the system of the present invention. In the preferred embodiment, an NCR Model TM1 printer is utilized.

Referring to the specific circuit 2100, the computer generates a device address code, for example, select :50, and impresses the address code on an input conductor 2102. The computer also generates an output signal which signifies that the computer is outputting data therefrom, this output signal being generated on a conductor 2104. The coincidence of the select :50 and output signals are fed to a nor gate 2106, the output of the nor gate being fed to the input circuit of a single shot multivibrator circuit 2110. The single shot multivibrator circuit generates a pulse of approximately ten microseconds in duration which are utilized to start the printer and thus take data from the computer and provide a printed page of data.

The single shot multivibrator circuit 2110 comprises a nor gate 2112 and an npn transistor 2114. The collector electrode of the transistor 2114 is connected to a printer start output conductor 2116 which feeds a ten microsecond pulse to the thermal printer connected thereto.

Upon starting the printer, the computer provides data bits on input conductors 2120 and 2122. The data bits on conductors 2120 form the first four bits of an 8-bit word an the bits on conductors 2122 form the second four bits of the 8-bit word. The data bits are fed through a pair of quad latches 2126 and 2128, the quad latches being typical in that they contain four flip-flops on a single integrated circuit chip. The data is clocked through the quad latches 2126, 2128 by means of a clock signal generated at the output of gate 2106 and fed to the quad latches by means of conductors 2132, 2134.

Thus, when the printer is started by means of a signal on output conductor 2116, the data present at the output data busses from the computer are transmitted through the plurality of conductors 2120, 2122 connected to the computer to a plurality of output conductors 2140, 2142 connected to the thermal printer. During the time that the printer is printing the data present on output conductors 2140, 2142, a printer busy signal is generated from the printer and impressed on a printer busy conductor 2144. This signal is fed back to the computer through a gate 2146 and to the computer by means of a nand gate 2148. The output of the nand gate is connected to the computer by means of an SER signal generated on output conductor 2150. Also, the output signal on the printer start conductor 2116 is fed back to the input circuit of the gate 2112 forming a part of the single shot multivibrator circuit by means of a conductor 2152. This signal will preclude a second printer start signal from being passed through the gate 2112 until such time as the printer start signal from the single shot multivibrator circuit 2110 is completed. The input signal on conductor 2102 is also fed to the input of the gate 2148 by means of an inverter circuit 2160, this signal enabling the gate 2148 at such time as the particular device illustrated in FIG. 21 has been selected.

Figure 22:
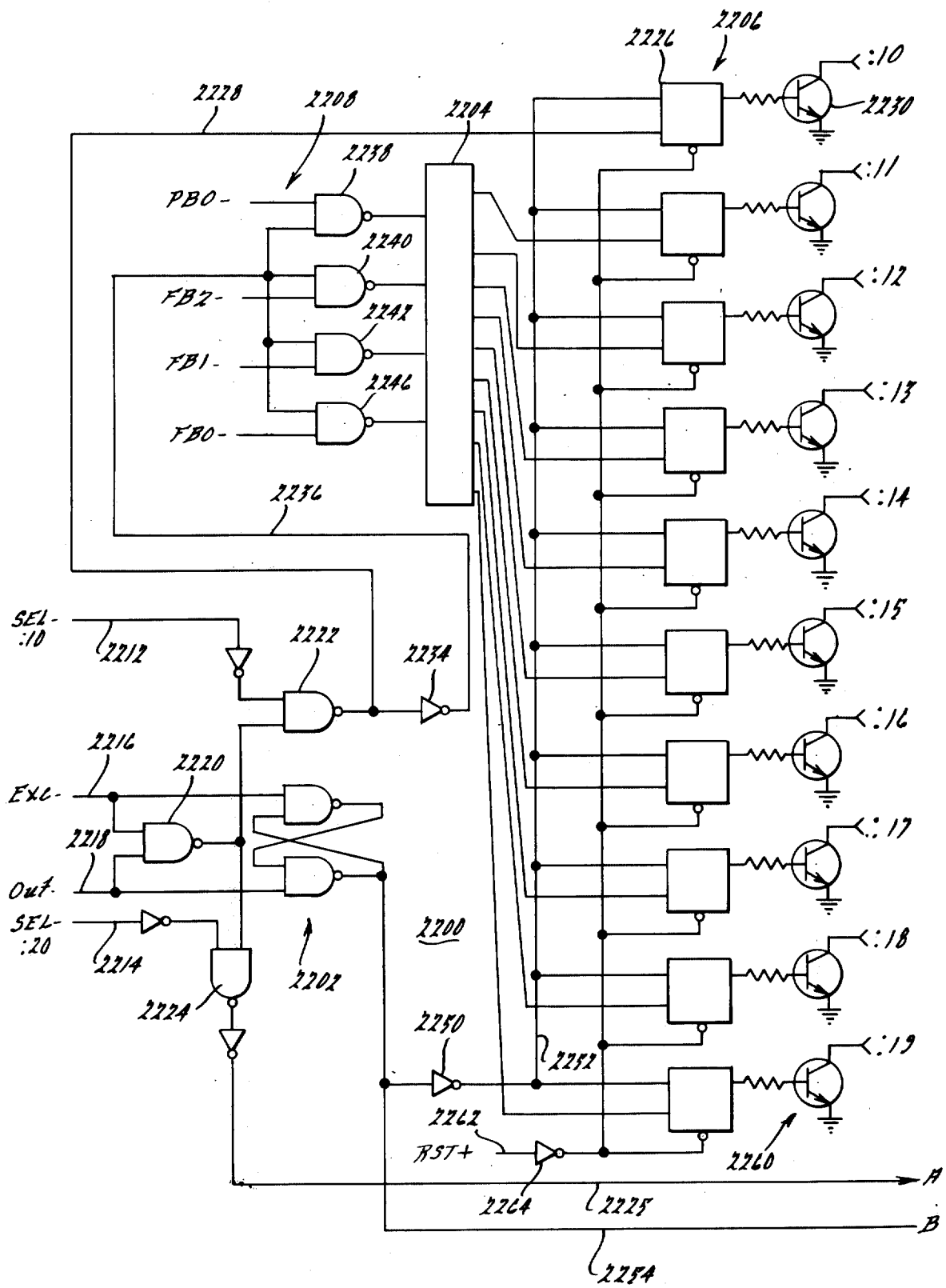
FIG. 22 is a schematic diagram illustrating a portion of the light control circuitry incorporated in the system of the present invention.

Referring now to FIG. 22, there is illustrated a portion of the light control circuitry incorporated in the system of the present invention. The light control circuitry is utilized to actuate selected incandescent, the lamps being associated with a particular welding head. When the configuration illustrated in FIG. 22, there is only one lamp which is energized at any one particular time, with the exception of the first lamp associated with address :10. Accordingly, as long as corrective action is being taken, one of the lamps corresponding to that particular head will be illuminated to indicate to the operator that corrective action is occurring at that particular head. The system also includes the first or summary lamp which may be positioned elsewhere within the plant to indicate to a central location when corrective action is occurring anywhere in the welding heads.

Specifically, the circuit 2200 includes an input flip-flop 2202 which is utilized to clock data from a one in ten hexadecimal converter circuit 2204 to a plurality of flip-flops 2206. A specific address for the one in ten converter 2204 is provided from the computer to a plurality of input conductors 2208, the address at the input conductors 2208 being in binary form.

When corrective action occurs, a particular bank of D flip-flops 2206 is selected by means of an input conductor 2212 which is connected to the computer. There is a second select input conductor 2214 which is also connected to the computer, the signal level on which energizes a second bank of D type flip-flops to be described in conjunction with FIG. 23.

The computer also generates an execute signal on a conductor 2216 and an output signal on conductor 2218. The output signal on conductor 2218 signifies that the computer is outputting data from the computer to an external device and the execute signal clocks the transmission of the data from the computer to the external device.

Figure 23:
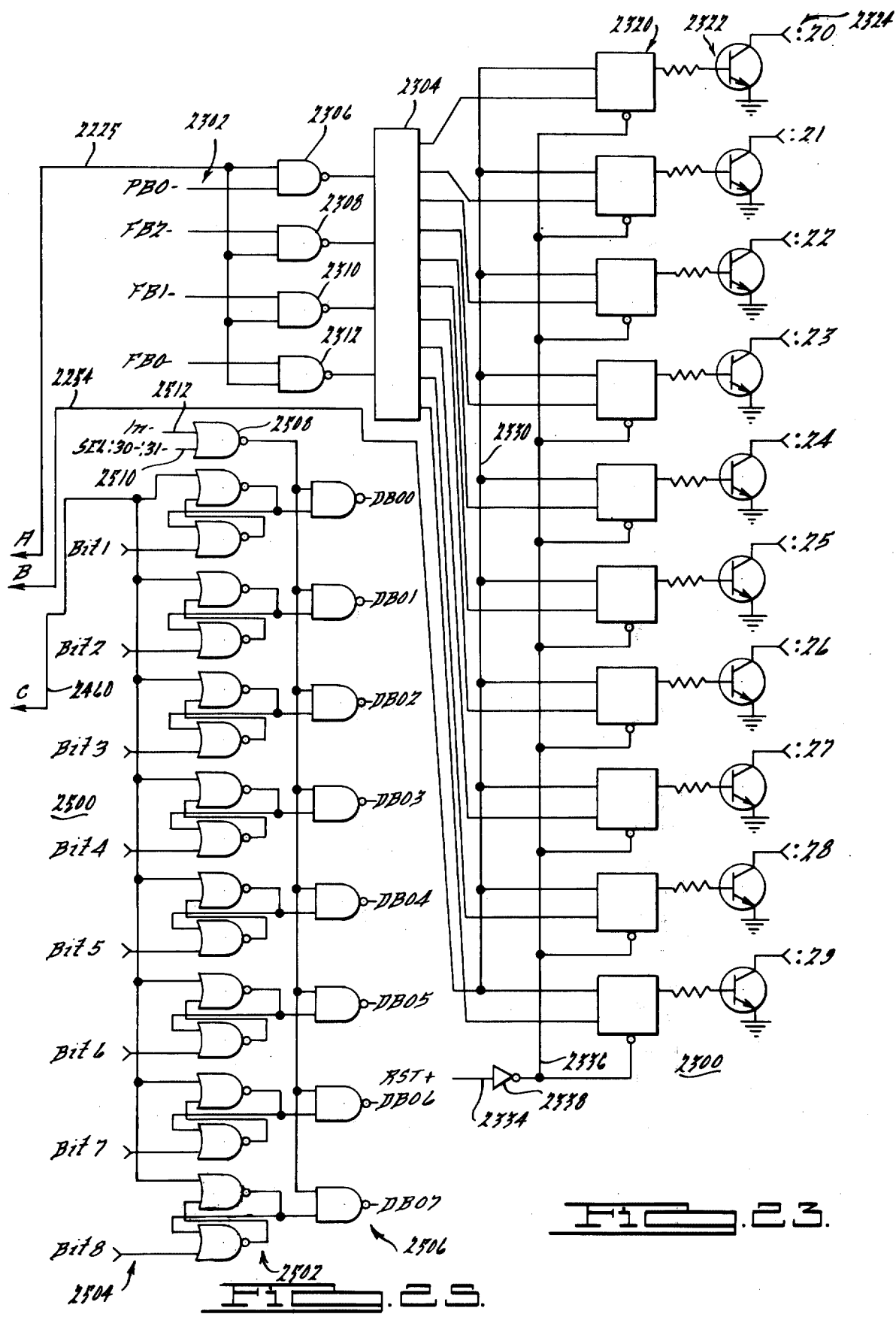
FIG. 23 is a schematic diagram illustrating the remaining details of the light control circuitry incorporated in the system of the present invention.

The signal levels on conductors 2216, 2218 are anded by means of a nand gate 2220, the output of which is connected to a first bank nand gate 2222 associated with the flip-flops 2206 and to a second bank flip-flop 2224 associated with the bank of flip-flops to be described in conjunction with FIG. 23, this latter connection being accomplished by a conductor 2225. The output signal level at the output circuit of gate 2222 is fed to the clock input of a first flip-flop 2226 by means of a conductor 2228. As is seen from the connections, the flip-flop 2226 is connected slightly differently than the remaining flip-flop in the plurality of flip-flops 2206. The flip-flops 2226 is the summary flip-flop which energizes a remote lamp in the event any corrective action is being taken within the several heads associated with this circuit. Accordingly, if a signal level exists at the output of gate 2222, the flip-flop 226 will be switched to its set state and energize an output lamp associated with a monitoring panel remote from the welding heads.

The output of gate 2222 is also fed to the binary coded head address circuit which includes input conductors 2208 by means of an inverter circuit 2234 and a conductor 2236. The computer feeds a binary coded address to the input conductors 2208, the input conductors 2208 being connected to the input circuits of a plurality of flip-flops 2238, 2240, 2242 and 2246. The signal level on conductor 2236 is also fed to the input circuit of the gates 2238 to 2246 to clock data from the computer to the one in ten line decoder 2204.

When an address is present at the output of one in ten line decoder 2204, this information must be passed forward to one of the plurality of flip-flops 2206. This is accomplished by feeding a pulse to the D input of each of the flip-flops 2206 by means of flip-flop 2202, an inverter circuit 2250 and a conductor 2252. The conductor 2252 is connected to the D input of each of the flip-flops in the plurality of flip-flops 2206. This signal 2252 is generated by the flip-flop 2202 and particularly derived from the reset side thereof. The flip-flop 2202 is set in response to the execute signal generated on the conductor 2216 by the computer. The flip-flop 2202 is also connected to the group of flip-flops to be described in conjunction with the description of FIG. 23 by means of a conductor 2254.

Accordingly, when one of the flip-flops 2206, in addition to flip-flop 2226, is set, an output transistor in the group of transistors 2260 will be energized to energize the particular light associated with that transistor. This indicates to the operator that the welding head associated with that particular lamp is being provided with corrective action from the computer. In order to reset the particular flip-flop which has been set, a reset signal is generated from the computer on an input conductor 2262, the reset signal being inverted by a gate 2264. This reset signal is fed to the reset input of each of the flip-flops in the group of flip-flops 2206.

In order to turn the particular light off without resetting the entire string of lights, the on-off flip-flop 2202 is again addressed by means of the gates 2238 - 2246 and an out-signal is generated on input conductor 2218. This will cause the flip-flop 2202 to be reset when the clock input is pulsed from the one in ten line decoder 2204. Thus, particular lamps are pulsed with illuminating energy.

Accordingly, when any of the lamps below the lamp associated with transistor 2230 is being pulsed on and off, and only one will be pulsed on and off at any particular time, the flip-flop 2236 is being set and reset. Also, the specific lamp associated with one of the switching transistors 2260 is also being pulsed. Thus, the operator is aware that a particular head is being provided with corrective action and a remote monitor is being provided with information that one of the heads in a particular group is being provided with corrective action.

Referring now to FIG. 23, there is illustrated a second circuit 2300 which is utilized to blink a second set of lamps associated with another group of welding heads. As was the case above, the computer selects a particular lamp within the group to indicate that that particular head is being provided with corrective action by means of a coded binary address being provided input conductors 2302. These addresses are fed to a one in ten line decoder 2304 by means of a plurality of flip-flops 2306, 2308, 2310 and 2312. The information is clocked through the gates 2306 - 2312 by means of the select signal generated on conductor 2225 from FIG. 22. The output of the one in ten line decoder is fed through a plurality of flip-flops 2320, and particularly to the clock input thereof. The output of the flip-flops 2320 is fed to a plurality of switching transistors 2322 which are associated with a group of lamp output conductors 2324.

The information from the one in ten line decoder 2304 is fed forward to the flip-flops 2320 by means of the signal fed to each of the D inputs of the flip-flops 2320. This signal fed to the D inputs is generated on conductor 2254 described in conjunction with FIG. 22 and is fed thereto by means of a conductor 2330.

As was the case above, the particular lamp which has been energized is turned off by means of the on-off flip-flop 2202 described in conjunction with FIG. 22, when the particular address is again generated at the binary input conductors 2302. Thus, when a particular lamp is to be turned off, the correct address will be generated at input conductors 2302 and clocked to the one in ten decoder by means of the signal generated on conductor 2225. The on-off flip-flop 2202 will then be reset and this condition will be fed to the D input of flip-flops 2320 by means of the signal level on conductor 2254. All of the flip-flops are turned off or reset by means of a reset signal generated on an input conductor 2334 and fed to the reset input of flip-flops 2320 by means of a conductor 2336 and an inverter gate 2338.

Figure 24:
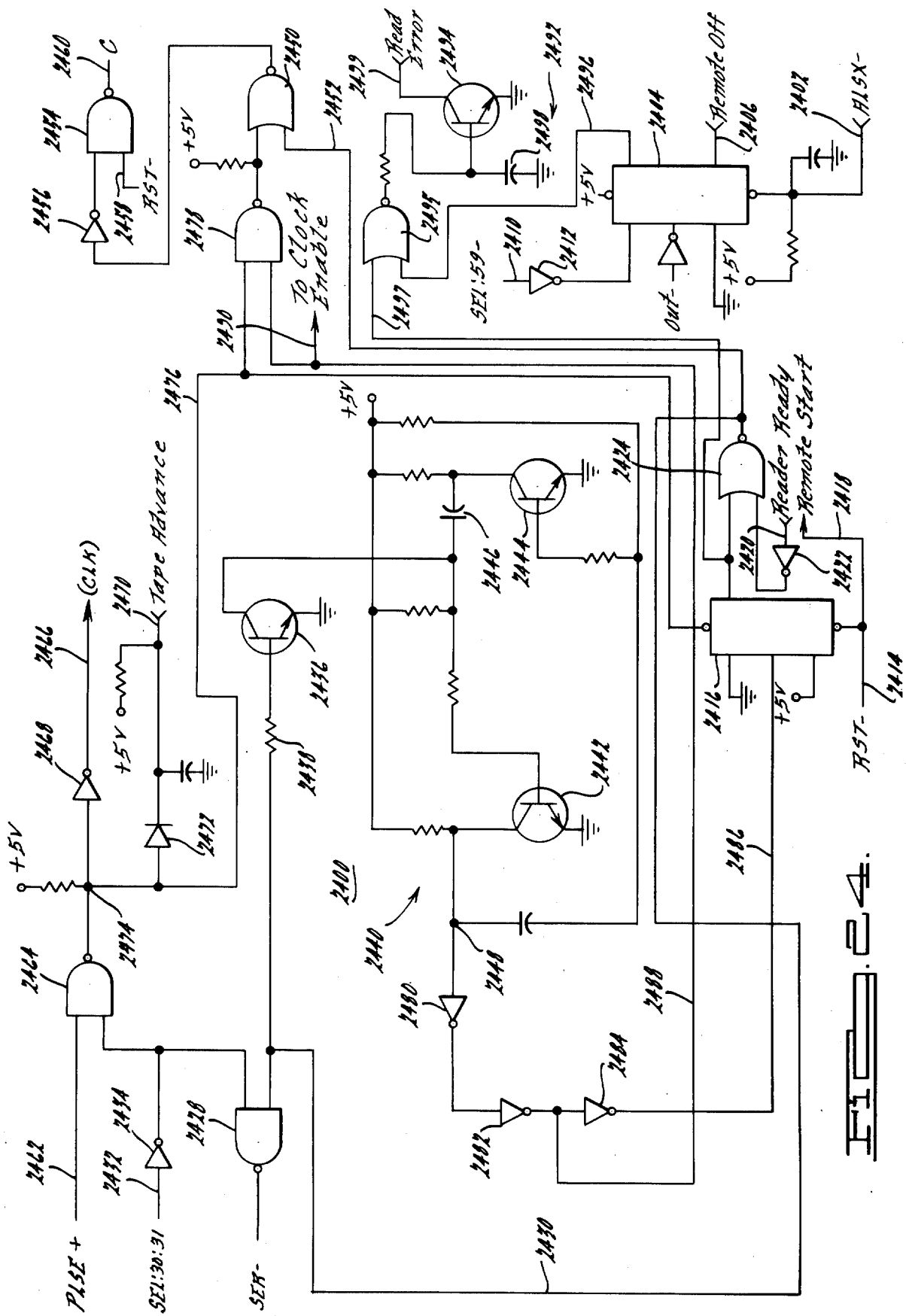
FIG. 24 is a schematic diagram illustrating a portion of the details of the tape reader control circuit for the system of the present invention.
Figure 2B:
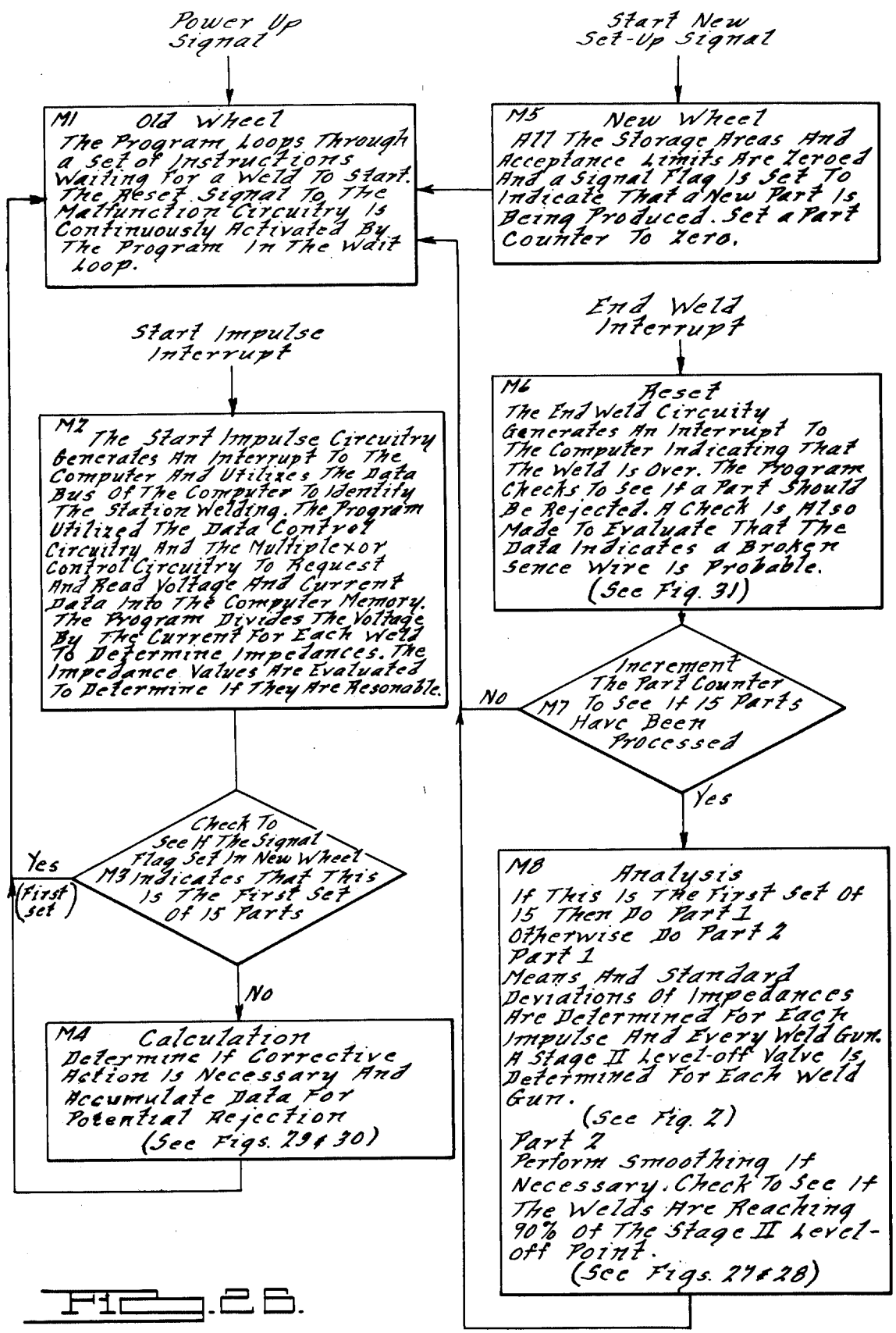

Referring now to FIGS. 24 and 25, there is illustrated a tape reader control and output circuit 2400, 2500, respectively, which is utilized to control the timing of the tape reader and to provide output information from the reader to the computer. This timing must be extremely precise as the reader is a continuously running type tape reader which is stepping through the perforations within the tape being fed through the tape reader. Accordingly, in order to insure that pure tape information and not noise is transmitted to the computer, the tape reader must be precisely controlled on the read-out portion of the cycle to insure that the holes are precisely positioned over the reading mechanisms, for example, a photo transistor-light emitting diode assembly.

Referring now to the specific details of FIG. 24 and the circuit 2400, the reader is initially turned on by means of a signal generated within the computer having the code ALSX-, which signal is a ground signal and fed to an input conductor 2402. The grounding of conductor 2402 causes a reader on flip-flop 2404 to be switched to the set state. The reader also includes a remote off switch associated with the reader machine itself which supplies a signal to a remote off input conductor 2406. This also controls the reader unit being utilized with the system of the present invention. In a preferred embodiment, the reader unit is an Admaster Model 601-1. However, it is to be understood that other types of reader units could be provided. The reader on flip-flop is selected by means of a select :59 signal generated within the computer and fed to an input conductor 2410 and to the flip-flop 2404 by means of an inverter circuit 2412.

When the computer starts up, a reset signal is generated within the computer which is impressed on an input conductor 2414, the conductor 2414 being connected to a reader ready flip-flop 2416 and finally to an output conductor 2418 which is designated the remote start output conductor. This remote start output conductor is connected to the reader unit to prepare the reader unit to transmit data to the computer. When the reader unit is ready, a reader ready signal is generated within the reader and fed to an input conductor 2420. This signal is inverted by means of an inverter 2422 and fed to a nand gate 2424. Thus, the reset signal on conductor 2414 sets the reader ready flip-flop 2416 to the reader ready state, the output of which is also fed to the gate 2424.

The set condition of the reader ready flip-flop 2416 is fed to several different locations within the circuit of FIG. 24. The first of which is a reader ready sense output circuit which includes a reader ready sense nand gate 2428, the input circuit of which is connected to the output of gate 2424 by means of a conductor 2430. Assuming that the computer has generated the proper address, in this case a select :30:31 address, which is impressed on input conductor 2432, the gate 2428 provides an output signal to the computer to indicate to the computer that the reader is ready. It is to be noted that the signal level on conductor 2432 is fed to the gate 2428 through an inverter circuit 2434.

Also, the reader ready signal on conductor 2430 is also fed to a clamping transistor 2436 by means of a resistor 2438. The clamping transistor 2436 is utilized to control a clamped multivibrator circuit 2440 which includes a pair of transistors 2432, 2444. As is typical, the transistors 2442, 2444 are cross-coupled by means of a capacitor 2446. The multivibrator circuit 2440, including transistors 2442, 2444, in the absence of the transistor 2436, would be a free running multivibrator circuit that would operate at approximately 50 –60 hertz. However, the operation of the multivibrator circuit 2440 is controlled by the transistor 2436, which is utilized to clamp the output of the multivibrator circuit, as will be more fully explained hereinafter.

The reader ready signal fed to transistor 2436 clamps the output of the multivibrator circuit, at a node 2448, to a logical zero state when the clamp transistor 2436 is turned on by the reader ready flip-flop 2416.

The output of gate 2424, which is the output of the reader ready flip-flop 2416, also goes to a nand gate 2450 as fed thereto by means of a conductor 2452. The output of gate 2450 is fed to the input circuit of a gate 2454 through an inverter circuit 2456. This output of inverter 2456, in combination with the reset signal fed to the input of gate 2454 by means of an input conductor 2458, is utilized to reset a plurality of flip-flops to be described in conjunction with the description of FIG. 25. The output of gate 2454 is fed to the various flip-flops by means of a conductor 2460.

The previous description describes the operation of the reader as the computer is brought up to power and ready to read information from the reader unit. This condition may be characterized as a computer and reader ready condition wherein the reader is prepared to transmit information and the computer is prepared to receive information. The actual transmission of information to the computer from the reader occurs when the computer generates a pulse plus signal and feeds this signal to an input conductor 2462. This input conductor is connected to a nand gate 2464, the nand gate also being fed a device address signal from the input conductor 2432. Accordingly, when the pulse plus signal is generated on conductor 2462, the reader is signalled to transmit information to the computer.

The pulse signals actually are generated in response to the computer reading a bit of information from a previous hole in the reader tape. The pulse signal is then utilized to advance the tape reader by means of a clock pulse generated at an output conductor 2466, the signal coming from the gate 2464 through an inverter circuit 2468. The tape can also be advanced through the reader by means of a tape advance button on the reader which generates a tape advance signal on an input conductor 2470. This signal is fed through a diode 2472, the tape advance button actually grounding a node 2474 which simulates a clock signal to the reader.

The clock signal is also fed to the reader ready flip-flop 2416 by means of a conductor 2476 connected to the set input thereof. The signal level on conductor 2476 causes the reader ready flip-flop 2416 to be reset to indicate a reader no ready condition. Also, the signal level on conductor 2476 is fed to a nand gate 2478, which signal level is fed through the gate 2450 and the gate 2454 to the reader flip-flops to be described in conjunction with FIG. 25. In this way, when the computer signals the reader to advance the tape to the next position, the reader ready flip-flop is switched to the reader not ready position so that no information can be read from the reader and also resets the reader flip-flops to preclude data from being transmitted from the tape perforations to the computer data buss. The time delay for changing the reader from one sprocket hole to the next is approximately six milliseconds.

Assuming that the computer has read the data from the reader, a pulse is again generated on conductor 2462 to cause the reader to advance. As was stated before, the signal level from the clock pulse has caused the reader ready flip-flop 2416 to go to the non-ready state which causes the transistor 2436 to unclamp the multivibrator circuit 2440. The additional pulse on input conductor 2462 causes the reader to again advance and the cycle is repeated.

The output of the multivibrator circuit 2440 is fed through a pair of inverter circuits 2480, 2482, which are utilized to provide a squaring function for the output pulses from the multivibrator circuit. The multivibrator circuit, in the absence of the inverters 2480, 2482 provides an output signal which does not have a sharp rise and fall time. The inverters 2480, 2482 provide a sharp rise and fall time which is required by the flip-flop and other circuits within this system. The output of the multivibrator circuit is fed to the input of the reader ready flip-flop 2416 by means of an inverter circuit 2484 and a conductor 2486. The output of inverter 2482 is also fed to the input circuit of the gate 2478 by means of a conductor 2488. This provides a clock enable signal on an output conductor 2490 and an input signal to the gate 2478.

Referring now to a read error circuit 2492, it is seen that the circuit consists of a read error output transistor 2494 which is provided an input signal from a read error nand gate 2495. The read error nand gate 2495 is enabled by means of the reader on flip-flop 2404, the output of which is fed to the gate 2495 by means of a conductor 2496. Each time that the reader ready signal is generated, this signal is fed to the gate 2495 by means of a conductor 2497 to indicate that the reader is ready. During the period that the reader is ready a capacitor 2498 is charged. If the reader is ready for an excessive period of time, the charge on capacitor 2498 will build up sufficiently to cause transistor 2494 to conduct and thereby provide a read error signal on a conductor 2499. If the reader is ready for an extended period of time, this will indicate that an erroneous code has been fed from the reader.

Referring now to FIG. 25, there is illustrated the reader output circuit 2500 which includes a plurality of flip-flops 2502 which are connected to the reader channel amplifiers by means of a plurality of conductors 2504. The data holes in the tape are read by means of a plurality of photo transistor and light emitting diode combinations which provide signals on the conductors 2540 in response to a hole perforated in the tape. The output of the flip-flops 2502 are fed to a plurality of output nand gates 2506 which are connected at their output circuits to the data buss of the computer. The gates 2506 are enabled by means of a gate 2508 which, in turn, is enabled in response to a select address signal on an input conductor 2510 and an input signal on a conductor 2512. The select address signal on conductor 2510 selects the particular circuit to which it is connected and the input signal on conductor 2512 indicates that the computer is inputting information. The flip-flops 2502 are set in response to data bits occurring at the input conductor 2504 and are reset by means of the signal level on conductor 2460 which is generated in conjunction with the circuitry described in conjunction with the description of FIG. 24.

Thus, the data on the reader is fed to the input conductors 2504 and is utilized to set the various flip-flops 2502 in response to the presence or absence of data at the reader tape. This data is fed to the output gates 2506 and the set or reset condition of the flip-flops 2502 is clocked through the gates 2506 in response to the presence of the computer generated address signal SEL:30:31 on conductor 2510 and the IN signal on conductor 2512. The flip-flops 2502 are reset in response to the reset signal generated on conductor 2460 in FIG. 24.

Referring now to FIGS. 26 – 31, there is illustrated several flow charts of the preferred program of the system of the present invention. FIG. 26 is a flow chart illustrating the overall operation of the program and FIGS. 27 – 31 illustrate the sub-routines within that general program. The flow charts, as well as the program, are illustrated in the environment of a pair of welding fixtures for welding automotive wheels on an assembly line, each of the fixtures having four welding heads. However, it is to be understood that the welding system could be used in other welding situations including those requiring a single weld.

Referring to FIG. 26, there is illustrated the overall program for the general purpose digital computer which may be started on a power up signal for controlling the program in accordance with standards previously set up and referred to as "Old Wheel" or a new set of standards may be evolved in a "New Wheel" configuration wherein the routine is started by the new wheel switch disclosed in FIG. 18.

Generally speaking, when the equipment is turned on, it will come up through a power signal which simply activates power to the computer, but acts as an interrupt from the computer hardware to jump the program to a specific location in memory. This location is designated "Old Wheel". As is typical, the equipment has the ability to be turned on and off without losing the stored data. Accordingly, if it is the same part to be run as was run before turn-off and it is desired to continue to use all the limits and all the data that has been calculated prior to turn-off, it starts up just as if it is going to make comparisons to all the data it has stored when it was turned off.

The other type of external signal that comes in to the computer is called the "New Wheel" and that is the new wheel circuitry which is the flip-flop described in FIG. 18. The program poles the state of the "New Wheel" flip-flop periodically and if someone presses that new part button (FIG. 18) on the outside of the unit, then that takes the program to a different location, the sub-routine called new wheel. In the new wheel area, all of the prior means, standard deviations and so forth are zeroed or cancelled out. In new wheel, it tells the program that we are now going to read in the voltages and currents for fifteen new parts and after the fifteenth part is gone by then we are going to regenerate the mean and standard deviation information (to be more fully explained hereinafter) and begin taking corrective action on the sixteenth part.

Referring now to block M1 of FIG. 26, the "Old Wheel" portion of the program, the computer waits for a start impulse interrupt signal from the flip-flop described in FIG. 6 which indicates the start of the weld. A portion of the system described is used for generating an interrupt to the computer when the standard controller says that an impulse is beginning. There is also an address generated by the sample blank control circuitry described in FIG. 15 to tell the computer which bank is in progress. The signal that generally gets the program going is a signal from either the first or second station of the welder indicating that the impulse or a weld is starting on one of those two stations (block M2 of FIG. 26). Then, the real time clock is set by the program and is used in the computer to obtain voltage and current values from the welding heads, after the real time clock is expired. During the weld, when the real time clock is expired and the peak detector circuit described in FIG. 2 detects a peak, the voltage and current information is gathered. The voltage and current values are then read into the machine and converted by dividing the voltage by the current to obtain the impedance values.

The system also tests the individual voltage and current values to make sure that they are reasonable because if a broken sensing wire exists, then the voltage and current values will change significantly. Under these circumstances, the system does not continue to take corrective action. If a signal sensing wire is broken at the welder, the system turns on a light on the outside of the cabinet to tell the operation that a wire is broken.

If the data collected is not from the first set of fifteen parts (block M3), the system then compares the measured impedance values to an impedance curve stored in the computer to determine if corrective action is necessary and the corrective action if necessary is taken. Also, data is accumulated to determine if the wheel should be rejected in block M4. The welder may be set up at a variety of impulses, and the computer will count for the station the number of impulses that have occurred since the beginning of the weld. The computer will continue the count until it gets the end of weld interrupt from the circuitry described in FIG. 8. If it is the end of the weld, the program shifts to reset (block M6 in FIG. 26) at the end of weld. As a result of the interrupt circuitry, the weld cycle causes two interrupts, the first being the start of impulse interrupt and the second, the end of weld. For each impulse the program will go through the operation of taking data in and dividing the voltage by the current to obtain impedance values and will continue operating on those impulses until it gets a signal saying that the weld is over. The computer then does the housekeeping to prepare for another weld.

Upon reaching the reset portion of the general program in block M6, the computer makes a decision as to whether a wheel should be rejected. Obviously, if the computer sensed that the last impulse was the last impulse of the weld, no further corrective action can be taken and data is available to determine if a wheel should be rejected. Also, a determination is made at the end of each weld as to whether there is a broken sensing wire. The program will avoid the reject decision if the weld just completed was part of the first fifteen parts. If the weld just finished represents a set of fifteen parts, but not the first fifteen, then the program will transfer to the analysis block M8 of the program.

In the analysis section of the program, if the first set of fifteen parts has not been complete then part 1 of the analysis sub-routine is performed;if this is a subsequent set of fifteen, then part 2 of the subroutine will perform any smoothing necessary. Also, a determination is made if the welds are reaching 90% of the stage 2 level, that is, 90% of the impedance determined to be the flat region of the impedance curve after the temperature of the weld has ceased to rise and energy is being put into the weld to cause the nugget to grow. After that determination is made, the program returns to the old wheel section and awaits the start of a new weld. If the decision block M7 indicates that fifteen parts have not been evaluated, the program also returns to the old wheel section and awaits the start of a new weld.

In the case of the new wheel section or block M5 of FIG. 26, the new wheel sub-routine is a special case because the stored impedance data is zeroed out and the system is set to monitor only the next fifteen parts so that new limits can be set. After the controlled number of parts have gone by, the system calculates means and standard deviations and the stage two criterion. Effectively, the system is setting up all of the criterion for taking corrective action on future welds. The system then waits for another weld to start and it will take the necessary corrective action in accordance with the old wheel routine just described.

As stated above, after every fifteen parts, the system goes back to the analysis section which has two parts. The system utilizes the smoothing to further refine the data and to recognize long term process drift. Also, the system checks to determine if the welds are reaching 90% of the stage two level off point which indicates whether the weld has adequate time for nugget growth. If there is not a problem with weld time, the set of fifteen wheels is analyzed and the system takes a look at the additional information of the last fifteen wheels to add to the first fifteen wheels and when complete, the program will transfer back to old wheel and wait for another weld to start. When it does start, the computer receives the interrupt telling it that the weld has started and the address circuitry indicates which bank is welding. Sample bank control is simply the terminology and the hardware to tell the computer whether it is the first or second station that is welding.

Figure 27:
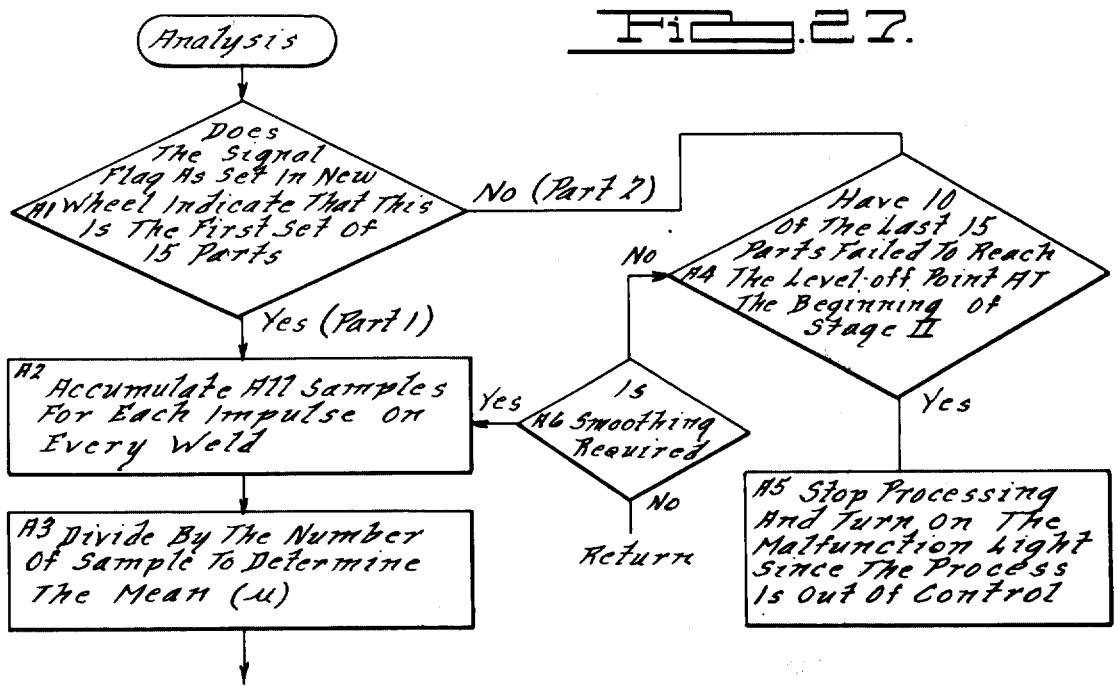
FIG. 27 is a flow chart illustrating a portion of the analysis sub-routine in the general program of FIG. 26.
Figure 28:
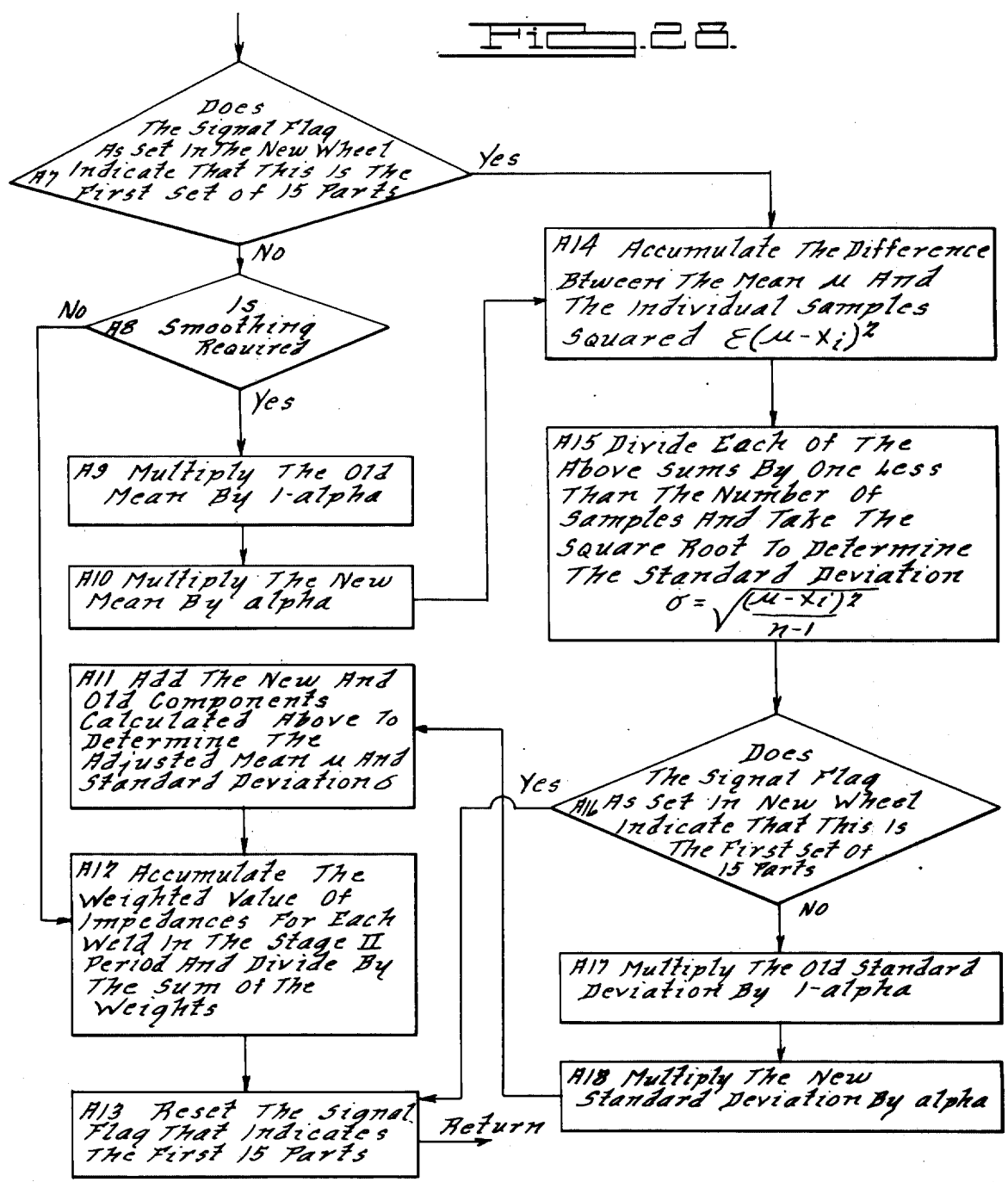
FIG. 28 is a flow chart illustrating the remainder of the analysis sub-routine in the general program of FIG. 26.

Referring now to the analysis part of the program illustrated in FIGS. 27 and 28, there is illustrated the analysis subroutine, including parts 1 and 2, to set up the data calculations including the means, standard deviation, and smoothing of the mean and standard deviation. Additionally, there is a switch and circuitry disclosed in FIG. 9 (972) to permit the system to either float or set limits which is an option to permit the equipment to use this smoothing to continue to update limits over a long period of time. The switch is mounted on the outside of the cabinet and takes the form of a key lock switch which can be set to either fixed or float. If the switch is in the fixed position, it is just the first fifteen wheels that go by wherein all the data is collected and the mean and standard deviations are calculated against which all subsequent wheels are compared. This is the usual method of operating the equipment. However, the equipment may also be operated in a mode called float limits. This means that the equipment will collect data for each set of fifteen wheels and use an exponential smoothing technique to update the original data so that if there is a long term drift as a result of the process deteriorating, the data can be set up to recognize the drift.

In the analysis sub-routine, the program tests whether the signal flag set in the new wheel sub-routine indicates that this is the first fifteen parts processed after the new wheel signal and if so part 1 of analysis will be used. This is accomplished by setting a flag or program indicator when the new wheel signal is activated such that the analysis sub-routine can determine if this is the first or a subsequent set of fifteen parts. The first step of the analysis sub-routine block A1 of FIG. 27 looks at this flag to determine if it is a one or a zero. It it is a zero, it knows that it was the first time it was here because that was just set to zero fifteen wheels earlier in new wheel. If it is a one, then it knows that it was not the first set of fifteen parts so it will go through part two of the sub-routine.

If it is the first time through, the computer will accumulate (block A2) all the readings from every impulse for each of the parts to be sampled. All of the impedance values, for example, for the first impulse for the first gun are all accumulated. The next block A3 indicates that the accumulate values are divided by the number of samples that have been taken. Thus, after these first two blocks A2 and A3, the mean for each impulse on each separate welding gun is obtained. After the mean has been calculated, the computer will check in block A7 if this is in fact the first set of fifteen wheels. If the decision is yes, the calculation of the standard deviation which is a standard deviation formula shown in blocks A14 and A15 will be accomplished. First the difference between the calculated mean and each of the individual values of impedance are squared and the squared paths are summed in block A14. Then, in block A15 each of the above sums are divided by a number which is one less than the number of samples taken. Finally, the square root is taken of the sums to determine the standard deviation. In this case, it will be fifteen samples and the computer will generally be dividing by the number of samples 15 minus one or 14.

The system of the computer now asks if the signal flag set in the new wheel sub-routine indicates that this is the first set of fifteen parts. If it is not the first fifteen parts, and the situation indicates that the switch relating to the floating limits has been transfered to the floating limit position and an exponential smoothing is required to update the limits. Accordingly, the decision block A16 answer is no and the program moves to block A17 wherein the old standard deviation is multiplied by a factor 1 minus alpha. In the typical situation, alpha is selected to be .1, and the old standard deviation is weighted by a factor of 9/10. The program then moves to block A18 to weight the new standard deviation. In this block, the new standard deviation is multiplied by alpha, which then gives the new standard deviation a 10% weight and the old standard deviation a 90% weight.

The program then moves to block A11 wherein the new and old components which are calculated for the new and old standard deviation are added to determine the adjusted standard deviation. Also in block A11 the old and new component of means are added to obtain the adjusted mean. This adjusted mean and standard deviation is used to track the progress of the welding sequences as it may drift away from the original mean and standard deviation to indicate that the welding assembly at the welding head is deteriorating. Accordingly, this could be considered a forecasting technique which is used to determine on a long-term basis how the welding is progressing and as a forewarning of a critical situation at the welding head.

The last two steps in the sub-routine are in blocks A12 and A13 wherein the weighted value of impedances for each weld are accumulated in the stage 2 portion of the weld cycle. It will be recalled that the stage 2 portion is that portion of the weld cycle wherein energy being added to the weld goes into causing the weld to grow rather than raising the temperature of the weld. Accordingly, on a standard impedance curve for a spot weld, the temperature rises in accordance with a particular curve to a plateau which is the crossover point between the stage 1 and stage 2 portions of the weld. The plateau portion of the curve is the stage 2 portion of the weld. From experience, it has been found that approximately one-third of the weld time is taken up in the state 1 portion of the weld and may be defined as the amount of energy it takes to get to the molten zone. The second stage takes approximately the remaining two-thirds of time and is the time required to cause the weld to actually form.

The transfer between the two stages is obvious because in the second stage the heat dissipation is such that these impedance values calculated above begin to flatten out. Accordingly, if it takes a weld a great deal of time to reach the stage 2 portion of the weld cycle, there will be insufficient time left in the weld cycle to permit the weld to grow to be of sufficient size to create a good bond. Accordingly, the block A12 wherein the weighted values of impedance are accumulated for each weld and this sum is divided by the number of impulses in stage 2 will indicate approximately where the next level-off point should occur. Accordingly, with this system an approximate value of the level-off point as to where it should be created. Finally, in the A13 block, the signal flag that indicates the first fifteen parts is reset to zero and the program returns to the main program.

Referring again to block A7, the question is asked as to whether the signal flag as set in the new wheel sub-routine indicates that this is the first set of fifteen parts. If the answer is no, that it is not the first fifteen parts, then the program drops to block A8, which asks the question as to whether smoothing is required. Smoothing here is determined in accordance with the float limits switch circuit, if float limit is requested then smoothing will be performed and if limits are in the set position, then no smoothing is necessary. If smoothing is required, then the computer takes the mean which has just been calculated and multiplies it by one minus alpha, this being the same alpha utilized in conjunction with the previous portion of the sub-routine and is typically selected to be .1. After the old mean is multiplied by one minus alpha, block A10 indicates that the new mean is multiplied by alpha. Thus, the new mean is weighted at 10% and the old mean is weighted at 90%. In this way the system is programmed to track the mean in accordance with a certain weighting scheme. The lower the value of alpha, the longer the system will take to catch up on long-term deviations. This system is utilized to determine if a long-term deterioration is occuring within the welding system.

The program then moves on to block A14 which was utilized above wherein the difference between the mean mu and the individual samples are squared and summed. Subsequently, in block A15, the standard deviation is calculated by dividing each of the accumulated sums by one less than the number of samples taken and the result is operated on by taking the square root. This results in the standard deviation. The standard deviation is then weighten wherein the old standard deviation is multiplied by one minus alpha, and the new standard deviation is multiplied by alpha. In block A11, the old and new components of the standard deviation are added to determine the adjusted standard deviation and the old and new components of the mean are added to determine the adjusted mean. The program then goes through blocks A12 and A13 as described above.

Referring back to decision block A1, if the answer is no, then the program moves to a decision block which asks a question whether ten of the last fifteen parts failed to reach the level-off point at the beginning of stage 2. If the answer is yes, then the process is not progressing satisfactorily and a malfunction light is turned on to indicate that the process is out of control. If the answer is no, then a decision block is entered at A6 which asks a question whether smoothing is required. If smoothing is not required, then the system returns to the main program. If smoothing is required, then the program goes to the smoothing portion of the program indicated as part 1 of the analysis sub-routine as described above.

In copending application of Truman Van Sickle and Charles Drake, Ser. No. 338,453, filed Mar. 6, 1973, the specification, claims and drawings of which are incorporated herein by reference, there is disclosed a system wherein the weld reaches the stage 2 temperature by standard pulses in accordance with a certain fixed scheme. In this system, it is contemplated that the temperature of the weld would be forced to the stage 2 level by lengthening the heat cycle and shortening the cool cycle during the stage one or preheat portion of the weld. This is to insure that all of the welds reach the stage 2 level as early in the weld formation as possible. By forcing the weld toward the stage two level by lengthening heat and shortening cool cycles, the operator is further insured that the weld will reach the stage two level while there is still sufficient time remaining in the weld cycle to permit the weld to grow to adequate size, thereby insuring an adequate bond.

In order to accomplish this, the system is provided with a thumbwheel disclosed in FIG. 9 on the cabinet which includes even numbers 2, 4, 6, 8 and the letter A for automatic. The numbers 2, 4, 6, 8 represent the number of pulses in which the heat is being lengthened and the cool is being shortened and the A stands for the automatic mode of operation wherein the weld is forced toward the stage 2 level as soon in the weld as possible by the system.

Generaly, it is desired to drive the temperature up to within 90% of the stage 2 level to insure that there is sufficient time for the weld to properly grow. This is accomplished by the preheating time and thus allows for a greater number of corrections to the subsequent weld impulse during the stage two period to reduce the rejection of wheels as much as possible. Thus, the analysis sub-routine checks how many wheels are reaching the 90% of the stage 2 level to determine if the system is operating properly. The next sub-routine to which the computer goes is the calculate sub-routine illustrated in FIG. 29. The FIG. 29 also illustrates the zap sub-routine which is utilized to take the corrective action noted above.

Referring back to the calculate sub-routine, it is seen that the sub-routine determines if corrective action is necessary and also accumulates data as a determination cannot be made as to whether a bad weld is occurring until all of the impulses have been accumulated for that particular weld. In block C1, the computer determines the mean plus a preset number of standard deviations calculated in the analysis sub-routine of FIGS. 27 and 28 and a number equal to the mean minus a preset number of standard deviations for the particular weld and impulse in question. See FIG. 32 for an example of the acceptance region generated by these limits. In the particular embodiment preferred, the normal distribution is the mean plus 1.2 times the standard deviation for the upper limit and the mean minus 1.2 times the standard deviation to give the lower limit. This provides a belt around the mean which, in the preferred embodiment, is about 11% of the area under the curve on either side of the mean. It is this belt that is used as the limits for the corrective action to bring the welds within the belt.

The computer then moves to the decision block C2 which asks the question whether the impedance value measured for the particular impulse in question is less than the low limit of the mean minus the set number of standard deviations. If no, this means that the value measured is above the curve defining the lower limit of the belt. If the answer is yes, indicating that the measured impulse is out of limits, the program moves to the zap sub-routine of FIG. 29 for corrective action. If the answer is no, then the program moves to decision block C3 which asks if the value measured is greater than the high limit of the mean plus a preset number of standard deviations. If the answer is yes, that means that the measured value is out of limit above the curve defining the upper limit of the belt. Under this condition, the program moves to the zap sub-routine again to perform corrective action. The zap sub-routine will be explained hereinafter.

If the answer is again no in response to the question of block C3, that means that no corrective action is required and then the computer moves to the final decision block C4 in the calculate sub-routine which asks the question whether this is the last welding gun from this controller. If it is not the last welding gun from the controller, the sub-routine then recycles back to block C1 to recycle this particular sub-routine for subsequent welds and impulses within the remaining guns from this controller. If the answer is yes in decision block C4, then the computer program moves to the reject sub-routine which is to be described in conjunction with the description of FIG. 30. The reject sub-routine requires data from all of the welding guns for a particular controller before the program can move to the reject sub-routine.

As stated above, the calculate sub-routine indicates whether a particular impulse is out of limits either above or below the maximum and minimum levels respectively. If the measured impedance is greater or less than the limit selected by the calculate sub-routine, corrective action is taken in the zap sub-routine with the exception that the corrective action is not taken greater than a maximum allowed for a particular weld. This maximum is fed into the computer and is compared to the corrections which have been taken to determine if further corrections can be taken.

Accordingly, the first decision block in the zap sub-routine is designated Z1 and asks the question if the correction which is required is greater than the maximum corrections allowed for the particular weld. If it is, then the sub-routine moves to return to the main program for other action. If the answer is no, then the sub-routine moves to the decision block Z2 to see if this is the last impulse of the weld. Obviously, if the measured impulse is the last impulse of the weld, it would be of no avail to provide any further correction for that particular weld as there are no further impulses within that weld. Accordingly, if the answer is yes to this question, then the program moves to the return position which returns the program to the main program.

If the answer is no, then the program moves to block Z3 which compares the impedance reading of the particular impulse in question to the last impulse. This difference is stored and the program moves to the Z4 decision block which asks the question as to whether the value of the current impulse increased by 10% since the last impulse. As is indicated in the decision block, if there is a large increase in the impedance reading from the last impulse, then explusion may occur. Expulsion is the blowing out of metal from the weld when the weld temperature becomes too high. This blowing out of molten metal from the weld not only is dangerous but may require the rejection of the wheel. Obviously, any further correction may result in increased expulsion. Accordingly, the sub-routine returns to the main program if the answer is yes to this question.

If the answer is no, then the sub-routine moves to block Z5 which causes the panel light for the particular weld being corrected to be turned on and also for the summary lamp to be turned on. Further, the necessary corrective action is taken. After the corrective action is taken, the sub-routine returns to the main program.

Figure 30:
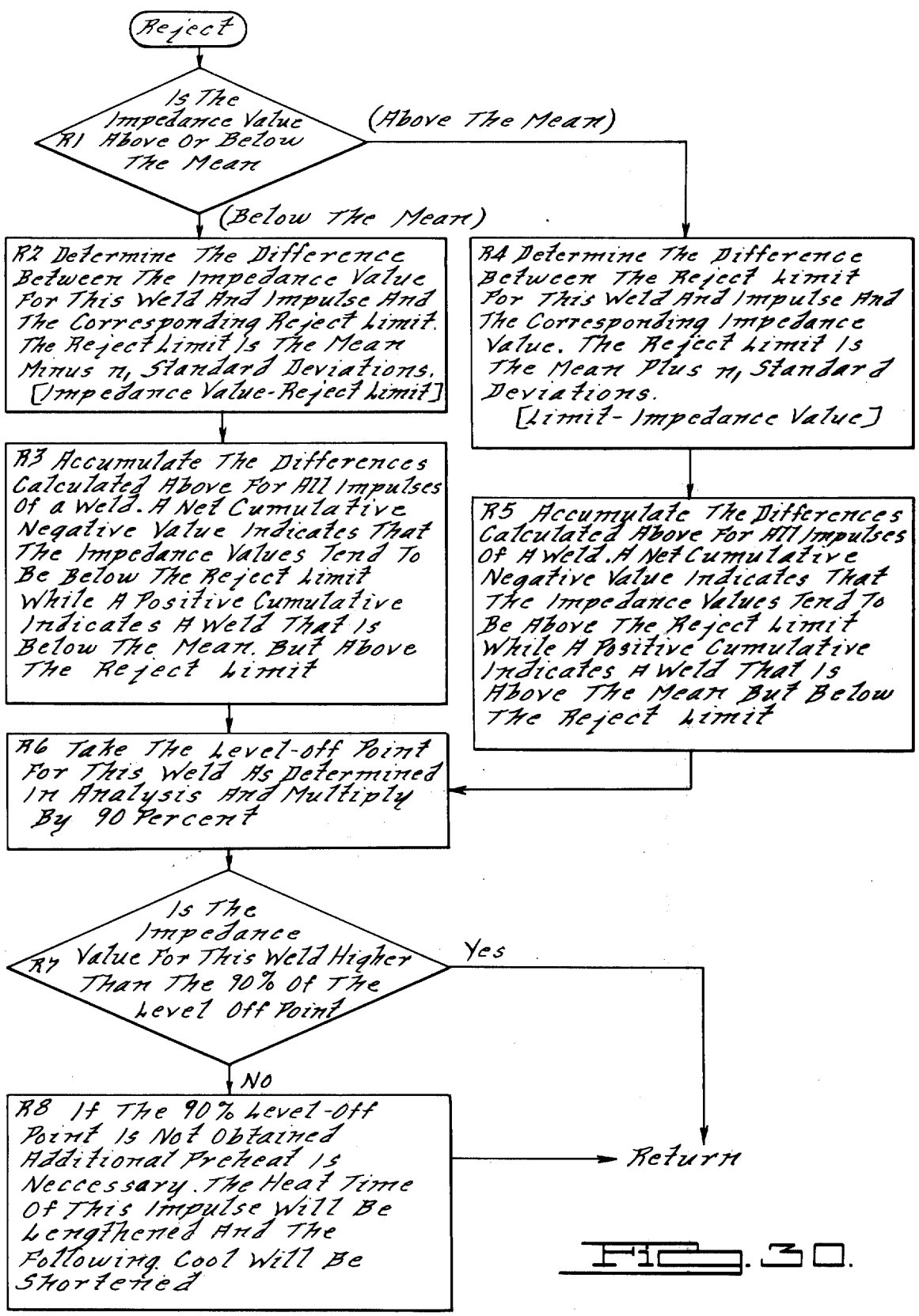
FIG. 30 is a flow chart illustrating the reject sub-routine in the general program of FIG. 26.

Referring now to FIG. 30, there is illustrated the reject portion of the program. The reject sub-routine is a sub-routine which determines additional standards relative to the weld under consideration so that a determination can be made whether the weld is meeting the required standards.

In the reject sub-routine, the first block R1 asks the question whether the impedance value calculated in the calculation sub-routine is above or below the mean. If it is below the mean, the program moves to block R2 which causes the program to determine the difference between the impedance value for the impulse under consideration for the particular weld and the corresponding reject limit below the band. In this particular situation, the reject limit is the mean minus N1 standard deviations. The reject limits are generally further from the mean than the acceptance limits (see FIG. 32). This is an algebraic summation of the difference between the impedance value and the reject limit. When the value is below the mean and the reject limit, the difference will become a negative number. The program then moves to block R3 wherein the differences calculated in block R2 for all impulses of a weld are accumulated. As indicated in the block, a net cumulative negative value indicates that the impedance values tend to be below the reject limit while a positive accumulation indicates a weld that is below the mean but above the reject limit.

Moving back to the original decision block R1, if the values of the impedance read are above the mean, the program moves to block R4. In block R4, the computer determines the difference between the reject limit for this particular impulse within the weld and the corresponding impedance value. As was the case above, except in the opposite direction, the reject limit is the mean plus N times the standard deviation.

The program then moves to block R5 wherein the differences calculated in block R4 for all impulses of a particular weld are accumulated. As explained in the block R5, a net cumulative negative value indicates that the impedance values tend to be above the reject limit while a positive cumulative value indicates that a weld is above the mean but below the reject limit. Accordingly, with the decisions in block R2 and R3 and blocks R4 and R5, a cumulative picture of the weld as it progresses is developed to determine if the sum of these impedance readings occur above or below the reject limits at the end of a weld.

Both of the above paths within the reject sub-routine end up at block R6 wherein it is determined whether the weld has reached the stage two period and the calculation is made for 90% of the level-off point for this weld as determined in the analysis sub-routine. Thus, the analysis calculation of the level-off point for a particular weld is utilized in this block R6 and that value is multiplied by 90%.

The program then moves to decision block R7 which asks the question whether the impedance value for this particular weld is higher than 90% of the level-off point. If that answer is yes, then that indicates that the weld does not require any further preheat, the preheat condition being described above. In preheat, it is to be noted that the heat is lengthened and the cool is shortened to force the temperature of the weld up toward the level-off point as promptly as possible to insure that there is sufficient time remaining to take corrective action to assure that the weld produced is a suitable bond. If the answer is yes, the program returns to the main program. However, if the answer is no, then block R8 is reached which indicates that the 90% level-off point has not been obtained and accordingly, additional preheat is necessary. With the program in this block R8, the computer will then lengthen the heat time for the next impulse and the following cool cycle will be shortened.

In the particular system of the present invention, the computer is set up to determine how much time should be required for the stage two level. This time is subtracted from the entire weld cycle and the remaining time is allocated to attaining the stage one level. Accordingly, the computer knows when a particular weld should reach the stage two level to provide sufficient time to permit the corrective action necessary in stage two to be taken. After the corrective action in stage one is taken, herein called preheat, the block R8 moves to the return position which returns the program to the main program.

Figure 31:
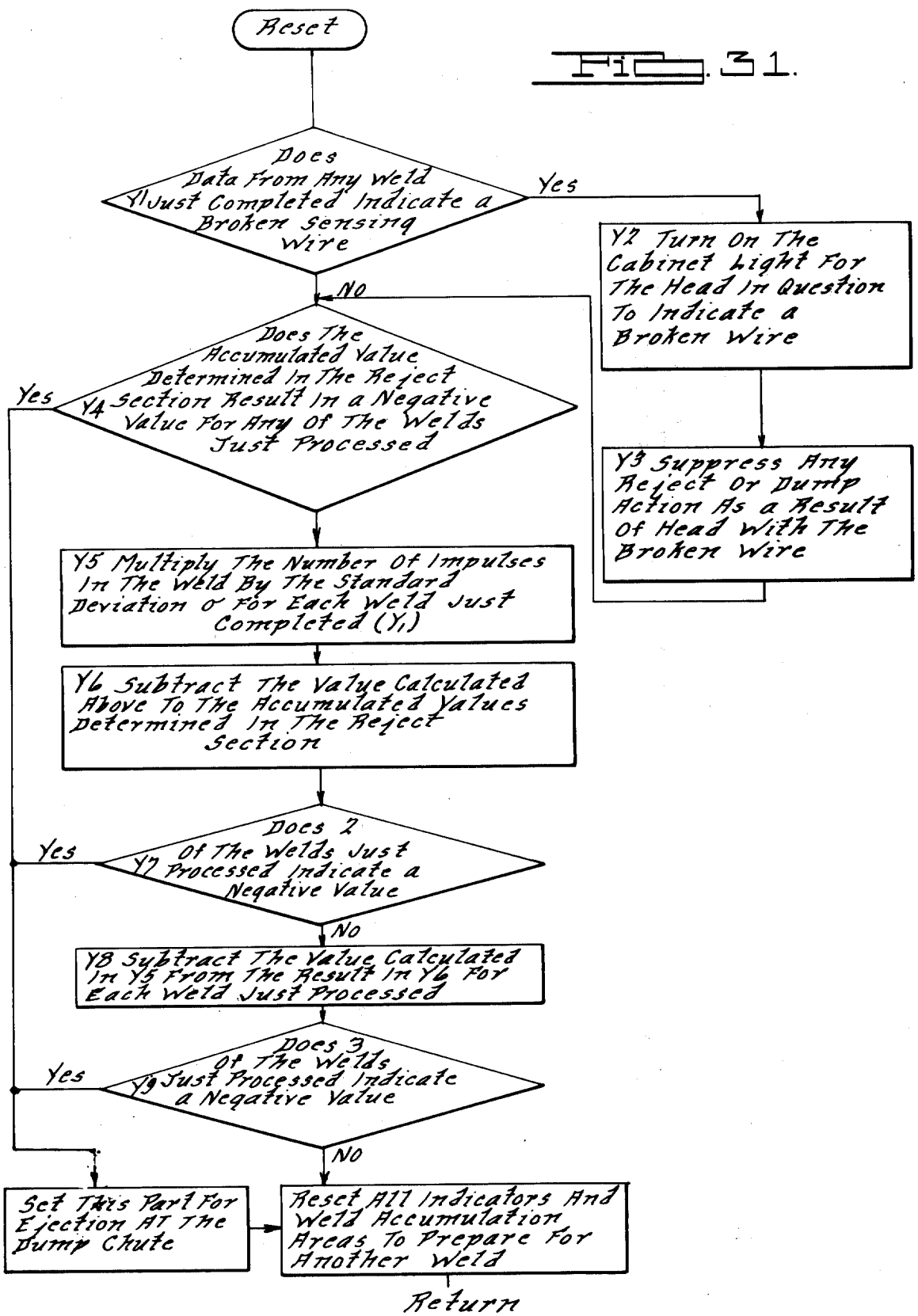
FIG. 31 is a flow chart illustrating the reset sub-routine in the general program of FIG. 26.

Referring now to FIG. 31, there is illustrated the reset sub-routine of the program utilized in the system of the present invention. In this sub-routine, there is involved various decisions as to whether there is a broken wire in the sensing circuit, whether the part under under consideration should be set for rejection and also the sub-routine includes some general housekeeping steps.

Specifically, the reset sub-routine starts with a decision block Y1 which asks the question whether any data from any weld just completed indicates that a broken sensing wire exists. Obviously, if a broken sensing wire exists, the data would be faulty. If the answer is yes, the program moves to block Y2 which turns on the cabinet light for the head in question to indicate a broken sensing wire. If there is a broken wire, the system would select the part for rejection. Accordingly, this rejection portion of the circuitry should be suppressed in order to preclude rejection of that part.

The program then moves to block Y3 which commands the suppression of any reject or dump action as a result of a faulty wire. The program then moves back to the main sub-routine program to the point involved if the answer to the question asked in block Y1 is no. If it is no, the program moves to block Y4 from the block Y1. In connection with block Y1, the sensing circuit actually senses whether all of the polarity signs from the various heads are the same. If the signs are the same, it means that a wire is broken and the sub-routine would move through the blocks Y2 and Y3 described above.

If the answer is no, that there is no indication of a broken wire, the sub-routine moves to block Y4 to ask the question does the accumulated value determined at the reject section described above result in a negative value for any of the welds just processed. This accumulation of values is determined in the reject sub-routine and particularly in blocks R2, R3, R4 and R5 of that sub-routine. The block Y4 in the remaining portion of the sub-routine checks the welding guns that do not have a broken wire to determine whether the parts should be rejected for those welds.

If the answer to the question as to whether the accumulated value determined in the reject section resulted in a negative value for any of the welds just processed results in a yes answer, the program moves to the lower left block in FIG. 31 which requires that the part is to be set for ejection at the dump chute. In this way, the defective part is tagged for ejection.

If the weld in question is outside the reject limit, this will show up by a study of the accumulated differences to see if the sum of those deviations from the reject sub-routine is totally outside or totally inside the reject limit.

The program then moves to block Y5 which causes the calculation to occur wherein the number of impulses in the weld are multiplied by the standard deviation for each weld just completed in decision blocky Y1. Then the program moves to block Y6 wherein the value calculated in block Y5 is subtracted from the accumulated values determined in the reject section.

The blocks Y5 and Y6 perform mathematical operations on the values determined for the particular welds so that the standards for rejection may be changed slightly such that if a weld has not deteriorated sufficiently to reject it under the standards of block Y4, a question is asked as to whether the two welds meet a new standard of rejection. This standard of rejection is indicated in block Y7 wherein it is asked the question if two of the welds just processed indicate a negative value. If that is the case, and the answer is yes, the program then moves to the ejection block wherein the part is tagged for ejection at the dump chute. This process means that if two welds on the same part are just inside the reject limit the part will be rejected since there are two marginal welds.

On the other hand, if the answer is no, that there are not two welds which indicate a negative value after being operated on by the process of blocks Y5 and Y6, the program moves to block Y8 wherein the value calculated in block Y5 is subtracted from the result in block Y6 for each of the welds processed. Again, a further standard is imposed on the parts being welded to determine if a part should be rejected, this new standard being closer to the mean but requiring a greater number of welds, in this case, three, to be outside the new standard. In order to accomplish this, the process moves to block Y9 wherein the question is asked if three of the welds just processed indicate a negative value. If the answer is yes, the program again moves to the ejection portion thereof to tag the part for rejection at the dump chute. This process means that if three welds of the same part are small but not marginally bad or outside reject limits, the part will be rejected anyway. On the other hand, if the answer is no, then the part is accepted and the system moves to reset all of the indicators and weld data accumulation areas to prepare the system for a subsequent weld. The program then returns to the main program.

Figure 32:
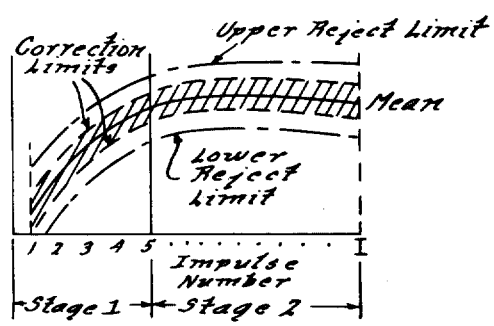
FIG. 32 is a curve illustrating the relationship between the impedance value and number of impulses for a typical weld and further illustrates the limits within which corrective action is taken.

FIG. 32 illustrates the limits that are typical of one weld that has 1 number of impulses. The solid line of FIG. 32 represents the impedance path of the mean values established for each impulse in the new wheel section of the analysis sub-routine of FIGS. 27 and 28.

The system reads impedance values and compares them to acceptance or correction limits as accomplished in the calculation sub-routine of FIG. 29. The cross hatched area of FIG. 32 is the correction region established by the mean value plus and minus no or In standard deviations from the mean. Impedance values read by the system that are outside the correction region are out of limits as determined by the calculation sub-routine of FIG. 29 and appropriate action is taken.

FIG. 32 also shows the reject limit established by adding and subtracting N1 standard deviations from the mean for each impulse of a weld as described in FIG. 30, the reject sub-routine. The broken lines of FIG. 32 with alternating long and short lengths indicate these limits. The accumulated deviations that are calculated in the reject sub-routine indicate if the weld as read is below th lower reject limit or above the upper reject limit. These reject limits are used to determine if a part should be rejected for rework.

FIG. 32 also shows the difference between stage 1 and stage 2 periods of the weld. The impedance path should be within 90% of the leveling-off point of the second stage by the end of the first stage of the weld and preheat is applied in the stage 1 period to assure that the 90% level-off point is obtained.

```
0001                    SS      MPD   :4001
0002                    SS      MPF   :4006
0003                            NAO   EFG
0004
0005
0006    0000                    AES   :0
0007    0000    0000            NOP         Power Up Signal (Fig. 26)
0008    0001    F005            JST   *S+4
0009    0002                    AES   :2
0010    0002    F903            JST   *S+1   Start Impulse Interrupt (Fig. 26)
0011    0003    012            LATA  INT
0012    0005                    AES   :5
0013    0005    01AL           LATA  OLLW
0014    0006                    ALS   :6
0015    0006    F907           JST   *S+1   End Weld Interrupt (Fig. 26)
0016    0007    0EFG           LATA  RESET
0017    0014                    ATS   :14
0018    0014    F915            JST   *S+1
0019    0015    01AL           LATA  OLLW
0020    0018                    ALS   :18
0021    0018    1819            IMS   S+1
0022    0019    0000   PUT     LATA  0
0023    001A    F911            JST   *S+1
0024    001B    0224           LATA  A1C
0025    001C                    ALS   :1C
0026    001C    F91D            JST   *S+1
0027    0011    014L           LATA  PFAIL
0028    001E    0800            HLT
0029    0020                    ATS   :20
0030    0020    080E   1LOAL1  HLT
0031    0021    080E   1LOAL2  HLT
0032    0022    080E   1LOAL3  HLT
0033    0023    080E   1LOAL4  HLT
0034    0024    080E   1LOAL5  HLT
0035    0025    000C   1LOAL6  LATA  0
0036    0106                    REL   :106
0037    0100    F858           JMP   NEW
0038    0101    4001           MPD
0039    0102    4003           PFP
0040    0103    L247           LDA   STCON
0041    0104    9A45           STA   STORAG
0042    0105    0108           ZAP
0043    0106    F43F           SLA   LADE
0044    0107    F63F           LLA   LLENG1
0045    0108    FA47           JST   COPAEF
```

| | | | | | |
|---|---|---|---|---|---|
| 0046 | 0109 | E23C | | LDA | WS12 |
| 0047 | 010A | 9437 | | STA | WADR |
| 0048 | 010B | E238 | | LDA | WLENG2 |
| 0049 | 010C | E23A | | LDX | SSA2 |
| 0050 | 010D | F4C2 | | JST | COPARE |
| 0051 | 010E | 4010 | | MPF | |
| 0052 | 010F | F2A9 | | JMP | NEW |
| 0053 | 0110 | C80C | COPARE | ENT | |
| 0054 | 0111 | 0310 | | NAR | |
| 0055 | 0112 | 9436 | | STA | LCTR1 |
| 0056 | 0113 | E3EB | COPLOP | LDA | *WADR |
| 0057 | 0114 | 9111 8174 | | STA | 0*STORAG |
| 0058 | 0115 | 0128 | | IXR | |
| 0059 | 0116 | D43E | | IMS | WADR |
| 0060 | 0117 | FA01 | | IMS | LCTR1 |
| 0061 | 0118 | F605 | | JMP | COPLOP |
| 0062 | 0119 | F7E9 | | RTN | COPARE |
| 0063 | 011A | 0108 | REWRIT | IXR | |
| 0064 | 011B | E22F | | LDA | STCON |
| 0065 | 011C | 9820 | | STA | RLOAD1 |
| 0066 | 011D | E821 | | STX | RLOAD2 |
| 0067 | 011E | B224 | | LDA | WLENG1 |
| 0068 | 011F | 0310 | | NAR | |
| 0069 | 0120 | 9822 | | STA | RLOAD3 |
| 0070 | 0121 | C601 | | LAP | 1 |
| 0071 | 0122 | F207 | | JMP | RECOPY |
| 0072 | 0123 | B222 | RE1 | LDA | WS12 |
| 0073 | 0124 | 9821 | | STA | RLOAD2 |
| 0074 | 0125 | E21E | | LDA | WLENG2 |
| 0075 | 0126 | 0310 | | NAR | |
| 0076 | 0127 | 9822 | | STA | RLOAD3 |
| 0077 | 0128 | C602 | | LAP | 2 |
| 0078 | 0129 | E21D | | LDX | SSA2 |
| 0079 | 012A | 9823 | RECOPY | STA | RLOAD4 |
| 0080 | 012B | E520 | | LDA | @*RLOAD1 |
| 0081 | 012C | 9921 | | STA | *RLOAD2 |
| 0082 | 012D | 0128 | | IXR | |
| 0083 | 012E | C120 | | CXI | :20 |
| 0084 | 012F | F209 | | JMP | SKIPR |
| 0085 | 0130 | D821 | RCP1 | IMS | RLOAD2 |
| 0086 | 0131 | D822 | | IMS | RLOAD3 |
| 0087 | 0132 | F607 | | JMP | RECOPY+1 |
| 0088 | 0133 | B023 | | LDA | RLOAD4 |
| 0089 | 0134 | C001 | | CAI | 1 |
| 0090 | 0135 | F612 | | JMP | RE1 |
| 0091 | 0136 | F300 | | JMP | *$+1 |
| 0092 | 0137 | 01B7 | | DATA | 10 |
| 0093 | 0138 | 0800 | | HLT | |
| 0094 | 0139 | C706 | SKIPR | LAM | 6 |
| 0095 | 013A | 9824 | | STA | RLOAD5 |
| 0096 | 013B | D821 | | IMS | RLOAD2 |
| 0097 | 013C | D822 | | IMS | RLOAD3 |
| 0098 | 013D | 0128 | | IXR | |
| 0099 | 013E | D824 | | IMS | RLOAD5 |
| 0100 | 013F | F604 | | JMP | SKIPR+2 |
| 0101 | 0140 | F610 | | JMP | RCP1 |
| 0102 | 0141 | 0800 | | HLT | |
| 0103 | 0142 | 0800 | WADR | HLT | |
| 0104 | 0143 | 06F8 | WLENG1 | DATA | PRINT+5 |
| 0105 | 0144 | 00A4 | WLENG2 | DATA | OTT-G4+:60 |
| 0106 | 0145 | 0168 | WLENG3 | DATA | 360 |
| 0107 | 0146 | 08A3 | WS12 | DATA | 64 |
| 0108 | 0147 | 0703 | SSA2 | DATA | PRINT+:10 |

```
0109  0148  0C00  DATC1  DATA  :C00
0110  0149  0800  LCTR1  HLT
0111  014A  1600  STORAG DATA  :1600
0112  014B  1600  STCON  DATA  :1600
0113  014C  1E30  DATCON DATA  :1E30
0114  014D  0800  FFAIL  ENT
0115  014E  0110         ZAR
0116  014F  9800         STA   0
0117  0150  D206         LDA   RSL1
0118  0151  9801         STA   1
0119  0152  D205         LDA   RSL5
0120  0153  9805         STA   5
0121  0154  D825         IMS   RLOAD6
0122  0155  0800         HLT
0123  0156  0800         HLT
0124  0157  F905  RSL1   JST   5
0125  0158  0171  RSL5   DATA  OLDR
0126  0159  CC11  ORDR   LIN
0127  015A  6891         OTZ   :91
0128  015B  6892         OTZ   :92
0129  015C  4844         SEL   :44
0130  015D  4C0C         MRE
0131  015E  4C02         PRE
0132  015F  6859         OTZ   :59
0133  0160  0110         ZAR
0134  0161  9900         STA   FRLNT
              070F
0135  0162  9900         STA   FWLRG
              070F
0136  0163  9900         STA   ANLS
              0819
0137  0164  9900         STA   OFF
              0843
0138  0165  D100         LDA   AVERG
              081C
0139  0166  9900         STA   IMPR
              07FC
0140  0167  D100         LDA   VALUE1
              08DD
0141  0168  9900         STA   IMPR1
              07F7
0142  0169  D100         LDA   VALUE2
              08DE
0143  016A  9900         STA   IMPR2
              07F6
0144  016B  D623         LDA   DATC1
0145  016C  6310         NAR
0146  016D  9900         STA   TEMP
              0812
0147  016E  D100         LDA   IMPR
              07F6
0148  016F  9900         STA   LOIM
              0814
0149  0170  C654         LAP   84
0150  0171  9900         STA   JMP
              0820
0151  0172  C6A8         LAP   168
0152  0173  9900         STA   JMP+1
              0821
0153  0174  0110         ZAR
0154  0175  9900         STA   *LOIM
              8814
0155  0176  1900         IMS   LOIM
              0814
```

New Wheel (Fig. 26, M5)

| | | | | |
|---|---|---|---|---|
| 0156 | 0177 | 1900 0812 | IMS | TEMP |
| 0157 | 0178 | F603 | JMP | $-3 |
| 0158 | 0179 | C00C | LAP | 12 |
| 0159 | 017A | 9900 0857 | STA | MAX |
| 0160 | 017B | C008 | LAP | 8 |
| 0161 | 017C | 9900 0846 | STA | MIN |
| 0162 | 017D | C001 | LAP | 1 |
| 0163 | 017E | 9900 0705 | STA | ALIM |
| 0164 | 017F | C60F | LAP | 15 |
| 0165 | 0180 | 9900 07B2 | STA | MINUS |
| 0166 | 0181 | C605 | LAP | 5 |
| 0167 | 0182 | 9900 083A | STA | SIGMA1 |
| 0168 | 0183 | C60A | LAP | 10 |
| 0169 | 0184 | 9900 083B | STA | SIGMA2 |
| 0170 | 0185 | C650 | LAP | 80 |
| 0171 | 0186 | 9900 0854 | STA | PCT |
| 0172 | 0187 | C064 | LAP | 100 |
| 0173 | 0188 | 9900 086C | STA | REAL |
| 0174 | 0189 | C646 | LAP | 70 |
| 0175 | 018A | 9900 0887 | STA | REAL1 |
| 0176 | 018B | B000 0120 | LLA | =:120 |
| 0177 | 018C | 9900 0863 | STA | EJCT |
| 0178 | 018D | C710 | LAM | 16 |
| 0179 | 018E | 9900 0812 | STA | TEMP |
| 0180 | 018F | B100 08B4 | LLA | WIRE |
| 0181 | 0190 | 9900 0877 | STA | WIREB1 |
| 0182 | 0191 | 0110 | ZAR | |
| 0183 | 0192 | 9900 8877 | STA | *WIREB1 |
| 0184 | 0193 | 1900 0877 | IMS | WIREB1 |
| 0185 | 0194 | 1900 0812 | IMS | TEMP |
| 0186 | 0195 | F603 | JMP | $-3 |
| 0187 | 0196 | C708 | LAM | 8 |
| 0188 | 0197 | 9900 0812 | STA | TEMP |
| 0189 | 0198 | B100 08B3 | LLA | ONLITE |
| 0190 | 0199 | 9900 0884 | STA | BURN |
| 0191 | 019A | 0110 | ZAR | |
| 0192 | 019B | 9900 8884 | STA | *BURN |
| 0193 | 019C | 1900 0884 | IMS | BURN |
| 0194 | 019D | 1900 0812 | IMS | TEMP |
| 0195 | 019E | F603 | JMP | $-3 |
| 0196 | 019F | C601 | LAP | 1 |

```
0197  01A0  9900        STA  NALOW
            0859
0198  01A1  0110        ZAL
0199  01A2  9900        STA  VOLD
            086B
0200  01A3  9900        STA  LOOK1
            085D
0201  01A4  9900        STA  LOOK2
            085E
0202  01A5  9900        STA  FAULT
            0861
0203  01A6  C701        LAM  1
0204  01A7  9900        STA  FLAG
            0813
0205  01A8  C703        LAM  3
0206  01A9  9900        STA  EIGHT
            082F
0207  01AA  B100        LDA  IMFE
            07F6
0208  01AB  9900        STA  LOIM
            0814
0209  01AC  F300        JMP  10
0210  01AD  F800  OLDW  ENT
0211  01AE  0C00        EIN
0212  01AF  6891        OTZ  :91
0213  01B0  6892        OTZ  :92
0214  01B1  4C44        SEL  :44
0215  01B2  4C02        FFE
0216  01B3  0C00        EIN
0217  01B4  4C00        FFE
0218  01B5  F300        JMP  *S+1
0219  01B6  171A        DATA  NEWBIT+:1600
0220  01B7  6891  10    OTZ  :91
0221  01B8  6892        OTZ  :92
0222  01B9  B100        LDA  IMFE1
            07F7
0223  01BA  9900        STA  LOIM1
            07FC
0224  01BB  9900        STA  LOIMD1
            07FA
0225  01BC  B100        LDA  IMFE2
            07F8
0226  01BD  9900        STA  LOIM2
            0815
0227  01BE  9900        STA  LOIMD2
            07FB
0228  01BF  C60F        LAP  15
0229  01C0  9900        STA  WHEEL
            07FF
0230  01C1  0310        NAP
0231  01C2  9900        STA  NEGWL1
            07F2
0232  01C3  9900        STA  NEGWL2
            07F3
0233  01C4  0110        ZAL
0234  01C5  9900        STA  WHEEL1
            07F0
0235  01C6  9900        STA  WHEEL2
            07F1
0236  01C7  B100        LDA  VOLCOR
            08EF
0237  01C8  9900        STA  SERVOL
            0865
0238  01C9  8900        ADD  JMP
            0820
```

Old Wheel (Fig. 26, M1)

| | | | | | |
|---|---|---|---|---|---|
| 0239 | 01CA | 9900 0866 | | STA | SEECOL |
| 0240 | 01CB | B100 F8E0 | | LDA | IMPAL |
| 0241 | 01CC | 9900 07E1 | | STA | SEEIMP |
| 0242 | 01CD | 0C00 | | LIN | |
| 0243 | 01CE | 4091 | | SEL | :91 |
| 0244 | 01CF | 4092 | | SEL | :92 |
| 0245 | 01D0 | 4002 | | SEL | :02 |
| 0246 | 01D1 | 4044 | | SEL | :44 |
| 0247 | 01D2 | 4000 | | SEL | :00 |
| 0248 | 01D3 | 4052 | | SEL | :52 |
| 0249 | 01D4 | 5891 | | INA | :91 |
| 0250 | 01D5 | 5892 | | INA | :92 |
| 0251 | 01D6 | 0110 | | ZAB | |
| 0252 | 01D7 | 9900 07F4 | | STA | IMPEK1 |
| 0253 | 01D8 | 9900 07F5 | | STA | IMPEK2 |
| 0254 | 01D9 | 4952 | BEG | SEN | :52 |
| 0255 | 01DA | F202 | | JMP | $+3 |
| 0256 | 01DB | 4052 | | SEL | :52 |
| 0257 | 01DC | F683 | | JMP | NEWW |
| 0258 | 01DD | 0110 | | ZAB | |
| 0259 | 01DE | 9900 0805 | | STA | SGNF |
| 0260 | 01DF | 0A00 | | EIN | |
| 0261 | 01E0 | 4091 | | SEL | :91 |
| 0262 | 01E1 | 4092 | | SEL | :92 |
| 0263 | 01E2 | 4058 | | SEL | :58 |
| 0264 | 01E3 | 4000 | | MFE | |
| 0265 | 01E4 | 4002 | | FFE | |
| 0266 | 01E5 | B100 0809 | | LDA | ANLS |
| 0267 | 01E6 | C001 | | CAI | 1 |
| 0268 | 01E7 | F900 042E | | JST | ANAL |
| 0269 | 01E8 | 6859 | | OTZ | :59 |
| 0270 | 01E9 | 0A00 | | EIN | |
| 0271 | 01EA | 4950 | | SEN | :50 |
| 0272 | 01EB | F612 | | JMP | BEG |
| 0273 | 01EC | 0C00 | | LIN | |
| 0274 | 01ED | B100 07CE | | LDA | FBNT |
| 0275 | 01EE | C001 | | CAI | 1 |
| 0276 | 01EF | F100 076D | | JMP | FBNT |
| 0277 | 01F0 | 2157 | | JAZ | BEG |
| 0278 | 01F1 | F100 88E2 | | JMP | *FTLIN |
| 0279 | 01F2 | 0800 | INT | ENT | |
| 0280 | 01F3 | 9900 080A | | STA | AREG |
| 0281 | 01F4 | E900 080B | | STX | XREG |
| 0282 | 01F5 | 4042 | | SEL | :42 |
| 0283 | 01F6 | 4040 | | SEL | :40 |
| 0284 | 01F7 | 0000 | | NOP | |
| 0285 | 01F8 | 0000 | | NOP | |
| 0286 | 01F9 | 1400 | | SOV | |
| 0287 | 01FA | F900 05F5 | | JST | HOTAUT |
| 0288 | 01FB | F900 05E0 | | JST | COOLOF |

Start New Set-Up Signal (Fig. 24)

Impulse Data Collection (Fig. 26, N

| | | | | | |
|---|---|---|---|---|---|
| 0289 | 01FC | 5891 | | INA | :91 |
| 0290 | 01FD | C001 | | CAI | 1 |
| 0291 | 01FE | F20F | | JMP | BANK2 |
| 0292 | 01FF | 4094 | | SEL | :94 |
| 0293 | 0200 | B100 07F4 | | LDA | IMPBK1 |
| 0294 | 0201 | C015 | | CAI | 21 |
| 0295 | 0202 | F21D | | JMP | LEAVE |
| 0296 | 0203 | D900 07F4 | | IMS | IMPBK1 |
| 0297 | 0204 | B100 07F5 | | LDA | IMPBK2 |
| 0298 | 0205 | 2103 | | JAZ | AB |
| 0299 | 0206 | D100 07F4 | | CMS | IMPBK1 |
| 0300 | 0207 | F218 | | JMP | LEAVE |
| 0301 | 0208 | 0000 | | NOP | |
| 0302 | 0209 | C732 | AB | LAM | 50 |
| 0303 | 020A | 9819 | | STA | PUT |
| 0304 | 020B | 0110 | | ZAR | |
| 0305 | 020C | 9900 07E6 | | STA | STATUS |
| 0306 | 020D | F212 | | JMP | LEAVE |
| 0307 | 020E | 4098 | BANK2 | SEL | :98 |
| 0308 | 020F | B100 07F5 | | LDA | IMPBK2 |
| 0309 | 0210 | C000 | | CAI | 0 |
| 0310 | 0211 | F900 06EC | | JST | CONV |
| 0311 | 0212 | B100 07F5 | | LDA | IMPBK2 |
| 0312 | 0213 | C015 | | CAI | 21 |
| 0313 | 0214 | F20B | | JMP | LEAVE |
| 0314 | 0215 | D900 07F5 | | IMS | IMPBK2 |
| 0315 | 0216 | B100 07F4 | | LDA | IMPBK1 |
| 0316 | 0217 | 2103 | | JAZ | AC |
| 0317 | 0218 | D100 07F5 | | CMS | IMPBK2 |
| 0318 | 0219 | F206 | | JMP | LEAVE |
| 0319 | 021A | 0000 | | NOP | |
| 0320 | 021B | C732 | AC | LAM | 50 |
| 0321 | 021C | 9819 | | STA | PUT |
| 0322 | 021D | C001 | | LAP | 1 |
| 0323 | 021E | 9900 07E6 | | STA | STATUS |
| 0324 | 021F | F200 | | JMP | LEAVE |
| 0325 | 0220 | B100 080A | LEAVE | LDA | AREG |
| 0326 | 0221 | E100 080B | | LDX | XREG |
| 0327 | 0222 | 0A00 | | EIN | |
| 0328 | 0223 | F731 | | JMP | *INT |
| 0329 | 0224 | 0800 | ADC | ENT | |
| 0330 | 0225 | 9900 080D | | STA | ASTOR |
| 0331 | 0226 | F900 080E | | STX | XSTOR |
| 0332 | 0227 | 4044 | | SEL | :44 |
| 0333 | 0228 | B100 08DF | | LDA | NOSPOT |
| 0334 | 0229 | 9900 08E2 | | STA | NOWELD |

```
0335  0227  0000              NOP
0336  022B  0000              NOP
0337  022C  0000              NOP
0338  022D  1200              LOV
0339  022E  409F    GATHER    SEL   :9F
0340  022F  B100              LDA   STATUS
      07E6
0341  0230  C001              CAI   1
0342  0231  F202              JMP   $+3
0343  0232  4094              SEL   :94
0344  0233  F201              JMP   $+2
0345  0234  4098              SEL   :98
0346  0235  C702              LAM   2
0347  0236  9900              STA   HOME
      07E5
0348  0237  B100              LDA   PROC
      08DF
0349  0238  9900              STA   POINT
      07E4
0350  0239  4099              SEN   :99
0351  023A  F601              JMP   $-1
0352  023B  C704    COLEC     LAM   4
0353  023C  9900              STA   SKIP
      07E3
0354  023D  5099              INA   :99
0355  023E  9900              STA   *POINT
      87E4
0356  023F  D900              IMS   POINT
      07E4
0357  0240  D900              IMS   POINT
      07E4
0358  0241  4099              SEL   :99
0359  0242  D900              IMS   SKIP
      07E3
0360  0243  F606              JMP   $-6
0361  0244  C001              LAP   1
0362  0245  8900              ADD   PROC
      08DF
0363  0246  9900              STA   POINT
      07E4
0364  0247  D900              IMS   HOME
      07E5
0365  0248  F60D              JMP   COLEC
0366  0249  E100              LDX   WIRE
      08B4
0367  024A  F900              STX   WIREB1
      0877
0368  024B  C608              LAP   8
0369  024C  8900              ADD   WIRE
      08B4
0370  024D  9900              STA   WIREB2
      0878
0371  024E  C704              LAM   4
0372  024F  9900              STA   SKIP
      07E3
0373  0250  B100              LDA   PROC
      08DF
0374  0251  9900              STA   POINT
      07E4
0375  0252  B100    CALVOL    LDA   *POINT
      87E4
0376  0253  9100              SUB   OFFSET
      08BE
0377  0254  3081              JAP   $+2
```

| | | | | | |
|---|---|---|---|---|---|
| 0378 | 0255 | 0310 | | NOP | |
| 0379 | 0256 | D100 | | CMS | REAL |
| | | 0860 | | | |
| 0380 | 0257 | FA4A | | JST | ERROR1 |
| 0381 | 0258 | 0000 | | NOP | |
| 0382 | 0259 | D900 | | IMS | POINT |
| | | 07E4 | | | |
| 0383 | 025A | D900 | | IMS | POINT |
| | | 07E4 | | | |
| 0384 | 025B | D900 | | IMS | SKIP |
| | | 07E3 | | | |
| 0385 | 025C | F60A | | JMP | BADVOL |
| 0386 | 025D | B100 | | LDA | PROC |
| | | 08BF | | | |
| 0387 | 025E | 9900 | | STA | POINT |
| | | 07E4 | | | |
| 0388 | 025F | C7E4 | | LAM | 4 |
| 0389 | 0260 | 9900 | | STA | SKIP |
| | | 07E3 | | | |
| 0390 | 0261 | B100 | | LDA | STATUS |
| | | 07E6 | | | |
| 0391 | 0262 | C001 | | CAI | 1 |
| 0392 | 0263 | F252 | | JMP | OKPRO2 |
| 0393 | 0264 | B100 | OKPRO1 | LDA | *POINT |
| | | 87E4 | | | |
| 0394 | 0265 | 9100 | | SUB | OFFSET |
| | | 08BE | | | |
| 0395 | 0266 | 9900 | | STA | V |
| | | 0801 | | | |
| 0396 | 0267 | E100 | | LDX | FWRKG |
| | | 07CD | | | |
| 0397 | 0268 | 2802 | | JXZ | $+3 |
| 0398 | 0269 | 9900 | | STA | *SEEVOL |
| | | 8865 | | | |
| 0399 | 026A | D900 | | IMS | SEEVOL |
| | | 0865 | | | |
| 0400 | 026B | 3085 | | JAP | $+6 |
| 0401 | 026C | 0310 | | NOP | |
| 0402 | 026D | E100 | | LDX | *WIREB1 |
| | | 8877 | | | |
| 0403 | 026E | 00A8 | | DXR | |
| 0404 | 026F | E900 | | STX | *WIREB1 |
| | | 8877 | | | |
| 0405 | 0270 | F203 | | JMP | $+4 |
| 0406 | 0271 | E100 | | LDX | *WIREB1 |
| | | 8877 | | | |
| 0407 | 0272 | 0128 | | IXR | |
| 0408 | 0273 | E900 | | STX | *WIREB1 |
| | | 8877 | | | |
| 0409 | 0274 | D900 | | IMS | WIREB1 |
| | | 0877 | | | |
| 0410 | 0275 | 9900 | | STA | V |
| | | 0801 | | | |
| 0411 | 0276 | D900 | | IMS | POINT |
| | | 07E4 | | | |
| 0412 | 0277 | B100 | | LDA | *POINT |
| | | 87E4 | | | |
| 0413 | 0278 | 9100 | | SUB | OFFSET |
| | | 08BE | | | |
| 0414 | 0279 | 9900 | | STA | C |
| | | 0803 | | | |
| 0415 | 027A | E100 | | LDX | FWRKG |

| | | 07CD | | |
|---|---|---|---|---|
| 0416 | 027B | 2802 | JXZ | $+3 |
| 0417 | 027C | 9900 | STA | *SEECUR |
| | | 8866 | | |
| 0418 | 027D | D900 | IMS | SEECUR |
| | | 8866 | | |
| 0419 | 027E | 3085 | JAP | $+6 |
| 0420 | 027F | 0310 | NAR | |
| 0421 | 0280 | E100 | LDX | *WIREB1 |
| | | 8877 | | |
| 0422 | 0281 | 00A8 | DXR | |
| 0423 | 0282 | E900 | STX | *WIREB1 |
| | | 8877 | | |
| 0424 | 0283 | F203 | JMP | $+4 |
| 0425 | 0284 | E100 | LDX | *WIREB1 |
| | | 8877 | | |
| 0426 | 0285 | 0128 | IXR | |
| 0427 | 0286 | E900 | STX | *WIREB1 |
| | | 8877 | | |
| 0428 | 0287 | D900 | IMS | WIREB1 |
| | | 8877 | | |
| 0429 | 0288 | D100 | CMS | REAL1 |
| | | 0887 | | |
| 0430 | 0289 | FA1E | JST | ERROR2 |
| 0431 | 028A | 0000 | NOP | |
| 0432 | 028B | D900 | IMS | POINT |
| | | 07E4 | | |
| 0433 | 028C | 1053 | ALA | 4 |
| 0434 | 028D | 9900 | STA | TEMP |
| | | 0812 | | |
| 0435 | 028E | B100 | LDA | V |
| | | 0801 | | |
| 0436 | 028F | 0108 | ZXR | |
| 0437 | 0290 | F900 | JST | *UFDIV: |
| | | 88E3 | | |
| 0438 | 0291 | 0812 | DATA | TEMP |
| 0439 | 0292 | 10A8 | ARX | 1 |
| 0440 | 0293 | E900 | STX | *LOIM1 |
| | | 87FC | | |
| 0441 | 0294 | F100 | LDA | FWRKG |
| | | 07CD | | |
| 0442 | 0295 | 2102 | JAZ | $+3 |
| 0443 | 0296 | E900 | STX | *SEEIMP |
| | | 87E1 | | |
| 0444 | 0297 | D900 | IMS | SEEIMP |
| | | 07E1 | | |
| 0445 | 0298 | D900 | IMS | LOIM1 |
| | | 87FC | | |
| 0446 | 0299 | D900 | IMS | SKIP |
| | | 07E3 | | |
| 0447 | 029A | F636 | JMP | OKRR01 |
| 0448 | 029B | B100 | LDA | FLAG |
| | | 0813 | | |
| 0449 | 029C | 2092 | JAM | RESTOR |
| 0450 | 029D | E100 | LDA | IMPBR1 |
| | | 87F4 | | |
| 0451 | 029E | C001 | CAI | 1 |
| 0452 | 029F | F28F | JMP | RESTOR |
| 0453 | 02A0 | F900 | JST | CALC |
| | | 04FC | | |
| 0454 | 02A1 | F08B | JMP | RESTOR |
| 0455 | 02A2 | 0800 | ERROR1 | ENT |

Check for First 15 (Fig. 26, M3)

| | | | | | |
|---|---|---|---|---|---|
| 0456 | 02A3 | B100 0861 | | LDA | FAULT |
| 0457 | 02A4 | 3102 | | JAN | $+3 |
| 0458 | 02A5 | D900 0861 | | IMS | FAULT |
| 0459 | 02A6 | F678 | | JMP | GATHER |
| 0460 | 02A7 | F705 | | JIN | ERROR1 |
| 0461 | 02A8 | 0800 | ERROR2 | ENT | |
| 0462 | 02A9 | C604 | | LAP | 4 |
| 0463 | 02AA | 8900 07E3 | | ADD | SKIP |
| 0464 | 02AB | 8900 08DB | | ADD | NOSPOT |
| 0465 | 02AC | 9900 0802 | | STA | NOWELD |
| 0466 | 02AD | D900 8802 | | IMS | *NOWELD |
| 0467 | 02AE | F706 | | JIN | ERROR2 |
| 0468 | 02AF | 6820 | RESTOR | OTZ | :20 |
| 0469 | 02B0 | 0110 | | ZAR | |
| 0470 | 02B1 | 9900 0861 | | STA | FAULT |
| 0471 | 02B2 | B100 080D | | LDA | ASTOR |
| 0472 | 02B3 | E100 080E | | LDX | XSTOR |
| 0473 | 02B4 | 6A00 | | EIN | |
| 0474 | 02B5 | F791 | | JMP | *ADC |
| 0475 | 02B6 | B100 87E4 | OKPRO2 | LDA | *POINT |
| 0476 | 02B7 | 9100 08BE | | SUB | OFFSET |
| 0477 | 02B8 | 9900 0801 | | STA | V |
| 0478 | 02B9 | E100 07CD | | LDX | FWRKG |
| 0479 | 02BA | 2802 | | JXZ | $+3 |
| 0480 | 02BB | 9900 8865 | | STA | *SEEVOL |
| 0481 | 02BC | D900 0865 | | IMS | SEEVOL |
| 0482 | 02BD | 3085 | | JAP | $+6 |
| 0483 | 02BE | 0310 | | NAR | |
| 0484 | 02BF | E100 8878 | | LDX | *WIREB2 |
| 0485 | 02C0 | 00A8 | | LXR | |
| 0486 | 02C1 | E900 8878 | | STX | *WIREB2 |
| 0487 | 02C2 | F203 | | JMP | $+4 |
| 0488 | 02C3 | B100 8878 | | LDA | *WIREB2 |
| 0489 | 02C4 | 0128 | | IXR | |
| 0490 | 02C5 | E900 8878 | | STX | *WIREB2 |
| 0491 | 02C6 | D900 0878 | | IMS | WIREB2 |
| 0492 | 02C7 | 9900 0801 | | STA | V |
| 0493 | 02C8 | D900 07E4 | | IMS | POINT |
| 0494 | 02C9 | B100 87E4 | | LDA | *POINT |

| | | | | |
|---|---|---|---|---|
| 0495 | 02CA | 9100 08BE | SUB | OFFSET |
| 0496 | 02CB | 9900 0803 | STA | C |
| 0497 | 02CC | E100 07CD | LDA | FWRKG |
| 0498 | 02CD | 2802 | JXZ | $+3 |
| 0499 | 02CE | 9900 8866 | STA | *SEECUR |
| 0500 | 02CF | D900 0866 | IMS | SEECUR |
| 0501 | 02D0 | 3085 | JAP | $+6 |
| 0502 | 02D1 | 0310 | NAR | |
| 0503 | 02D2 | E100 8878 | LDX | *WIREB2 |
| 0504 | 02D3 | 0048 | DXR | |
| 0505 | 02D4 | E900 8878 | STX | *WIREB2 |
| 0506 | 02D5 | F203 | JMP | $+4 |
| 0507 | 02D6 | E100 8878 | LDX | *WIREB2 |
| 0508 | 02D7 | 0128 | IXR | |
| 0509 | 02D8 | E900 8878 | STX | *WIREB2 |
| 0510 | 02D9 | D900 0878 | IMS | WIREB2 |
| 0511 | 02DA | D100 0887 | CMS | REAL1 |
| 0512 | 02DB | FE33 | JST | ERROR2 |
| 0513 | 02DC | 0000 | NOP | |
| 0514 | 02DD | D900 0866 | IMS | SEECUR |
| 0515 | 02DE | D900 07E4 | IMS | POINT |
| 0516 | 02DF | 1053 | ALA | 4 |
| 0517 | 02E0 | 9900 0811 | STA | TEMPC |
| 0518 | 02E1 | E100 0801 | LDA | V |
| 0519 | 02E2 | 0108 | ZXR | |
| 0520 | 02E3 | F900 88E3 | JST | *UFDIV: |
| 0521 | 02E4 | 0811 | DATA | TEMPC |
| 0522 | 02E5 | 10A8 | ARX | 1 |
| 0523 | 02E6 | E900 8815 | STX | *LOIM2 |
| 0524 | 02E7 | E100 07CD | LDA | FWRKG |
| 0525 | 02E8 | 2102 | JAZ | $+3 |
| 0526 | 02E9 | E900 87E1 | STX | *SEEIMP |
| 0527 | 02EA | D900 07E1 | IMS | SEEIMP |
| 0528 | 02EB | D900 0815 | IMS | LOIM2 |
| 0529 | 02EC | D900 07E2 | IMS | SKIP |
| 0530 | 02ED | F637 | JMP | OKPP02 |
| 0531 | 02EE | E100 0813 | LDA | FLAG |
| 0532 | 02EF | 3001 | JAP | $+2 |
| 0533 | 02F0 | F641 | JMP | RESTOR |

| | | | | | |
|---|---|---|---|---|---|
| 0534 | 02F1 | B100 07F5 | | LDA | IMPRK2 |
| 0535 | 02F2 | C001 | | CAI | 1 |
| 0536 | 02F3 | F044 | | JMP | RESTOR |
| 0537 | 02F4 | F900 04FC | | JST | CALC |
| 0538 | 02F5 | F046 | | JMP | RESTOR |
| 0539 | 02F6 | 0800 | RESET | ENT | |
| 0540 | 02F7 | 9900 080F | | STA | AREGS |
| 0541 | 02F8 | E900 0810 | | STX | XREGS |
| 0542 | 02F9 | CC00 | | DIN | |
| 0543 | 02FA | 6891 | | OIZ | :91 |
| 0544 | 02FB | 6892 | | OIZ | :92 |
| 0545 | 02FC | 5892 | | INA | :92 |
| 0546 | 02FD | B100 07F4 | | LDA | IMPRK1 |
| 0547 | 02FF | 8900 07F5 | | ALD | IMPRK2 |
| 0548 | 02FF | C000 | | CAI | 0 |
| 0549 | 0300 | F100 0412 | | JMP | GETOUT |
| 0550 | 0301 | 2401 | | JSR | $+2 |
| 0551 | 0302 | F243 | | JMP | FSET |
| 0552 | 0303 | B100 07CB | | LDA | FFRN1 |
| 0553 | 0304 | 2101 | | JAZ | $+2 |
| 0554 | 0305 | F24A | | JMP | FSKIPA |
| 0555 | 0306 | 5801 | | ISA | |
| 0556 | 0307 | 1300 | | LRA | 1 |
| 0557 | 0308 | C048 | FSET | TAX | |
| 0558 | 0309 | B100 07CD | | LDA | FWRKG |
| 0559 | 030A | 2119 | | JAZ | FSETA |
| 0560 | 030B | B100 07CC | | LDA | FLMRM |
| 0561 | 030C | 3117 | | JAN | FSETA |
| 0562 | 030D | 5892 | | INA | :92 |
| 0563 | 030E | 2107 | | JAZ | EBK1 |
| 0564 | 030F | B100 07C7 | EBK2 | LDA | FVC2 |
| 0565 | 0310 | 310C | | JAN | FPRST |
| 0566 | 0311 | B100 07CB | | LDA | FIMP2 |
| 0567 | 0312 | 310A | | JAN | FFRST |
| 0568 | 0313 | B100 07C9 | | LDA | FVCI2 |
| 0569 | 0314 | 3108 | | JAN | FFRST |
| 0570 | 0315 | F234 | | JMP | FSKI |
| 0571 | 0316 | B100 07C6 | EBK1 | LDA | FVC1 |
| 0572 | 0317 | 3105 | | JAN | FFRST |
| 0573 | 0318 | B100 07CA | | LDA | FIMI1 |
| 0574 | 0319 | 3103 | | JAN | FFRST |
| 0575 | 031A | B100 07C8 | | LDA | FVCI1 |
| 0576 | 031B | 3101 | | JAN | FFRST |
| 0577 | 031C | F221 | | JMP | FSRF |
| 0578 | 031D | C001 | FPRST | LAI | 1 |
| 0579 | 031E | 9900 | | STA | FFRN1 |

Reset (Fig. 26, M6) and (Fig. 31)

| | | | | | |
|---|---|---|---|---|---|
| 0580 | 031F | 07CE 5892 | | INA | :92 |
| 0581 | 0320 | 9900 07D6 | | STA | SAVBK |
| 0582 | 0321 | 0110 | | ZAR | |
| 0583 | 0322 | 9900 07CD | | STA | FWRKG |
| 0584 | 0323 | F226 | | JMP | FSKP |
| 0585 | 0324 | 0030 | FSETA | TXA | |
| 0586 | 0325 | 0108 | | ZXR | |
| 0587 | 0326 | E900 07C6 | | STX | FVC1 |
| 0588 | 0327 | E900 07C7 | | STX | FVC2 |
| 0589 | 0328 | E900 07CA | | STX | FIMP1 |
| 0590 | 0329 | E900 07CB | | STX | FIMP2 |
| 0591 | 032A | E900 07C8 | | STX | FVCI1 |
| 0592 | 032B | E900 07C9 | | STX | FVCI2 |
| 0593 | 032C | E900 07CC | | STX | FDMFM |
| 0594 | 032D | E900 07CF | | STX | FMEAN |
| 0595 | 032E | C401 | | LXR | 1 |
| 0596 | 032F | C000 | | CAI | 0 |
| 0597 | 0330 | E900 07C6 | | STX | FVC1 |
| 0598 | 0331 | C001 | | CAI | 1 |
| 0599 | 0332 | E900 07C7 | | STX | FVC2 |
| 0600 | 0333 | C002 | | CAI | 2 |
| 0601 | 0334 | E900 07CA | | STX | FIMP1 |
| 0602 | 0335 | C003 | | CAI | 3 |
| 0603 | 0336 | E900 07CB | | STX | FIMP2 |
| 0604 | 0337 | C004 | | CAI | 4 |
| 0605 | 0338 | E900 07C8 | | STX | FVCI1 |
| 0606 | 0339 | C005 | | CAI | 5 |
| 0607 | 033A | E900 07C9 | | STX | FVCI2 |
| 0608 | 033B | C006 | | CAI | 6 |
| 0609 | 033C | E900 07CC | | STX | FDMFM |
| 0610 | 033D | C007 | | CAI | 7 |
| 0611 | 033E | F204 | | JMP | $+5 |
| 0612 | 033F | D100 07CE | | LDA | FFRNT |
| 0613 | 0340 | 3101 | | JAN | $+2 |
| 0614 | 0341 | E900 07CD | | STX | FWRKG |
| 0615 | 0342 | F202 | | JMP | $+3 |
| 0616 | 0343 | E900 07CF | | STX | FMEAN |
| 0617 | 0344 | E900 07CE | | STX | FFRNT |
| 0618 | 0345 | F204 | | JMP | FSKP |
| 0619 | 0346 | 0110 | FRSET | ZAR | |

| | | | | | |
|---|---|---|---|---|---|
| 0620 | 0347 | 9900 | | STA | FFRNT |
| | | 07CE | | | |
| 0621 | 0348 | 9900 | | STA | FWRKG |
| | | 07CD | | | |
| 0622 | 0349 | 0000 | | NOP | |
| 0623 | 034A | B100 | FSKP | LDA | VOLCUR |
| | | 08DF | | | |
| 0624 | 034B | 9900 | | STA | SEEVOL |
| | | 0865 | | | |
| 0625 | 034C | 8900 | | ADD | JMP |
| | | 0820 | | | |
| 0626 | 034D | 9900 | | STA | SEECUR |
| | | 0866 | | | |
| 0627 | 034E | B100 | | LDA | IMPAR |
| | | 08E0 | | | |
| 0628 | 034F | 9900 | | STA | SEEIMP |
| | | 07E1 | | | |
| 0629 | 0350 | 0110 | FSKPA | ZAR | |
| 0630 | 0351 | 9900 | | STA | LOOK1 |
| | | 085E | | | |
| 0631 | 0352 | 9900 | | STA | LOOK2 |
| | | 085F | | | |
| 0632 | 0353 | 5892 | | INA | :92 |
| 0633 | 0354 | C001 | | CAI | 1 |
| 0634 | 0355 | F230 | | JMP | EAN2 |
| 0635 | 0356 | B100 | | LDA | IMPEK1 |
| | | 07F4 | | | |
| 0636 | 0357 | 0310 | | NAR | |
| 0637 | 0358 | 9900 | | STA | NOIMP1 |
| | | 0819 | | | |
| 0638 | 0359 | D900 | | IMS | WHEEL1 |
| | | 07F6 | | | |
| 0639 | 035A | E100 | | LDX | WHEEL1 |
| | | 07F6 | | | |
| 0640 | 035B | D100 | | LDA | JMP |
| | | 0820 | | | |
| 0641 | 035C | F900 | | JST | *MPYS: |
| | | 88E5 | | | |
| 0642 | 035D | 1900 | | LLL | 1 |
| 0643 | 035E | 11A8 | | RRX | 1 |
| 0644 | 035F | 0030 | | TXA | |
| 0645 | 0360 | 8900 | | ADD | IMPE1 |
| | | 07F7 | | | |
| 0646 | 0361 | 9900 | | STA | LOIM1 |
| | | 07FC | | | |
| 0647 | 0362 | 9900 | | STA | LOIMD1 |
| | | 07FA | | | |
| 0648 | 0363 | C704 | | LAM | 4 |
| 0649 | 0364 | 9900 | | STA | R1P |
| | | 0845 | | | |
| 0650 | 0365 | E100 | | LDX | WIRE |
| | | 08B4 | | | |
| 0651 | 0366 | E900 | | STX | WIREE1 |
| | | 0877 | | | |
| 0652 | 0367 | B100 | | LDA | ONLITE |
| | | 08F3 | | | |
| 0653 | 0368 | 9900 | | STA | BURNB1 |
| | | 087B | | | |
| 0654 | 0369 | C702 | | LAM | 2 |
| 0655 | 036A | 9900 | | STA | T1P |
| | | 0879 | | | |
| 0656 | 036B | B100 | R1 | LDA | *WIRER1 |

| | | | | | |
|---|---|---|---|---|---|
| | | 8877 | | | |
| 0657 | 036C | 3081 | | JAI | $+2 |
| 0658 | 036D | 0310 | | NAR | |
| 0659 | 036E | D100 | | CMS | IMPBK1 |
| | | 07F4 | | | |
| 0660 | 036F | F20A | | JMP | $+11 |
| 0661 | 0370 | 0000 | | NOP | |
| 0662 | 0371 | C601 | | LAP | 1 |
| 0663 | 0372 | 9900 | | STA | *BURNB1 |
| | | 887B | | | |
| 0664 | 0373 | C605 | | LAP | 5 |
| 0665 | 0374 | 8900 | | ADD | RIP |
| | | 0845 | | | |
| 0666 | 0375 | F900 | | JST | ALARM |
| | | 0636 | | | |
| 0667 | 0376 | D900 | | IMS | WIREB1 |
| | | 0877 | | | |
| 0668 | 0377 | D900 | | IMS | TIP |
| | | 0879 | | | |
| 0669 | 0378 | D900 | | IMS | WIREB1 |
| | | 0877 | | | |
| 0670 | 0379 | F205 | | JMP | $+6 |
| 0671 | 037A | 0110 | | ZAR | |
| 0672 | 037B | 9900 | | STA | *BURNB1 |
| | | 887B | | | |
| 0673 | 037C | D900 | | IMS | WIREB1 |
| | | 0877 | | | |
| 0674 | 037D | D900 | | IMS | TIP |
| | | 0879 | | | |
| 0675 | 037E | F613 | | JMP | K1 |
| 0676 | 037F | D900 | | IMS | BURNB1 |
| | | 087B | | | |
| 0677 | 0380 | D900 | | IMS | RIP |
| | | 0845 | | | |
| 0678 | 0381 | F618 | | JMP | K1-2 |
| 0679 | 0382 | D900 | | IMS | NEGWL1 |
| | | 07F2 | | | |
| 0680 | 0383 | F234 | | JMP | DONE |
| 0681 | 0384 | FA91 | | JST | SETANL |
| 0682 | 0385 | F232 | | JMP | DONE |
| 0683 | 0386 | E100 | BAN2 | LDA | IMPBK2 |
| | | 07F5 | | | |
| 0684 | 0387 | 0310 | | NAR | |
| 0685 | 0388 | 9900 | | STA | NOIMP2 |
| | | 081A | | | |
| 0686 | 0389 | D900 | | IMS | WHEEL2 |
| | | 07F1 | | | |
| 0687 | 038A | E100 | | LDX | WHEEL2 |
| | | 07F1 | | | |
| 0688 | 038B | B100 | | LDA | JMP |
| | | 0820 | | | |
| 0689 | 038C | F900 | | JST | *MPYS |
| | | 88B5 | | | |
| 0690 | 038D | 1900 | | LRL | 1 |
| 0691 | 038E | 11A8 | | RIX | 1 |
| 0692 | 038F | 0030 | | TAR | |
| 0693 | 0390 | 8900 | | ADD | IMP2 |
| | | 07F8 | | | |
| 0694 | 0391 | 9900 | | STA | LOIM2 |
| | | 0815 | | | |
| 0695 | 0392 | 9900 | | STA | LOIMB2 |
| | | 07FB | | | |

Part Counter (Fig. 26, M7)

| | | | | | |
|---|---|---|---|---|---|
| 0696 | 0393 | C704 | | LAM | 4 |
| 0697 | 0394 | 9900 0845 | | STA | RIP |
| 0698 | 0395 | C608 | | LAP | 8 |
| 0699 | 0396 | 8900 08D4 | | ADD | WIRE |
| 0700 | 0397 | 9900 0878 | | STA | WIREB2 |
| 0701 | 0398 | C604 | | LAP | 4 |
| 0702 | 0399 | 8900 08B3 | | ADD | ONLITE |
| 0703 | 039A | 9900 087A | | STA | BURNB2 |
| 0704 | 039B | C702 | | LAM | 2 |
| 0705 | 039C | 9900 0879 | | STA | TIP |
| 0706 | 039D | B100 8878 | K2 | LDA | *WIREB2 |
| 0707 | 039E | 3081 | | JAP | $+2 |
| 0708 | 039F | 0310 | | NAR | |
| 0709 | 03A0 | L100 07F5 | | CMS | IMPFK2 |
| 0710 | 03A1 | F20A | | JMP | $+11 |
| 0711 | 03A2 | 0000 | | NOP | |
| 0712 | 03A3 | C601 | | LAP | 1 |
| 0713 | 03A4 | 9900 887A | | STA | *BURNB2 |
| 0714 | 03A5 | C609 | | LAP | 9 |
| 0715 | 03A6 | 8900 0845 | | ADD | RIP |
| 0716 | 03A7 | F900 0636 | | JST | ALARM |
| 0717 | 03A8 | D900 0878 | | IMS | WIREB2 |
| 0718 | 03A9 | D900 0879 | | IMS | TIP |
| 0719 | 03AA | D900 0878 | | IMS | WIREB2 |
| 0720 | 03AB | F205 | | JMP | $+6 |
| 0721 | 03AC | 0110 | | ZAR | |
| 0722 | 03AD | 9900 887A | | STA | *BURNB2 |
| 0723 | 03AE | D900 0878 | | IMS | WIREB2 |
| 0724 | 03AF | D900 0879 | | IMS | TIP |
| 0725 | 03B0 | F613 | | JMP | K2 |
| 0726 | 03B1 | D900 087A | | IMS | BURNB2 |
| 0727 | 03B2 | D900 0845 | | IMS | RIP |
| 0728 | 03B3 | F618 | | JMP | K2-2 |
| 0729 | 03B4 | D900 07F3 | | IMS | NEGWL2 |
| 0730 | 03B5 | F202 | | JMP | DONE |
| 0731 | 03B6 | F05F | | JST | SETANL |
| 0732 | 03B7 | F200 | | JMP | DONE |
| 0733 | 03B8 | F900 0655 | DONE | JST | DUMP |
| 0734 | 03B9 | B100 08B5 | | LDA | SINCE |
| 0735 | 03BA | 9900 | | STA | VINCE |

| | | | | | |
|---|---|---|---|---|---|
| 0736 | 03BB | B100 0856 | | LDA | SETH |
| 0737 | 03BC | 9900 08D3 | | STA | WIPEH |
| 0738 | 03BD | B100 0893 | | LDA | SETL |
| 0739 | 03BE | 9900 08D4 | | STA | WIPEL |
| 0740 | 03BF | B100 0894 | | LDA | SETCH |
| 0741 | 03C0 | 9900 08D5 | | STA | CNTH |
| 0742 | 03C1 | B100 0896 | | LDA | SETCL |
| 0743 | 03C2 | 9900 08D6 | | STA | CNTL |
| 0744 | 03C3 | B100 0895 | | LDA | SETROL |
| 0745 | 03C4 | 9900 08DA | | STA | ROSOML |
| 0746 | 03C5 | B100 0890 | | LDA | SETROH |
| 0747 | 03C6 | 9900 08D9 | | STA | ROSOMH |
| 0748 | 03C7 | B100 088F | | LDA | CUMDMP |
| 0749 | 03C8 | 9900 08D8 | | STA | SEGDMP |
| 0750 | 03C9 | E100 088E | | LDX | WIPE |
| 0751 | 03CA | E900 08D4 | | STX | WIPEB1 |
| 0752 | 03CB | C608 0877 | | LAP | 8 |
| 0753 | 03CC | 8900 | | ADD | WIPE |
| 0754 | 03CD | 9900 08B4 | | STA | WIPEB2 |
| 0755 | 03CE | B100 0878 | | LDA | NOSPOT |
| 0756 | 03CF | 9900 08DB | | STA | NOWELD |
| 0757 | 03D0 | C704 0802 | | LAM | 4 |
| 0758 | 03D1 | 9900 | | STA | RIP |
| 0759 | 03D2 | 0110 0845 | | ZAR | |
| 0760 | 03D3 | 9900 8856 | R4 | STA | *WINCE |
| 0761 | 03D4 | 9900 8893 | | STA | *WIPEH |
| 0762 | 03D5 | 9900 8894 | | STA | *WIPEL |
| 0763 | 03D6 | 9900 8896 | | STA | *CNTH |
| 0764 | 03D7 | 9900 8895 | | STA | *CNTL |
| 0765 | 03D8 | 9900 8890 | | STA | *ROSOML |
| 0766 | 03D9 | 9900 888F | | STA | *ROSOMH |
| 0767 | 03DA | 9900 888E | | STA | *SEGDMP |

| | | | | |
|---|---|---|---|---|
| 0768 | 03DB | 9900 8862 | STA | *NOWELD |
| 0769 | 03DC | 9900 8877 | STA | *WIREB1 |
| 0770 | 03DD | 9900 8878 | STA | *WIREB2 |
| 0771 | 03DE | D900 0877 | IMS | WIREB1 |
| 0772 | 03DF | D900 0878 | IMS | WIREB2 |
| 0773 | 03E0 | 9900 8877 | STA | *WIREB1 |
| 0774 | 03E1 | 9900 8878 | STA | *WIREB2 |
| 0775 | 03E2 | D900 0877 | IMS | WIREB1 |
| 0776 | 03E3 | D900 0878 | IMS | WIREB2 |
| 0777 | 03E4 | D900 0856 | IMS | WINCE |
| 0778 | 03E5 | D900 0893 | IMS | WIFEH |
| 0779 | 03E6 | D900 0894 | IMS | WIFEL |
| 0780 | 03E7 | D900 0896 | IMS | CN1H |
| 0781 | 03E8 | D900 0895 | IMS | CN1L |
| 0782 | 03E9 | D900 089D | IMS | RJSJML |
| 0783 | 03EA | D900 088F | IMS | RJSJMH |
| 0784 | 03EB | D900 088E | IMS | SEGLMP |
| 0785 | 03EC | D900 0862 | IMS | NOWELD |
| 0786 | 03ED | D900 0845 | IMS | RIF |
| 0787 | 03EE | F61B | JMP | R4 |
| 0788 | 03EF | 0110 | ZAR | |
| 0789 | 03F0 | 9900 0858 | STA | MAXI |
| 0790 | 03F1 | 5892 | INA | :92 |
| 0791 | 03F2 | C001 | CAI | 1 |
| 0792 | 03F3 | F211 | JMP | R8 |
| 0793 | 03F4 | C004 | LAI | 4 |
| 0794 | 03F5 | 8900 07F4 | ADD | IMPRK1 |
| 0795 | 03F6 | D100 07FF | CMS | IMCT11 |
| 0796 | 03F7 | F201 | JMP | $+2 |
| 0797 | 03F8 | F203 | JMP | $+4 |
| 0798 | 03F9 | D100 08E8 | LDA | WORD |
| 0799 | 03FA | A100 08E8 | IOR | FOR1 |
| 0800 | 03FB | 9900 08E8 | STA | WORD |
| 0801 | 03FC | D100 07F4 | LDA | IMPRK1 |
| 0802 | 03FD | 9900 07FF | STA | IMCT11 |

```
0803   03FE   10D0           ARA    1
0804   03FF   0150           IAR
0805   0400   0150           IAR
0806   0401   9900           STA    MIN
              0846
0807   0402   0110           ZAR
0808   0403   9900           STA    IMPRK1
              07F4
0809   0404   F20C           JMP    h7
0810   0405   C604    h8     LAR    4
0811   0406   8900           ADD    IMPRK2
              07F5
0812   0407   D100           CMS    IMCTI2
              0860
0813   0408   F201           JMP    $+2
0814   0409   F203           JMP    $+4
0815   040A   B100           LDA    WORD
              0868
0816   040B   A100           IOR    FOR2
              08B9
0817   040C   9900           STA    WORD
              0868
0818   040D   B100           LDA    IMPRK2
              07F5
0819   040E   9900           STA    IMCTI2
              0860
0820   040F   0110           ZAR
0821   0410   9900           STA    IMPRK2
              07F5
0822   0411   9900    h7     STA    NOWRD
              0862
0823   0412   B100    GETOUT LDA    AREGS
              086F
0824   0413   E100           LIX    XREGS
              0810
0825   0414   0A00           EIN
0826   0415   F100           JMP    *RESET
              82F6
0827   0416   0800    SETANL ENT
0828   0417   B100           LDA    IMPE1
              07F7
0829   0418   9900           STA    LOIM1
              07FC
0830   0419   B100           LDA    IMPE2
              07F8
0831   041A   9900           STA    LOIM2
              0815
0832   041B   B100           LDA    WHEEL1
              07F0
0833   041C   9900           STA    SAMP1
              081B
0834   041D   B100           LDA    WHEEL2
              07F1
0835   041E   9900           STA    SAMP2
              081C
0836   041F   B100           LDA    FLAG
              0813
0837   0420   2882           JAM    $+3
0838   0421   5890           INA    :90
0839   0422   3087           JAI    $+3
0840   0423   C601           LAR    1
0841   0424   9900           STA    ANLS
```

| | | | | | |
|---|---|---|---|---|---|
| | | 0809 | | | |
| 0842 | 0425 | 0110 | | ZAR | |
| 0843 | 0426 | 9900 0805 | | STA | SGNF |
| 0844 | 0427 | 9900 07F0 | | STA | WHEEL1 |
| 0845 | 0428 | 9900 07F1 | | STA | WHEEL2 |
| 0846 | 0429 | B100 07EF | | LDA | WHEEL |
| 0847 | 042A | 0310 | | NAR | |
| 0848 | 042B | 9900 07F2 | | STA | NEGWL1 |
| 0849 | 042C | 9900 07F3 | | STA | NEGWL2 |
| 0850 | 042D | F717 | | RTN | SETANL |
| 0851 | 042E | 0800 | ANAL | ENT | |
| 0852 | 042F | 0110 | | ZAR | |
| 0853 | 0430 | 9900 0809 | | STA | ANLS |
| 0854 | 0431 | B100 0813 | | LDA | FLAG |
| 0855 | 0432 | 3082 | | JAP | $+3 |
| 0856 | 0433 | 0C00 | | DIN | |
| 0857 | 0434 | F20B | | JMP | AN1 |
| 0858 | 0435 | 0C00 | | DIN | |
| 0859 | 0436 | B100 082F | | LDA | EIGER |
| 0860 | 0437 | 3083 | | JAP | $+4 |
| 0861 | 0438 | D900 082F | | IMS | EIGER |
| 0862 | 0439 | 0000 | | NOP | |
| 0863 | 043A | F205 | | JMP | AN1 |
| 0864 | 043B | D900 082E | | IMS | STEP |
| 0865 | 043C | F2BE | | JMP | DEPART |
| 0866 | 043D | 5890 | | INA | :90 |
| 0867 | 043E | 2081 | | JAM | $+2 |
| 0868 | 043F | F2BB | | JMP | DEPART |
| 0869 | 0440 | C704 | AN1 | LAM | 4 |
| 0870 | 0441 | 9900 0822 | | STA | HEADS |
| 0871 | 0442 | C701 | | LAM | 1 |
| 0872 | 0443 | 9900 0864 | | STA | FINSH |
| 0873 | 0444 | B100 07FF | | LDA | IMCTI1 |
| 0874 | 0445 | 9900 0823 | | STA | IMP |
| 0875 | 0446 | 0310 | | NAR | |
| 0876 | 0447 | 9900 0825 | | STA | NEGIMP |
| 0877 | 0448 | 0110 | | ZAR | |
| 0878 | 0449 | 9900 0826 | | STA | SAVE |
| 0879 | 044A | 9900 0827 | | STA | STOP |
| 0880 | 044B | C701 | | LAM | 1 |
| 0881 | 044C | 8900 081D | | ADD | SAMP1 |
| 0882 | 044D | 9900 0830 | | STA | SAMP |

Analysis (Fig. 26, M8, Part 1) and (Fig. 27, 28)

| | | | | | |
|---|---|---|---|---|---|
| 0883 | 044E | 0310 | | NAR | |
| 0884 | 044F | 9900 081D | | STA | SAMPL |
| 0885 | 0450 | B100 07F6 | | LDA | IMPE |
| 0886 | 0451 | 9900 082B | | STA | MOIM |
| 0887 | 0452 | 8900 0821 | | ADD | JMP+1 |
| 0888 | 0453 | 9900 082D | | STA | MOIMV |
| 0889 | 0454 | B100 07F7 | | LDA | IMPE1 |
| 0890 | 0455 | 8900 0820 | | ADD | JMP |
| 0891 | 0456 | 9900 0831 | | STA | MOIMD |
| 0892 | 0457 | 9900 082C | | STA | MOIM1 |
| 0893 | 0458 | C701 | | LAM | 1 |
| 0894 | 0459 | 8900 0830 | | ADD | SAMP |
| 0895 | 045A | 9900 0816 | | STA | ONELS |
| 0896 | 045B | B100 082C | ACCUM | LDA | *MOIM1 |
| 0897 | 045C | 10D1 | | ARA | 2 |
| 0898 | 045D | 8900 0826 | | ADD | SAVE |
| 0899 | 045E | 9900 0826 | | STA | SAVE |
| 0900 | 045F | B100 0820 | | LDA | JMP |
| 0901 | 0460 | 8900 082C | | ADD | MOIM1 |
| 0902 | 0461 | 9900 082C | | STA | MOIM1 |
| 0903 | 0462 | D900 081D | | IMS | SAMPL |
| 0904 | 0463 | F608 | | JMP | ACCUM |
| 0905 | 0464 | B100 0830 | | LDA | SAMP |
| 0906 | 0465 | 0310 | | NAR | |
| 0907 | 0466 | 9900 081D | | STA | SAMPL |
| 0908 | 0467 | F100 0826 | | LDX | SAVE |
| 0909 | 0468 | 0110 | | ZAR | |
| 0910 | 0469 | F900 88E3 | | JST | *UFDIV |
| 0911 | 046A | 0830 | | DATA | SAMP |
| 0912 | 046B | E900 0826 | | STX | SAVE |
| 0913 | 046C | B100 0813 | | LDA | FLAG |
| 0914 | 046D | 2133 | | JAZ | MEANFL |
| 0915 | 046E | B100 0826 | FILE | LDA | SAVE |
| 0916 | 046F | 1051 | | ALA | 2 |
| 0917 | 0470 | 9900 0831 | | STA | *MOIM |
| 0918 | 0471 | F200 | | JMP | VALNCE |

| | | | | | |
|---|---|---|---|---|---|
| 0919 | 0472 | B100 0831 | VARNCE | LDA | MOIMD |
| 0920 | 0473 | 9900 082C | | STA | MOIM1 |
| 0921 | 0474 | B100 082C | DIFSQL | LDA | *MOIM1 |
| 0922 | 0475 | 10D1 | | ARA | 2 |
| 0923 | 0476 | 9100 0826 | | SUB | SAVE |
| 0924 | 0477 | 0048 | | TAX | |
| 0925 | 0478 | F900 88E5 | | JST | *MPYS: |
| 0926 | 0479 | 1900 | | LRL | 1 |
| 0927 | 047A | 1146 | | RRX | 1 |
| 0928 | 047B | 0030 | | TXA | |
| 0929 | 047C | 8900 0827 | | ADD | STOR |
| 0930 | 047D | 9900 0827 | | STA | STOR |
| 0931 | 047E | B100 082C | | LDA | JMI |
| 0932 | 047F | 8900 082C | | ADD | MOIM1 |
| 0933 | 0480 | 9900 082C | | STA | MOIM1 |
| 0934 | 0481 | D900 081D | | IMS | SAMPL |
| 0935 | 0482 | F60E | | JMP | DIFSQL |
| 0936 | 0483 | B100 0831 | | LDA | SAMP |
| 0937 | 0484 | 0310 | | NAR | |
| 0938 | 0485 | 9900 081D | | STA | SAMPL |
| 0939 | 0486 | E100 0827 | | LDX | STOR |
| 0940 | 0487 | 0110 | | ZAR | |
| 0941 | 0488 | F200 | | JMP | ROOT |
| 0942 | 0489 | F900 88E3 | ROOT | JST | *UFDIV: |
| 0943 | 048A | 0816 | | DATA | ONELS |
| 0944 | 048B | 0030 | | TXA | |
| 0945 | 048C | F900 88E4 | | JST | *SQRT |
| 0946 | 048D | 9900 0812 | | STA | TEMP |
| 0947 | 048E | B100 0813 | | LDA | FLAG |
| 0948 | 048F | 20A4 | | JAM | FIRST |
| 0949 | 0490 | E100 082D | | LDA | *MOIMV |
| 0950 | 0491 | E100 07E2 | | LDX | MINUS |
| 0951 | 0492 | F900 88E5 | | JST | *MPYS: |
| 0952 | 0493 | 1900 | | LRL | 1 |
| 0953 | 0494 | 1146 | | RRX | 1 |
| 0954 | 0495 | 1049 | | ARX | 2 |
| 0955 | 0496 | E900 0827 | | STX | STOR |
| 0956 | 0497 | B100 0812 | | LDA | TEMP |
| 0957 | 0498 | E100 | | LDX | ALPHA |

| | | | | | |
|---|---|---|---|---|---|
| | | 07C5 | | | |
| 0958 | 0499 | F900 | | JST | *MPYS: |
| | | 88E5 | | | |
| 0959 | 049A | 1900 | | LRL | 1 |
| 0960 | 049B | 11A8 | | RRX | 1 |
| 0961 | 049C | 0030 | | TXA | |
| 0962 | 049D | 8900 | | ADD | STOR |
| | | 0827 | | | |
| 0963 | 049E | 10D1 | | ARA | 2 |
| 0964 | 049F | 9900 | | STA | *MOIMV |
| | | 882D | | | |
| 0965 | 04A0 | D900 | | IMS | MOIMV |
| | | 082D | | | |
| 0966 | 04A1 | B100 | MEANFL | LDA | *MOIM |
| | | 882B | | | |
| 0967 | 04A2 | 10D1 | | ARA | 2 |
| 0968 | 04A3 | E100 | | LDX | MINUS |
| | | 07E2 | | | |
| 0969 | 04A4 | F900 | | JST | *MPYS: |
| | | 88E5 | | | |
| 0970 | 04A5 | 1900 | | LRL | 1 |
| 0971 | 04A6 | 11A8 | | RRX | 1 |
| 0972 | 04A7 | 10A9 | | ARX | 2 |
| 0973 | 04A8 | E900 | | STX | TEMP |
| | | 0812 | | | |
| 0974 | 04A9 | B100 | | LDA | SAVE |
| | | 0826 | | | |
| 0975 | 04AA | E100 | | LDX | ALPHA |
| | | 07C5 | | | |
| 0976 | 04AB | F900 | | JST | *MPYS: |
| | | 88E5 | | | |
| 0977 | 04AC | 1900 | | LRL | 1 |
| 0978 | 04AD | 11A8 | | RRX | 1 |
| 0979 | 04AE | 10A9 | | ARX | 2 |
| 0980 | 04AF | 0030 | | TXA | |
| 0981 | 04B0 | 8900 | | ADD | TEMP |
| | | 0812 | | | |
| 0982 | 04B1 | 9900 | | STA | *MOIM |
| | | 882B | | | |
| 0983 | 04B2 | D900 | | IMS | MOIM |
| | | 082B | | | |
| 0984 | 04B3 | F20E | | JMP | ALL |
| 0985 | 04B4 | E100 | FIRST | LDA | TEMP |
| | | 0812 | | | |
| 0986 | 04B5 | 1051 | | ALA | 2 |
| 0987 | 04B6 | D100 | | CMS | TOSMAL |
| | | 88BC | | | |
| 0988 | 04B7 | C614 | | LAP | 20 |
| 0989 | 04B8 | 0000 | | NOP | |
| 0990 | 04B9 | D100 | | CMS | TOBIG |
| | | 08BD | | | |
| 0991 | 04BA | F201 | | JMP | $+2 |
| 0992 | 04BB | C664 | | LAP | 100 |
| 0993 | 04BC | 9900 | | STA | *MOIMV |
| | | 882D | | | |
| 0994 | 04BD | D900 | | IMS | MOIMV |
| | | 082D | | | |
| 0995 | 04BE | D900 | | IMS | MOIM |
| | | 082B | | | |
| 0996 | 04BF | D900 | ALL | IMS | MOIMD |
| | | 0831 | | | |
| 0997 | 04C0 | B100 | | LDA | MOIMD |

Analysis (Fig. 26, M8, Part 2) and (Fig. 27, 28)

| | | | | | |
|---|---|---|---|---|---|
| 0998 | 04C1 | 9900 0831 | STA | MOIM1 | |
| 0999 | 04C2 | B100 082C | LDA | SAMF | |
| 1000 | 04C3 | 0310 0830 | NAR | | |
| 1001 | 04C4 | 9900 | STA | SAMFL | |
| 1002 | 04C5 | 0110 081D | ZAR | | |
| 1003 | 04C6 | 9900 | STA | SAVE | |
| 1004 | 04C7 | 9900 0826 | STA | STOR | |
| 1005 | 04C8 | D900 0827 | IMS | HEADS | |
| 1006 | 04C9 | F66E 0822 | JMP | ACCUM | |
| 1007 | 04CA | C704 | LAM | 4 | |
| 1008 | 04CB | 9900 | STA | HEADS | |
| 1009 | 04CC | C604 0822 | LAP | 4 | |
| 1010 | 04CD | 8900 | ADD | MOIM | |
| 1011 | 04CE | 9900 082D | STA | MOIM | |
| 1012 | 04CF | C604 082D | LAP | 4 | |
| 1013 | 04D0 | 8900 | ADD | MOIMV | |
| 1014 | 04D1 | 9900 082D | STA | MOIMV | |
| 1015 | 04D2 | 4058 082D | SEL | :58 | |
| 1016 | 04D3 | D900 | IMS | NEGIMP | |
| 1017 | 04D4 | F679 0825 | JMP | ACCUM | |
| 1018 | 04D5 | D900 | IMS | FINSH | |
| 1019 | 04D6 | F21B 0804 | JMP | POP | |
| 1020 | 04D7 | C704 | LAM | 4 | |
| 1021 | 04D8 | 9900 | STA | HEADS | |
| 1022 | 04D9 | E100 0822 | LDA | IMCTR | |
| 1023 | 04DA | 9900 0800 | STA | IMP | |
| 1024 | 04DB | 0310 0823 | NAR | | |
| 1025 | 04DC | 9900 | STA | NEGIMP | |
| 1026 | 04DD | 0110 0825 | ZAR | | |
| 1027 | 04DE | 9900 | STA | SAVE | |
| 1028 | 04DF | 9900 0826 | STA | STOR | |
| 1029 | 04E0 | C701 0827 | LAM | 1 | |
| 1030 | 04E1 | 8900 | ADD | SAMP2 | |
| 1031 | 04E2 | 9900 081C | STA | SAM | |
| 1032 | 04E3 | 0310 0830 | NAR | | |
| 1033 | 04E4 | 9900 | STA | SAMFL | |
| 1034 | 04E5 | C604 081D | LAP | 4 | |
| 1035 | 04E6 | 8900 07F6 | ADD | IMPR | |

| | | | | | |
|---|---|---|---|---|---|
|1036|04E7|9900| |STA|MOIM|
| | |082B| | | |
|1037|04E8|8900| |ADD|JMP+1|
| | |0821| | | |
|1038|04E9|9900| |STA|MOIMU|
| | |082D| | | |
|1039|04EA|B100| |LDA|IMPE2|
| | |07F8| | | |
|1040|04EB|8900| |ADD|JMP|
| | |0820| | | |
|1041|04EC|9900| |STA|MOIMD|
| | |0831| | | |
|1042|04ED|9900| |STA|MOIMI|
| | |082C| | | |
|1043|04EE|C701| |LAM|1|
|1044|04EF|8900| |ADD|SAMP|
| | |0830| | | |
|1045|04F0|9900| |STA|ONELS|
| | |0816| | | |
|1046|04F1|F696| |JMP|ACCUM|
|1047|04F2|0110|POP|ZAR| |
|1048|04F3|9900| |STA|BK1|
| | |0829| | | |
|1049|04F4|9900| |STA|BK2|
| | |082A| | | |
|1050|04F5|C703| |LAM|3|
|1051|04F6|9900| |STA|STEP|
| | |082E| | | |
|1052|04F7|B100| |LDA|FLAG|
| | |0813| | | |
|1053|04F8|2101| |JAZ|$+2|
|1054|04F9|D900| |IMS|FLAG|
| | |0813| | | |
|1055|04FA|0000| |NOP| |
|1056|04FB|F7CD|DEPART|JMN|ANAL|
|1057|04FC|0860|CALC|DEF| |
|1058|04FD|0C00| |DIN| |
|1059|04FE|0110| |ZAR| |
|1060|04FF|9900| |STA|MAXBK|
| | |0828| | | |
|1061|0500|9900| |STA|SHORT|
| | |0886| | | |
|1062|0501|B100| |LDA|SETH|
| | |08D3| | | |
|1063|0502|9900| |STA|WIPEH|
| | |0893| | | |
|1064|0503|B100| |LDA|SETL|
| | |08D4| | | |
|1065|0504|9900| |STA|WIPEL|
| | |0894| | | |
|1066|0505|B100| |LDA|SETCH|
| | |08D5| | | |
|1067|0506|9900| |STA|CNTH|
| | |0896| | | |
|1068|0507|B100| |LDA|SETCL|
| | |08D6| | | |
|1069|0508|9900| |STA|CNTL|
| | |0895| | | |
|1070|0509|B100| |LDA|SETRJH|
| | |08D9| | | |
|1071|050A|9900| |STA|RJSJMH|
| | |088F| | | |

Calculation (Fig. 26, M4) and (Fig. 29)

| | | | | | |
|---|---|---|---|---|---|
|1072|050B|B100| |LDA|SETROL|
| | |08DA| | | |
|1073|050C|9900| |STA|ROSOML|
| | |0890| | | |
|1074|050D|B100| |LDA|STATUS|
| | |07E6| | | |
|1075|050E|C001| |CAI|1|
|1076|050F|F20B| |JMP|CC|
|1077|0510|C704| |LAM|4|
|1078|0511|8900| |ADD|LOIM1|
| | |07FC| | | |
|1079|0512|9900| |STA|NOIM12|
| | |0832| | | |
|1080|0513|B100| |LDA|IMPLK1|
| | |07F4| | | |
|1081|0514|9900| |STA|IMCTI|
| | |07FE| | | |
|1082|0515|C701| |LAM|1|
|1083|0516|8900| |ADD|IMCTI1|
| | |07FF| | | |
|1084|0517|9900| |STA|IMPLES|
| | |0835| | | |
|1085|0518|B100| |LDA|IMPE|
| | |07F6| | | |
|1086|0519|9900| |STA|NOIM|
| | |0833| | | |
|1087|051A|F20B| |JMP|CA|
|1088|051B|C704|CC|LAM|4|
|1089|051C|8900| |ADD|LOIM2|
| | |0815| | | |
|1090|051D|9900| |STA|NOIM12|
| | |0832| | | |
|1091|051E|B100| |LDA|IMPRK2|
| | |07F5| | | |
|1092|051F|9900| |STA|IMCTI|
| | |07FE| | | |
|1093|0520|C701| |LAM|1|
|1094|0521|8900| |ADD|IMCTI2|
| | |0800| | | |
|1095|0522|9900| |STA|IMPLES|
| | |0835| | | |
|1096|0523|C004| |LAF|4|
|1097|0524|8900| |ADD|IMPE|
| | |07F6| | | |
|1098|0525|9900| |STA|NOIM|
| | |0833| | | |
|1099|0526|B100|CA|LDA|IMCTI|
| | |07FE| | | |
|1100|0527|00D0| |DAR| |
|1101|0528|C408| |LXF|8|
|1102|0529|F900| |JST|*MPYS:|
| | |86E5| | | |
|1103|052A|1900| |LRL|1|
|1104|052B|11A8| |RRX|1|
|1105|052C|0030| |TXA| |
|1106|052D|8900| |ADD|NOIM|
| | |0833| | | |
|1107|052E|9900| |STA|NOIM|
| | |0833| | | |
|1108|052F|C704| |LAM|4|
|1109|0530|9900| |STA|HD|
| | |0834| | | |

| | | | | | |
|---|---|---|---|---|---|
| 1110 | 0531 | B100 0821 | | LDA | JMP+1 |
| 1111 | 0532 | 8900 0833 | | ADD | NOIM |
| 1112 | 0533 | 9900 0836 | | STA | NOIMV |
| 1113 | 0534 | B100 8833 | MOV | LDA | *NOIM |
| 1114 | 0535 | D900 0833 | | IMS | NOIM |
| 1115 | 0536 | 9900 0839 | | STA | MEAN |
| 1116 | 0537 | B100 8836 | | LDA | *NOIMV |
| 1117 | 0538 | E100 083A | | LIX | SIGMA1 |
| 1118 | 0539 | F900 88E5 | | JST | *MPYS: |
| 1119 | 053A | 1150 | | RLA | 1 |
| 1120 | 053B | 11A8 | | RRX | 1 |
| 1121 | 053C | E900 084B | | STX | VAR |
| 1122 | 053D | D900 0836 | | IMS | NOIMV |
| 1123 | 053E | E100 0839 | | LLX | MEAN |
| 1124 | 053F | 0110 | | ZAR | |
| 1125 | 0540 | F900 88E3 | | JST | *UFDIV: |
| 1126 | 0541 | 08D7 | | DATA | DOWN |
| 1127 | 0542 | E900 0841 | | STX | RJ |
| 1128 | 0543 | B100 0839 | | LDA | MEAN |
| 1129 | 0544 | 8900 084B | | ADD | VAR |
| 1130 | 0545 | 9900 083C | | STA | HIGH |
| 1131 | 0546 | B100 0839 | | LDA | MEAN |
| 1132 | 0547 | 9100 084B | | SUB | VAR |
| 1133 | 0548 | 9900 083D | | STA | LOW |
| 1134 | 0549 | B100 07E6 | | LDA | STATUS |
| 1135 | 054A | C001 | | CAI | 1 |
| 1136 | 054B | F205 | | JMP | S1 |
| 1137 | 054C | L100 08C6 | | LDA | AUTO1 |
| 1138 | 054D | D100 07FE | | CMS | IMCT1 |
| 1139 | 054E | F207 | | JMP | S5 |
| 1140 | 054F | 0000 | | NOP | |
| 1141 | 0550 | F20D | | JMP | SEC |
| 1142 | 0551 | B100 08C7 | S1 | LDA | AUTO2 |
| 1143 | 0552 | D100 07FE | | CMS | IMCT1 |
| 1144 | 0553 | F202 | | JMP | S5 |
| 1145 | 0554 | 0000 | | NOP | |
| 1146 | 0555 | F208 | | JMP | SEC |

| 1147 | 0556 | B100 8832 | 55 | LDA | *NOIM12 |
| 1148 | 0557 | D100 083D | | CMS | LOW |
| 1149 | 0558 | F20F | | JMP | ZAP |
| 1150 | 0559 | 0000 | | NOP | |
| 1151 | 055A | D100 083C | | CMS | HIGH |
| 1152 | 055B | F202 | | JMP | SEG |
| 1153 | 055C | F20B | | JMP | ZAP |
| 1154 | 055D | F200 | | JMP | SEG |
| 1155 | 055E | FA58 | SEG | JST | REJCT |
| 1156 | 055F | D900 0832 | | IMS | NOIM12 |
| 1157 | 0560 | D900 0834 | | IMS | HD |
| 1158 | 0561 | F62D | | JMP | MOV |
| 1159 | 0562 | F200 | | JMP | RETRN |
| 1160 | 0563 | FAE5 | RETRN | JST | COLECT |
| 1161 | 0564 | 0110 | | ZAR | |
| 1162 | 0565 | 9900 0892 | | STA | NOCOL |
| 1163 | 0566 | 9900 0886 | | STA | SHORT |
| 1164 | 0567 | F76B | | RTN | CALC |
| 1165 | 0568 | B100 0857 | ZAP | LDA | MAX |
| 1166 | 0569 | D100 0858 | | CMS | MAXI |
| 1167 | 056A | F60C | | JMP | SEG |
| 1168 | 056B | 0000 | | NOP | |
| 1169 | 056C | B100 0859 | | LDA | NAROW |
| 1170 | 056D | C001 | | CAI | 1 |
| 1171 | 056E | F20A | | JMP | IM |
| 1172 | 056F | D100 8832 | | LDA | *NOIM12 |
| 1173 | 0570 | 9100 0839 | | SUB | MEAN |
| 1174 | 0571 | 3081 | | JAI | PUTT |
| 1175 | 0572 | 0310 | | NAR | |
| 1176 | 0573 | 0048 | PUTT | TAX | |
| 1177 | 0574 | C004 | | LAI | 4 |
| 1178 | 0575 | 8900 0834 | | ADD | HD |
| 1179 | 0576 | 8900 08E7 | | ADD | CARY |
| 1180 | 0577 | 9900 084C | | STA | MARY |
| 1181 | 0578 | E900 884C | | STX | *MARY |
| 1182 | 0579 | B100 07FE | IM | LDA | IMCTI |
| 1183 | 057A | C001 | | CAI | 1 |
| 1184 | 057B | F21A | | JMP | HIT |
| 1185 | 057C | B100 0835 | | LDA | IMPLES |
| 1186 | 057D | D100 07FE | | CMS | IMCTI |
| 1187 | 057E | F620 | | JMP | SEG |
| 1188 | 057F | 0000 | | NOP | |
| 1189 | 0580 | B100 | | LDA | NAROW |

ZAP (Fig. 29)

|      |      |      |     |     |       |
|------|------|------|-----|-----|-------|
|      |      | 0859 |     |     |       |
| 1190 | 0581 | C001 |     | CAI | 1     |
| 1191 | 0582 | F213 |     | JMP | HIT   |
| 1192 | 0583 | C604 |     | LAP | 4     |
| 1193 | 0584 | 8900 |     | ADD | HD    |
|      |      | 0834 |     |     |       |
| 1194 | 0585 | 8900 |     | ADD | LAST  |
|      |      | 08B6 |     |     |       |
| 1195 | 0586 | 9900 |     | STA | FAST  |
|      |      | 0851 |     |     |       |
| 1196 | 0587 | C604 |     | LAP | 4     |
| 1197 | 0588 | 8900 |     | ADD | HD    |
|      |      | 0834 |     |     |       |
| 1198 | 0589 | 8900 |     | ADD | SINCE |
|      |      | 08B5 |     |     |       |
| 1199 | 058A | 9900 |     | STA | WINCE |
|      |      | 0856 |     |     |       |
| 1200 | 058B | B100 |     | LDA | IMCTI |
|      |      | 07FE |     |     |       |
| 1201 | 058C | 9100 |     | SUB | *WINCE |
|      |      | 8856 |     |     |       |
| 1202 | 058D | C001 |     | CAI | 1     |
| 1203 | 058E | F201 |     | JMP | DO    |
| 1204 | 058F | F206 |     | JMP | HIT   |
| 1205 | 0590 | B100 | DO  | LDA | *MARY |
|      |      | 884C |     |     |       |
| 1206 | 0591 | 9100 |     | SUB | FCT   |
|      |      | 085A |     |     |       |
| 1207 | 0592 | D100 |     | CMS | *FAST |
|      |      | 8851 |     |     |       |
| 1208 | 0593 | F202 |     | JMP | HIT   |
| 1209 | 0594 | F248 |     | JMP | STOP  |
| 1210 | 0595 | F200 |     | JMP | HIT   |
| 1211 | 0596 | C001 | HIT | LAP | 1     |
| 1212 | 0597 | 9900 |     | STA | SHORT |
|      |      | 0886 |     |     |       |
| 1213 | 0598 | 0000 |     | NOP |       |
| 1214 | 0599 | 0000 |     | NOP |       |
| 1215 | 059A | D100 |     | LDA | NOCOR |
|      |      | 0892 |     |     |       |
| 1216 | 059B | C001 |     | CAI | 1     |
| 1217 | 059C | F20B |     | JMP | HA    |
| 1218 | 059D | B100 |     | LDA | STATUS |
|      |      | 07E6 |     |     |       |
| 1219 | 059E | C001 |     | CAI | 1     |
| 1220 | 059F | F204 |     | JMP | $+5   |
| 1221 | 05A0 | L900 |     | IMS | COOL  |
|      |      | 085B |     |     |       |
| 1222 | 05A1 | C605 |     | LAP | 5     |
| 1223 | 05A2 | 8900 |     | ADD | HD    |
|      |      | 0834 |     |     |       |
| 1224 | 05A3 | F203 |     | JMP | $+4   |
| 1225 | 05A4 | L900 |     | IMS | COOL1 |
|      |      | 085C |     |     |       |
| 1226 | 05A5 | C609 |     | LAP | 9     |
| 1227 | 05A6 | 8900 |     | ADD | HD    |
|      |      | 0834 |     |     |       |
| 1228 | 05A7 | FA8E |     | JST | ALARM |
| 1229 | 05A8 | B100 | HA  | LDA | NAROW |
|      |      | 0859 |     |     |       |
| 1230 | 05A9 | C001 |     | CAI | 1     |
| 1231 | 05AA | F202 |     | JMP | IN    |

| | | | | | |
|---|---|---|---|---|---|
| 1232 | 05AB | B100 8840 | | LDA | *MANY |
| 1233 | 05AC | 9900 8851 | | STA | *FAST |
| 1234 | 05AD | B100 0828 | IN | LDA | MAXBK |
| 1235 | 05AE | 3102 | | JAN | $+3 |
| 1236 | 05AF | D900 0828 | | IMS | MAXBK |
| 1237 | 05B0 | D900 0858 | | IMS | MAXI |
| 1238 | 05B1 | B100 0859 | | LDA | NAROW |
| 1239 | 05B2 | C001 | | CAI | 1 |
| 1240 | 05B3 | F202 | | JMP | $+3 |
| 1241 | 05B4 | B100 07FE | | LDA | IMCTI |
| 1242 | 05B5 | 9900 8856 | | STA | *WINCE |
| 1243 | 05B6 | F658 | | JMP | SEQ |
| 1244 | 05B7 | 0800 | REJCT | ENT | |
| 1245 | 05B8 | B100 8832 | | LDA | *NOIM12 |
| 1246 | 05B9 | 9100 8863 | | SUB | EJCT |
| 1247 | 05BA | 3082 | | JAP | $+3 |
| 1248 | 05BB | B100 0839 | | LDA | MEAN |
| 1249 | 05BC | F201 | | JMP | $+2 |
| 1250 | 05BD | B100 8832 | | LDA | *NOIM12 |
| 1251 | 05BE | 9100 0839 | | SUB | MEAN |
| 1252 | 05BF | 206E | | JAM | LO |
| 1253 | 05C0 | 9100 0841 | | SUB | HJ |
| 1254 | 05C1 | 8900 8893 | | ADD | *WIPEH |
| 1255 | 05C2 | 9900 8893 | | STA | *WIPEH |
| 1256 | 05C3 | B100 0841 | | LDA | HJ |
| 1257 | 05C4 | 8900 888F | | ADD | *HJSUMH |
| 1258 | 05C5 | 9900 888F | | STA | *HJSUMH |
| 1259 | 05C6 | D900 8896 | | IMS | *CNTH |
| 1260 | 05C7 | D900 0893 | | IMS | WIPEH |
| 1261 | 05C8 | D900 0896 | | IMS | CNTH |
| 1262 | 05C9 | D900 0894 | | IMS | WIPEL |
| 1263 | 05CA | D900 0895 | | IMS | CNTL |
| 1264 | 05CB | D900 888F | | IMS | HJSUMH |
| 1265 | 05CC | D900 0891 | | IMS | HJSUML |
| 1266 | 05CD | F26E | | JMP | HOP |
| 1267 | 05CE | 0310 | LO | NOP | |

Reject (Fig. 30)

| | | | | | |
|---|---|---|---|---|---|
|1268|05CF|9100|   |SUB|RJ|
|    |    |0841|   |   |  |
|1269|05D0|8900|   |ADD|*WIPEL|
|    |    |8894|   |   |  |
|1270|05D1|9900|   |STA|*WIPEL|
|    |    |8894|   |   |  |
|1271|05D2|B100|   |LDA|RJ|
|    |    |0841|   |   |  |
|1272|05D3|8900|   |ADD|*RJSJML|
|    |    |8890|   |   |  |
|1273|05D4|9900|   |STA|*RJSJML|
|    |    |8890|   |   |  |
|1274|05D5|D900|   |IMS|*CNTL|
|    |    |8895|   |   |  |
|1275|05D6|D900|   |IMS|WIPEL|
|    |    |0894|   |   |  |
|1276|05D7|D900|   |IMS|CNTL|
|    |    |0895|   |   |  |
|1277|05D8|D900|   |IMS|WIPEH|
|    |    |0893|   |   |  |
|1278|05D9|D900|   |IMS|CNTH|
|    |    |0896|   |   |  |
|1279|05DA|D900|   |IMS|RJSJML|
|    |    |0890|   |   |  |
|1280|05DB|D900|   |IMS|RJSJMH|
|    |    |088F|   |   |  |
|1281|05DC|F725|HOP|RTN|REJCT|
|1282|05DD|C001|STOP|LAP|1|
|1283|05DE|9900|   |STA|NOCOR|
|    |    |0892|   |   |  |
|1284|05DF|F681|   |JMP|SEG|
|1285|05E0|0860|COOLOF|ENT| |
|1286|05E1|B100|   |LDA|ONLITE|
|    |    |0883|   |   |  |
|1287|05E2|9900|   |STA|BURN|
|    |    |0884|   |   |  |
|1288|05E3|0110|   |ZAR| |
|1289|05E4|9900|   |STA|BUT|
|    |    |0885|   |   |  |
|1290|05E5|B100|B5|LDA|*BURN|
|    |    |8884|   |   |  |
|1291|05E6|C001|   |CAI|1|
|1292|05E7|F206|   |JMP|BS+1|
|1293|05E8|B100|   |LDA|BUT|
|    |    |0885|   |   |  |
|1294|05E9|8900|   |ADD|B|
|    |    |08CA|   |   |  |
|1295|05EA|9900|   |STA|BB|
|    |    |08C9|   |   |  |
|1296|05EB|B100|   |LDA|*BB|
|    |    |88C9|   |   |  |
|1297|05EC|9A00|   |STA|BS|
|1298|05ED|0000|BS|NOP| |
|1299|05EE|D900|   |IMS|BUT|
|    |    |0885|   |   |  |
|1300|05EF|D900|   |IMS|BURN|
|    |    |0884|   |   |  |
|1301|05F0|B100|   |LDA|BUT|
|    |    |0885|   |   |  |
|1302|05F1|C008|   |CAI|8|
|1303|05F2|F201|   |JMP|S+2|
|1304|05F3|F6CE|   |JMP|B5|

| | | | | | |
|---|---|---|---|---|---|
| 1305 | 05F4 | F714 | | JIN | COOLOF |
| 1306 | 05F5 | 0800 | HOTAU1 | ENT | |
| 1307 | 05F6 | 3202 | | JOR | $+3 |
| 1308 | 05F7 | C601 | | LAI | 1 |
| 1309 | 05F8 | 9900 0824 | | STA | OV |
| 1310 | 05F9 | 5891 | | INA | :91 |
| 1311 | 05FA | C000 | | CAI | 0 |
| 1312 | 05FB | F219 | | JMP | STAT1 |
| 1313 | 05FC | 5890 | | INA | :90 |
| 1314 | 05FD | 10D7 | | ARA | 8 |
| 1315 | 05FE | 8100 08BA | | AND | STRIP |
| 1316 | 05FF | 9900 0807 | | STA | AUTO2 |
| 1317 | 0600 | D100 07F5 | | CMS | IMPBK2 |
| 1318 | 0601 | F22B | | JMP | OUT |
| 1319 | 0602 | F201 | | JMP | $+2 |
| 1320 | 0603 | F229 | | JMP | OUT |
| 1321 | 0604 | 409B | | SEL | :9B |
| 1322 | 0605 | 0000 | | NOP | |
| 1323 | 0606 | 409C | | SEL | :9C |
| 1324 | 0607 | 4020 | | SEL | :20 |
| 1325 | 0608 | B100 07F5 | | LDA | IMPBK2 |
| 1326 | 0609 | C004 | | CAI | 4 |
| 1327 | 060A | F222 | | JMP | OUT |
| 1328 | 060B | C005 | | CAI | 5 |
| 1329 | 060C | F220 | | JMP | OUT |
| 1330 | 060D | C006 | | CAI | 6 |
| 1331 | 060E | F21E | | JMP | OUT |
| 1332 | 060F | C007 | | CAI | 7 |
| 1333 | 0610 | F21C | | JMP | OUT |
| 1334 | 0611 | 0000 | | NOP | |
| 1335 | 0612 | 0000 | | NOP | |
| 1336 | 0613 | 409B | | SEL | :9B |
| 1337 | 0614 | F218 | | JMP | OUT |
| 1338 | 0615 | 5890 | STAT1 | INA | :90 |
| 1339 | 0616 | 8100 08BA | | AND | STRIP |
| 1340 | 0617 | 9900 0806 | | STA | AUTO1 |
| 1341 | 0618 | D100 07F4 | | CMS | IMPBK1 |
| 1342 | 0619 | F213 | | JMP | OUT |
| 1343 | 061A | F201 | | JMP | $+2 |
| 1344 | 061B | F211 | | JMP | OUT |
| 1345 | 061C | 409A | | SEL | :9A |
| 1346 | 061D | 0000 | | NOP | |
| 1347 | 061E | 409D | | SEL | :9D |
| 1348 | 061F | 4020 | | SEL | :20 |
| 1349 | 0620 | B100 07F4 | | LDA | IMPBK1 |
| 1350 | 0621 | C004 | | CAI | 4 |
| 1351 | 0622 | F20A | | JMP | OUT |
| 1352 | 0623 | C005 | | CAI | 5 |
| 1353 | 0624 | F208 | | JMP | OUT |
| 1354 | 0625 | C006 | | CAI | 6 |
| 1355 | 0626 | F206 | | JMP | OUT |
| 1356 | 0627 | C007 | | CAI | 7 |
| 1357 | 0628 | F204 | | JMP | OUT |

| | | | | | |
|---|---|---|---|---|---|
| 1358 | 0629 | 0000 | | NOP | |
| 1359 | 062A | 0000 | | NOP | |
| 1360 | 062B | 469A | | SEL | :9A |
| 1361 | 062C | F200 | | JMP | OUT |
| 1362 | 062D | B100 0824 | OUT | LDA | OV |
| 1363 | 062E | C001 | | CAI | 1 |
| 1364 | 062F | F202 | | JMP | $+3 |
| 1365 | 0630 | 1200 | | MOV | |
| 1366 | 0631 | F201 | | JMP | $+2 |
| 1367 | 0632 | 1400 | | SOV | |
| 1368 | 0633 | 0110 | | ZAR | |
| 1369 | 0634 | 9900 0824 | | STA | OV |
| 1370 | 0635 | F740 | | RTN | HOTAUT |
| 1371 | 0636 | 0800 | ALARM | ENT | |
| 1372 | 0637 | 0000 | | NOP | |
| 1373 | 0638 | 00D0 | | DAR | |
| 1374 | 0639 | 8900 08B3 | | ADD | ONLITE |
| 1375 | 063A | 9900 0884 | | STA | BURN |
| 1376 | 063B | B100 8884 | | LDA | *BURN |
| 1377 | 063C | C000 | | CAI | 0 |
| 1378 | 063D | F202 | | JMP | $+3 |
| 1379 | 063E | 0110 | | ZAR | |
| 1380 | 063F | 9900 0886 | | STA | SHORT |
| 1381 | 0640 | B100 0884 | | LDA | BURN |
| 1382 | 0641 | 9100 08B3 | | SUB | ONLITE |
| 1383 | 0642 | 9900 0847 | | STA | DEC |
| 1384 | 0643 | 8900 08C0 | | ADD | A |
| 1385 | 0644 | 9900 0889 | | STA | AA |
| 1386 | 0645 | B100 8889 | | LDA | *AA |
| 1387 | 0646 | 9A00 | | STA | AS |
| 1388 | 0647 | 0000 | AS | NOP | |
| 1389 | 0648 | F712 | | RTN | ALARM |
| 1390 | 0649 | 0800 | CORECT | ENT | |
| 1391 | 064A | 0000 | | NOP | |
| 1392 | 064B | B100 0886 | | LDA | SHORT |
| 1393 | 064C | C000 | | CAI | 0 |
| 1394 | 064D | F206 | | JMP | EXIT |
| 1395 | 064E | B100 07E6 | | LDA | STATUS |
| 1396 | 064F | C001 | | CAI | 1 |
| 1397 | 0650 | F202 | | JMP | $+3 |
| 1398 | 0651 | 469D | | SEL | :9D |
| 1399 | 0652 | F201 | | JMP | $+2 |
| 1400 | 0653 | 469C | | SEL | :9C |
| 1401 | 0654 | F70E | EXIT | RTN | CORECT |
| 1402 | 0655 | 0800 | DUMP | ENT | |
| 1403 | 0656 | B100 08DE | | LDA | NOSPOT |
| 1404 | 0657 | 9900 | | STA | NOWFLD |

| | | | | | |
|---|---|---|---|---|---|
| | | 0802 | | | |
| 1405 | 0658 | C704 | | LAM | 4 |
| 1406 | 0659 | 9900 07E3 | | STA | SKIP |
| 1407 | 065A | B100 0802 | D2 | LDA | *NOWELD |
| 1408 | 065B | D100 0846 | | CMS | MIN |
| 1409 | 065C | F202 | | JMP | $+3 |
| 1410 | 065D | 0000 | | NOP | |
| 1411 | 065E | F204 | | JMP | D3 |
| 1412 | 065F | D900 0802 | L2A | IMS | NOWELD |
| 1413 | 0660 | D900 07E3 | | IMS | SKIP |
| 1414 | 0661 | F6F7 | | JMP | D2 |
| 1415 | 0662 | F20D | | JMP | D4 |
| 1416 | 0663 | B100 07E6 | D3 | LDA | STATUS |
| 1417 | 0664 | C801 | | CAI | 1 |
| 1418 | 0665 | F202 | | JMP | $+3 |
| 1419 | 0666 | C604 | | LAP | 4 |
| 1420 | 0667 | F201 | | JMP | $+2 |
| 1421 | 0668 | C608 | | LAP | 8 |
| 1422 | 0669 | 8900 07E3 | | ADD | SKIP |
| 1423 | 066A | 8900 08B3 | | ADD | ONLITE |
| 1424 | 066B | 9900 087D | | STA | BURNB1 |
| 1425 | 066C | B100 087D | | LDA | *BURNB1 |
| 1426 | 066D | C801 | | CAI | 1 |
| 1427 | 066E | F6EF | | JMP | L2A |
| 1428 | 066F | F264 | | JMP | Z8 |
| 1429 | 0670 | B100 08B3 | D4 | LDA | SETH |
| 1430 | 0671 | 9900 0893 | | STA | WIPEH |
| 1431 | 0672 | B100 08D4 | | LDA | SETL |
| 1432 | 0673 | 9900 0894 | | STA | WIPEL |
| 1433 | 0674 | B100 08D5 | | LDA | SETCH |
| 1434 | 0675 | 9900 0896 | | STA | CNTH |
| 1435 | 0676 | B100 08D6 | | LDA | SETCL |
| 1436 | 0677 | 9900 0895 | | STA | CNTL |
| 1437 | 0678 | B100 08D9 | | LDA | SETHJH |
| 1438 | 0679 | 9900 088F | | STA | HJSUMH |
| 1439 | 067A | B100 08DA | | LDA | SETHJL |
| 1440 | 067B | 9900 0890 | | STA | HJSUML |
| 1441 | 067C | B100 08D8 | | LDA | CUMLMT |
| 1442 | 067D | 9900 | | STA | SECLMT |

| | | | | | |
|---|---|---|---|---|---|
| | | 088F | | | |
| 1443 | 067E | C704 | | LAM | 4 |
| 1444 | 067F | 9900 | | STA | RIP |
| | | 0845 | | | |
| 1445 | 0680 | B100 | D5 | LDA | STATUS |
| | | 07E6 | | | |
| 1446 | 0681 | C001 | | CAI | 1 |
| 1447 | 0682 | F202 | | JMP | $+3 |
| 1448 | 0683 | C604 | | LAP | 4 |
| 1449 | 0684 | F201 | | JMP | $+2 |
| 1450 | 0685 | C608 | | LAP | 8 |
| 1451 | 0686 | 8900 | | ADD | RIP |
| | | 0845 | | | |
| 1452 | 0687 | 8900 | | ADD | ONLITE |
| | | 08B3 | | | |
| 1453 | 0688 | 9900 | | STA | BURNB1 |
| | | 087B | | | |
| 1454 | 0689 | B100 | | LDA | *BURNB1 |
| | | 887B | | | |
| 1455 | 068A | C001 | | CAI | 1 |
| 1456 | 068B | F204 | | JMP | D0+2 |
| 1457 | 068C | B100 | | LDA | *WIPEH |
| | | 8893 | | | |
| 1458 | 068D | 308C | | JAP | PUSHH |
| 1459 | 068E | B100 | D0 | LDA | *WIPEL |
| | | 8894 | | | |
| 1460 | 068F | 309E | | JAP | PUSHL |
| 1461 | 0690 | D900 | | IMS | WIPEH |
| | | 0893 | | | |
| 1462 | 0691 | D900 | | IMS | WIPEL |
| | | 0894 | | | |
| 1463 | 0692 | D900 | | IMS | CNTH |
| | | 0896 | | | |
| 1464 | 0693 | D900 | | IMS | CNTL |
| | | 0895 | | | |
| 1465 | 0694 | D900 | | IMS | RJSJML |
| | | 0890 | | | |
| 1466 | 0695 | D900 | | IMS | RJSJMH |
| | | 088F | | | |
| 1467 | 0696 | D900 | | IMS | RIP |
| | | 0845 | | | |
| 1468 | 0697 | F617 | | JMP | D5 |
| 1469 | 0698 | F22B | | JMP | CYL |
| 1470 | 0699 | F744 | D1 | RTN | LUMP |
| 1471 | 069A | B100 | PUSHH | LDA | *CNTH |
| | | 8896 | | | |
| 1472 | 069B | D100 | | CMS | MIN |
| | | 0846 | | | |
| 1473 | 069C | F60E | | JMP | D0 |
| 1474 | 069D | 0000 | | NOP | |
| 1475 | 069E | 0000 | | NOP | |
| 1476 | 069F | D900 | | IMS | *SEGLMP |
| | | 888E | | | |
| 1477 | 06A0 | D900 | | IMS | SEGLMP |
| | | 088E | | | |
| 1478 | 06A1 | D900 | | IMS | *SEGLMP |
| | | 888E | | | |
| 1479 | 06A2 | D900 | | IMS | SEGLMP |
| | | 088E | | | |
| 1480 | 06A3 | B100 | | LDA | *RJSJMH |
| | | 888F | | | |
| 1481 | 06A4 | 1000 | | ALA | 1 |

| | | | | | |
|---|---|---|---|---|---|
| 1482 | 06A5 | 9100 8893 | | SUB | *WIFEH |
| 1483 | 06A6 | 309A | | JAP | L8 |
| 1484 | 06A7 | D900 888E | | IMS | *SEGDMF |
| 1485 | 06A8 | D900 088E | | IMS | SEGDMF |
| 1486 | 06A9 | B100 8893 | | LDA | *WIFEH |
| 1487 | 06AA | 9100 888F | | SUB | *HJSJMH |
| 1488 | 06AB | 2C95 | | JAM | L8 |
| 1489 | 06AC | D900 888E | | IMS | *SEGDMF |
| 1490 | 06AD | F213 | | JMP | L8 |
| 1491 | 06AE | B100 8895 | PUSHL | LDA | *CNTL |
| 1492 | 06AF | D100 6846 | | CMS | MIN |
| 1493 | 06B0 | F620 | | JMP | L0+2 |
| 1494 | 06B1 | 0000 | | NOP | |
| 1495 | 06B2 | 0000 | | NOP | |
| 1496 | 06B3 | D900 888E | | IMS | *SEGDMF |
| 1497 | 06B4 | D900 088E | | IMS | SEGDMF |
| 1498 | 06B5 | D900 888E | | IMS | *SEGDMF |
| 1499 | 06B6 | D900 088E | | IMS | SEGDMF |
| 1500 | 06B7 | B100 8890 | | LDA | *HJSJML |
| 1501 | 06B8 | 16D0 | | ARA | 1 |
| 1502 | 06B9 | 9100 8894 | | SUB | *WIFEL |
| 1503 | 06BA | 3086 | | JAP | L8 |
| 1504 | 06BB | D900 888E | | IMS | *SEGDMF |
| 1505 | 06BC | D900 088E | | IMS | SEGDMF |
| 1506 | 06BD | B100 8894 | | LDA | *WIFEL |
| 1507 | 06BE | 9100 8890 | | SUB | *HJSJML |
| 1508 | 06BF | 2081 | | JAM | L8 |
| 1509 | 06C0 | D900 888E | | IMS | *SEGDMF |
| 1510 | 06C1 | 1100 08D8 | L8 | LDA | CUMLMF |
| 1511 | 06C2 | 9900 088E | | STA | SEGDMF |
| 1512 | 06C3 | F633 | | JMP | L0+2 |
| 1513 | 06C4 | B100 888E | CYL | LDA | *SEGDMF |
| 1514 | 06C5 | C004 | | CAI | 4 |
| 1515 | 06C6 | FEDD | | JMP | Z8 |
| 1516 | 06C7 | D900 088E | | IMS | SEGDMF |
| 1517 | 06C8 | 1100 088E | | LDA | *SEGLMF |
| 1518 | 06C9 | C003 | | CAI | 3 |
| 1519 | 06CA | FDD9 | | JMP | Z8 |

| | | | | | |
|---|---|---|---|---|---|
|1520|06CB|D900| |IMS|SEGDMF|
| | |088E| | | |
|1521|06CC|B100| |LDA|*SEGDMF|
| | |088E| | | |
|1522|06CD|C002| |CAI|2|
|1523|06CE|F205| |JMP|Z8|
|1524|06CF|D900| |IMS|SEGDMF|
| | |088E| | | |
|1525|06D0|B100| |LDA|*SEGDMF|
| | |088E| | | |
|1526|06D1|C001| |CAI|1|
|1527|06D2|F201| |JMP|Z8|
|1528|06D3|F63A| |JMP|D1|
|1529|06D4|B2F7|Z8|LDA|FDMFM|
|1530|06D5|82F7| |AND|FWRKG|
|1531|06D6|2104| |JAZ|$+5|
|1532|06D7|C001| |LAP|1|
|1533|06D8|9AF5| |STA|FFRN1|
|1534|06D9|0110| |ZAR| |
|1535|06DA|9AF2| |STA|FWRKG|
|1536|06DB|B100| |LDA|STATUS|
| | |07E6| | | |
|1537|06DC|9AF9| |STA|SAVBK|
|1538|06DD|C001| |CAI|1|
|1539|06DE|F206| |JMP|SECOND|
|1540|06DF|B100| |LDA|WORD|
| | |0808| | | |
|1541|06E0|A100| |IOR|FOR1|
| | |08B8| | | |
|1542|06E1|9900| |STA|WORD|
| | |0808| | | |
|1543|06E2|D900| |IMS|LOOK|
| | |085D| | | |
|1544|06E3|D900| |IMS|LOOK1|
| | |085E| | | |
|1545|06E4|F64B| |JMP|D1|
|1546|06E5|0000|SECOND|NOP| |
|1547|06E6|B100| |LDA|WORD|
| | |0808| | | |
|1548|06E7|A100| |IOR|FOR2|
| | |08B9| | | |
|1549|06E8|9900| |STA|WORD|
| | |0808| | | |
|1550|06E9|D900| |IMS|LOOK2|
| | |085F| | | |
|1551|06EA|D900| |IMS|LOOK|
| | |085D| | | |
|1552|06EB|F652| |JMP|D1|
|1553|06EC|0000|CONV|ENT| |
|1554|06ED|B100| |LDA|WORD|
| | |0808| | | |
|1555|06EE|13D0| |LRA|1|
|1556|06EF|9900| |STA|WORD|
| | |0808| | | |
|1557|06F0|3201| |JOR|$+2|
|1558|06F1|4L54| |SEL|:54|
|1559|06F2|F706| |RTN|CONV|
|1560|06F3|0000|PRINT|NOP| |
|1561|06F4|0C00| |DIN| |
|1562|06F5|B100| |LDA|IMCT11|
| | |07FF| | | |
|1563|06F6|D100| |CMS|IMCT12|

| | | | | | |
|---|---|---|---|---|---|
| 1564 | 06F7 | B166 0860 | | LDA | IMCTI2 |
| 1565 | 06F8 | 0000 | | NOF | |
| 1566 | 06F9 | 0000 | | NOF | |
| 1567 | 06FA | 0310 | | NAF | |
| 1568 | 06FB | 9AD9 | | STA | SIMFCT |
| 1569 | 06FC | E2F9 | | LDA | IMFE |
| 1570 | 06FD | 9AD4 | | STA | FMOIM |
| 1571 | 06FE | 8900 0821 | | ADD | JMF+1 |
| 1572 | 06FF | 9AD0 | | STA | FMOIMV |
| 1573 | 0700 | E2F6 | | LDA | IMFE1 |
| 1574 | 0701 | 9ACF | | STA | FMOIM1 |
| 1575 | 0702 | E2F5 | | LDA | IMFE2 |
| 1576 | 0703 | 9ACF | | STA | FMOIMD |
| 1577 | 0704 | E2D0 | | LDA | SIMFCT |
| 1578 | 0705 | 9AD8 | | STA | SSAVE |
| 1579 | 0706 | C708 | | LAM | 8 |
| 1580 | 0707 | 9AD5 | | STA | SSTOR |
| 1581 | 0708 | C70F | | LAM | 15 |
| 1582 | 0709 | 9ACA | | STA | STEMF |
| 1583 | 070A | B3C7 | FV | LDA | *FMOIM |
| 1584 | 070B | F900 88E6 | | JST | *ODEC |
| 1585 | 070C | 0004 | | DATA | 4 |
| 1586 | 070D | C6A0 | | LAF | :A0 |
| 1587 | 070E | F900 88E7 | | JST | *OTT |
| 1588 | 070F | DAC2 | | IMS | FMOIM |
| 1589 | 0710 | DACC | | IMS | SSTOR |
| 1590 | 0711 | F607 | | JMF | FV |
| 1591 | 0712 | FA4A | | JST | CRLF |
| 1592 | 0713 | C708 | | LAM | 8 |
| 1593 | 0714 | 9AC6 | | STA | SSTOR |
| 1594 | 0715 | DAC8 | | IMS | SSAVE |
| 1595 | 0716 | F60C | | JMF | FV |
| 1596 | 0717 | FA45 | | JST | CRLF |
| 1597 | 0718 | FA44 | | JST | CRLF |
| 1598 | 0719 | FA43 | | JST | CRLF |
| 1599 | 071A | E2EA | | LDA | SIMFCT |
| 1600 | 071B | 9AC2 | | STA | SSAVE |
| 1601 | 071C | C6A0 | FC | LAF | :A0 |
| 1602 | 071D | F900 88E7 | | JST | *OTT |
| 1603 | 071E | B3D1 | | LDA | *FMOIMV |
| 1604 | 071F | F900 88E6 | | JST | *ODEC |
| 1605 | 0720 | 0003 | | DATA | 3 |
| 1606 | 0721 | C6A0 | | LAF | :A0 |
| 1607 | 0722 | F900 88E7 | | JST | *OTT |
| 1608 | 0723 | DAAC | | IMS | FMOIMV |
| 1609 | 0724 | DAB8 | | IMS | SSTOR |
| 1610 | 0725 | F6E9 | | JMF | FC |
| 1611 | 0726 | FA36 | | JST | CRLF |
| 1612 | 0727 | C708 | | LAM | 8 |
| 1613 | 0728 | 9AB4 | | STA | SSTOR |
| 1614 | 0729 | DAB4 | | IMS | SSAVE |
| 1615 | 072A | F6EE | | JMF | FC |
| 1616 | 072B | FA31 | | JST | CRLF |
| 1617 | 072C | FA30 | | JST | CRLF |

| | | | | | |
|---|---|---|---|---|---|
| 1618 | 072D | FA2F | | JST | CHLF |
| 1619 | 072E | C704 | | LAM | 4 |
| 1620 | 072F | 9AAD | | STA | SSTOR |
| 1621 | 0730 | B2A4 | | LDA | SIMFCT |
| 1622 | 0731 | 9AAC | | STA | SSAVE |
| 1623 | 0732 | B39E | FD | LDA | *FM0IM1 |
| 1624 | 0733 | F900 | | JST | *ODEC |
| | | 88E6 | | | |
| 1625 | 0734 | 0004 | | DATA | 4 |
| 1626 | 0735 | C6A0 | | LAP | :A0 |
| 1627 | 0736 | F900 | | JST | *OTT |
| | | 88E7 | | | |
| 1628 | 0737 | DA99 | | IMS | FM0IM1 |
| 1629 | 0738 | DAA4 | | IMS | SSTOR |
| 1630 | 0739 | F6E7 | | JMP | FD |
| 1631 | 073A | C704 | | LAM | 4 |
| 1632 | 073B | 9AA1 | | STA | SSTOR |
| 1633 | 073C | B396 | FM | LDA | *FM0IMD |
| 1634 | 073D | F900 | | JST | *ODEC |
| | | 88E6 | | | |
| 1635 | 073E | 0004 | | DATA | 4 |
| 1636 | 073F | C6A0 | | LAP | :A0 |
| 1637 | 0740 | F900 | | JST | *OTT |
| | | 88E7 | | | |
| 1638 | 0741 | DA91 | | IMS | FM0IMD |
| 1639 | 0742 | DA9A | | IMS | SSTOR |
| 1640 | 0743 | F6E7 | | JMP | FM |
| 1641 | 0744 | FA18 | | JST | CHLF |
| 1642 | 0745 | C704 | | LAM | 4 |
| 1643 | 0746 | 9A96 | | STA | SSTOR |
| 1644 | 0747 | DA96 | | IMS | SSAVE |
| 1645 | 0748 | F616 | | JMP | FD |
| 1646 | 0749 | FA13 | | JST | CHLF |
| 1647 | 074A | FA12 | | JST | CHLF |
| 1648 | 074B | B289 | | LDA | SIMFCT |
| 1649 | 074C | 9A91 | | STA | SSAVE |
| 1650 | 074D | 1E51 | | ALA | 2 |
| 1651 | 074E | 8AB1 | | ADD | JMP |
| 1652 | 074F | 8A81 | | ADD | FM0IM1 |
| 1653 | 0750 | 9A80 | | STA | FM0IM1 |
| 1654 | 0751 | B283 | | LDA | SIMFCT |
| 1655 | 0752 | 1E51 | | ALA | 2 |
| 1656 | 0753 | 8ACC | | ADD | JMP |
| 1657 | 0754 | 8A7E | | ADD | FM0IMD |
| 1658 | 0755 | 9A7D | | STA | FM0IMD |
| 1659 | 0756 | DA7D | | IMS | STEMP |
| 1660 | 0757 | F625 | | JMP | FD |
| 1661 | 0758 | 0110 | | ZAR | |
| 1662 | 0759 | 9A74 | | STA | FFRNT |
| 1663 | 075A | 9A72 | | STA | FWKG |
| 1664 | 075B | 9A73 | | STA | FMEAN |
| 1665 | 075C | F100 | | JMP | BEG |
| | | 0119 | | | |
| 1666 | 075D | E8E6 | CHLF | ENT | |
| 1667 | 075E | C6BD | | LAP | :BD |
| 1668 | 075F | F900 | | JST | *OTT |
| | | 88E7 | | | |
| 1669 | 0760 | C6BA | | LAP | :BA |
| 1670 | 0761 | F900 | | JST | *OTT |
| | | 88E7 | | | |
| 1671 | 0762 | F7C5 | | RTN | CHLF |
| 1672 | 0763 | 08EB | STA | ENT | |

| | | | | | |
|---|---|---|---|---|---|
| 1673 | 0764 | B761 | | LDA | *SFA |
| 1674 | 0765 | DE02 | | IMS | SFA |
| 1675 | 0766 | 0310 | | NAR | |
| 1676 | 0767 | 9ADC | | STA | CNT |
| 1677 | 0768 | C6A0 | | LAP | ' ' |
| 1678 | 0769 | F900 88E7 | | JST | *OTT |
| 1679 | 076A | DAD9 | | IMS | CNT |
| 1680 | 076B | F603 | | JMP | $-3 |
| 1681 | 076C | F709 | | RTN | SFA |
| 1682 | 076D | 0C60 | FRNT | DIN | |
| 1683 | 076E | B25F | | LDA | FFRNT |
| 1684 | 076F | C001 | | CAI | 1 |
| 1685 | 0770 | DA5D | | IMS | FFRNT |
| 1686 | 0771 | B25D | | LDA | FMEAN |
| 1687 | 0772 | 2101 | | JAZ | $+2 |
| 1688 | 0773 | F680 | | JMP | FRINT |
| 1689 | 0774 | B100 08DF | | LDA | VOLCUR |
| 1690 | 0775 | 9A61 | | STA | SEVOLA |
| 1691 | 0776 | 8AA9 | | ADD | JMP |
| 1692 | 0777 | 9A60 | | STA | SECURA |
| 1693 | 0778 | B286 | | LDA | IMCTI1 |
| 1694 | 0779 | 9A61 | | STA | SIMCT1 |
| 1695 | 077A | B285 | | LDA | IMCTI2 |
| 1696 | 077B | 9A60 | | STA | SIMCT2 |
| 1697 | 077C | B259 | | LDA | SAVEK |
| 1698 | 077D | 9A5C | | STA | SAVEKA |
| 1699 | 077E | FE21 | | JST | CRLF |
| 1700 | 077F | FE22 | | JST | CRLF |
| 1701 | 0780 | B100 08EE | | LDA | IMFAR |
| 1702 | 0781 | 9A57 | | STA | SEIMFA |
| 1703 | 0782 | DA57 | | IMS | SAVEKA |
| 1704 | 0783 | B256 | | LDA | SAVEKA |
| 1705 | 0784 | F900 88E6 | | JST | *ODEC |
| 1706 | 0785 | 0001 | | DATA | 1 |
| 1707 | 0786 | FE29 | | JST | CRLF |
| 1708 | 0787 | B252 | | LDA | SAVEKA |
| 1709 | 0788 | C002 | | CAI | 2 |
| 1710 | 0789 | F804 | | JMI | FEK2 |
| 1711 | 078A | B250 | | LDA | SIMCT1 |
| 1712 | 078B | 0310 | | NAR | |
| 1713 | 078C | 9A51 | | STA | SSAVE |
| 1714 | 078D | F203 | | JMP | FFRA |
| 1715 | 078E | B24D | FEK2 | LDA | SIMCT2 |
| 1716 | 078F | 0310 | | NAR | |
| 1717 | 0790 | 9A4D | | STA | SSAVE |
| 1718 | 0791 | C704 | FFRA | LAM | 4 |
| 1719 | 0792 | 9A4A | | STA | SSTOR |
| 1720 | 0793 | B232 | TEE | LDA | FVC1 |
| 1721 | 0794 | A232 | | IOR | FVC2 |
| 1722 | 0795 | A232 | | IOR | FVCI1 |
| 1723 | 0796 | A232 | | IOR | FVCI2 |
| 1724 | 0797 | A234 | | IOR | FIMFM |
| 1725 | 0798 | 210F | | JAZ | TEE2 |
| 1726 | 0799 | B23D | TEE1 | LDA | *SEVOLA |
| 1727 | 079A | F900 88E6 | | JST | *ODEC |
| 1728 | 079B | 0003 | | DATA | 3 |
| 1729 | 079C | C6A0 | | LAP | :A0 |

| | | | | | |
|---|---|---|---|---|---|
| 1730 | 079D | F900 | | JST | *OTT |
| | | 88E7 | | | |
| 1731 | 079E | B339 | | LDA | *SECURA |
| 1732 | 079F | F900 | | JST | *ODEC |
| | | 88E6 | | | |
| 1733 | 07A0 | 0003 | | DATA | 3 |
| 1734 | 07A1 | C6A0 | | LAP | :A0 |
| 1735 | 07A2 | F900 | | JST | *OTT |
| | | 88E7 | | | |
| 1736 | 07A3 | DA33 | | IMS | SEVOLA |
| 1737 | 07A4 | DA33 | | IMS | SECURA |
| 1738 | 07A5 | DA37 | | IMS | SSTOR |
| 1739 | 07A6 | F60D | | JMP | TEE1 |
| 1740 | 07A7 | B220 | TEE2 | LDA | FVCI1 |
| 1741 | 07A8 | A220 | | IOR | FVCI2 |
| 1742 | 07A9 | A220 | | IOR | FIMP1 |
| 1743 | 07AA | A220 | | IOR | FIMP2 |
| 1744 | 07AB | A220 | | IOR | FLMPM |
| 1745 | 07AC | 3107 | | JAN | TEE3 |
| 1746 | 07AD | A218 | | IOR | FVC1 |
| 1747 | 07AE | A218 | | IOR | FVC2 |
| 1748 | 07AF | 310E | | JAN | TEE4 |
| 1749 | 07B0 | FE53 | | JST | CRLF |
| 1750 | 07B1 | 0110 | | ZAR | |
| 1751 | 07B2 | 9A1B | | STA | FPRNT |
| 1752 | 07B3 | F100 | | JMP | BEG |
| | | 01D9 | | | |
| 1753 | 07B4 | C704 | TEE3 | LAM | 4 |
| 1754 | 07B5 | 9A27 | | STA | SSTOR |
| 1755 | 07B6 | B322 | TEE5 | LDA | *SEIMPA |
| 1756 | 07B7 | F900 | | JST | *ODEC |
| | | 88E6 | | | |
| 1757 | 07B8 | 0004 | | DATA | 4 |
| 1758 | 07B9 | C6A0 | | LAP | :A0 |
| 1759 | 07BA | F900 | | JST | *OTT |
| | | 88E7 | | | |
| 1760 | 07BB | DA1D | | IMS | SEIMPA |
| 1761 | 07BC | DA20 | | IMS | SSTOR |
| 1762 | 07BD | F607 | | JMP | TEE5 |
| 1763 | 07BE | FE61 | TEE4 | JST | CRLF |
| 1764 | 07BF | DA1E | | IMS | SSAVE |
| 1765 | 07C0 | F62F | | JMP | FPRA |
| 1766 | 07C1 | 0110 | | ZAR | |
| 1767 | 07C2 | 9A0B | | STA | FPRNT |
| 1768 | 07C3 | F100 | | JMP | BEG |
| | | 01D9 | | | |
| 1769 | 07C4 | 0800 | | HLT | |
| 1770 | 07C5 | 0800 | ALPHA | HLT | |
| 1771 | 07C6 | 0000 | FVC1 | NOP | |
| 1772 | 07C7 | 0000 | FVC2 | NOP | |
| 1773 | 07C8 | 0000 | FVCI1 | NOP | |
| 1774 | 07C9 | 0000 | FVCI2 | NOP | |
| 1775 | 07CA | 0000 | FIMP1 | NOP | |
| 1776 | 07CB | 0000 | FIMP2 | NOP | |
| 1777 | 07CC | 0000 | FLMPM | NOP | |
| 1778 | 07CD | 0000 | FWRKG | NOP | |
| 1779 | 07CE | 0000 | FPRNT | NOP | |
| 1780 | 07CF | 0000 | FMEAN | NOP | |
| 1781 | 07D0 | 0000 | FMOIMV | NOP | |
| 1782 | 07D1 | 0000 | FMOIM1 | NOP | |
| 1783 | 07D2 | 0000 | FMOIM | NOP | |
| 1784 | 07D3 | 0000 | FMOIMP | NOP | |

| | | | | | |
|---|---|---|---|---|---|
| 1785 | 07D4 | 0000 | STEMP | NOP | |
| 1786 | 07D5 | 0000 | SIMCT | NOP | |
| 1787 | 07D6 | 0000 | SAVEK | NOP | |
| 1788 | 07D7 | 0000 | SEVOLA | NOP | |
| 1789 | 07D8 | 0000 | SECURA | NOP | |
| 1790 | 07D9 | 0000 | SEIMIA | NOP | |
| 1791 | 07DA | 0000 | SAVEKA | NOP | |
| 1792 | 07DB | 0000 | SIMCT1 | NOP | |
| 1793 | 07DC | 0000 | SIMCT2 | NOP | |
| 1794 | 07DD | 0000 | SSTOR | NOP | |
| 1795 | 07DE | 0000 | SSAVE | NOP | |
| 1796 | 07DF | 000E | EMSK | DATA | :E |
| 1797 | 07E0 | 0006 | K6 | DATA | 6 |
| 1798 | 07E1 | 0000 | SEEIMP | NOP | |
| 1799 | 07E2 | 0800 | MINUS | HLT | |
| 1800 | 07E3 | 0800 | SKIP | HLT | |
| 1801 | 07E4 | 0800 | POINT | HLT | |
| 1802 | 07E5 | 0800 | HOME | HLT | |
| 1803 | 07E6 | 0800 | STATUS | HLT | |
| 1804 | 07E7 | | HEAD | RES | 8 |
| 1805 | 07EF | 0800 | WHEEL | HLT | |
| 1806 | 07F0 | 0800 | WHEEL1 | HLT | |
| 1807 | 07F1 | 0800 | WHEEL2 | HLT | |
| 1808 | 07F2 | 0800 | NEGWL1 | HLT | |
| 1809 | 07F3 | 0800 | NEGWL2 | HLT | |
| 1810 | 07F4 | 0800 | IMPEK1 | HLT | |
| 1811 | 07F5 | 0800 | IMPEK2 | HLT | |
| 1812 | 07F6 | 0800 | IMPE | HLT | |
| 1813 | 07F7 | 0800 | IMPE1 | HLT | |
| 1814 | 07F8 | 0800 | IMPE2 | HLT | |
| 1815 | 07F9 | 0800 | LOIMV | HLT | |
| 1816 | 07FA | 0800 | LOIMD1 | HLT | |
| 1817 | 07FB | 0800 | LOIMD2 | HLT | |
| 1818 | 07FC | 0800 | LOIM1 | HLT | |
| 1819 | 07FD | 0800 | LOIMD | HLT | |
| 1820 | 07FE | 0800 | IMCTI | HLT | |
| 1821 | 07FF | 0000 | IMCTI1 | NOP | |
| 1822 | 0800 | 0000 | IMCTI2 | NOP | |
| 1823 | 0801 | 0800 | V | HLT | |
| 1824 | 0802 | 0000 | NOWELD | NOP | |
| 1825 | 0803 | 0800 | C | HLT | |
| 1826 | 0804 | 0800 | FINSH | HLT | |
| 1827 | 0805 | 0800 | SGNF | HLT | |
| 1828 | 0806 | 0800 | AUTO1 | HLT | |
| 1829 | 0807 | 0800 | AUTO2 | HLT | |
| 1830 | 0808 | 0000 | WOLD | NOP | |
| 1831 | 0809 | 0800 | ANLS | HLT | |
| 1832 | 080A | 0800 | AREG | HLT | |
| 1833 | 080B | 0800 | XREG | HLT | |
| 1834 | 080C | 0800 | LNK2 | HLT | |
| 1835 | 080D | 0800 | ASTOR | HLT | |
| 1836 | 080E | 0800 | XSTOR | HLT | |
| 1837 | 080F | 0800 | AREGS | HLT | |
| 1838 | 0810 | 0800 | XREGS | HLT | |
| 1839 | 0811 | 0800 | TEMPC | HLT | |
| 1840 | 0812 | 0800 | TEMP | HLT | |
| 1841 | 0813 | 0800 | FLAG | HLT | |
| 1842 | 0814 | 0800 | LOIM | HLT | |
| 1843 | 0815 | 0800 | LOIM2 | HLT | |
| 1844 | 0816 | 0800 | ONELS | HLT | |
| 1845 | 0817 | 0800 | ONELS1 | HLT | |
| 1846 | 0818 | 0800 | ONELS2 | HLT | |

| | | | | | |
|---|---|---|---|---|---|
| 1847 | 0819 | 0800 | NOIMP1 | HLT | |
| 1848 | 081A | 0800 | NOIMP2 | HLT | |
| 1849 | 081B | 0800 | SAMP1 | HLT | |
| 1850 | 081C | 0800 | SAMP2 | HLT | |
| 1851 | 081D | 0800 | SAMPL | HLT | |
| 1852 | 081E | 0800 | SAMPL1 | HLT | |
| 1853 | 081F | 0800 | SAMPL2 | HLT | |
| 1854 | 0820 | | JMP | RES | 2 |
| 1855 | 0822 | 0800 | HEADS | HLT | |
| 1856 | 0823 | 0800 | IMP | HLT | |
| 1857 | 0824 | 0800 | OV | HLT | |
| 1858 | 0825 | 0800 | NEGIMP | HLT | |
| 1859 | 0826 | 0800 | SAVE | HLT | |
| 1860 | 0827 | 0800 | STOR | HLT | |
| 1861 | 0828 | 0800 | MAXEK | HLT | |
| 1862 | 0829 | 0800 | BK1 | HLT | |
| 1863 | 082A | 0800 | BK2 | HLT | |
| 1864 | 082B | 0800 | MOIM | HLT | |
| 1865 | 082C | 0800 | MOIM1 | HLT | |
| 1866 | 082D | 0800 | MOIMV | HLT | |
| 1867 | 082E | 0800 | STEP | HLT | |
| 1868 | 082F | 0800 | BIGER | HLT | |
| 1869 | 0830 | 0800 | SAMP | HLT | |
| 1870 | 0831 | 0800 | MOIMD | HLT | |
| 1871 | 0832 | 0800 | NOIM12 | HLT | |
| 1872 | 0833 | 0800 | NOIM | HLT | |
| 1873 | 0834 | 0800 | HD | HLT | |
| 1874 | 0835 | 0800 | IMPLES | HLT | |
| 1875 | 0836 | 0800 | NOIMV | HLT | |
| 1876 | 0837 | 0800 | NOIMM | HLT | |
| 1877 | 0838 | 0800 | NOIMS | HLT | |
| 1878 | 0839 | 0800 | MEAN | HLT | |
| 1879 | 083A | 0800 | SIGMA1 | HLT | |
| 1880 | 083B | 0800 | SIGMA2 | HLT | |
| 1881 | 083C | 0800 | HIGH | HLT | |
| 1882 | 083D | 0800 | LOW | HLT | |
| 1883 | 083E | 0800 | FROMH | HLT | |
| 1884 | 083F | 0800 | FROML | HLT | |
| 1885 | 0840 | 0800 | VAR | HLT | |
| 1886 | 0841 | 0800 | EJ | HLT | |
| 1887 | 0842 | 0800 | DIV | HLT | |
| 1888 | 0843 | 0800 | OFF | HLT | |
| 1889 | 0844 | 0800 | CNT | HLT | |
| 1890 | 0845 | 0800 | RIP | HLT | |
| 1891 | 0846 | 0800 | MIN | HLT | |
| 1892 | 0847 | 0800 | DEC | HLT | |
| 1893 | 0848 | | COUNT | RES | 4 |
| 1894 | 084C | 0800 | MANY | HLT | |
| 1895 | 084D | | BEFOR | RES | 4 |
| 1896 | 0851 | 0800 | FAST | HLT | |
| 1897 | 0852 | | SECCE | RES | 4 |
| 1898 | 0856 | 0800 | WINCE | HLT | |
| 1899 | 0857 | 0800 | MAX | HLT | |
| 1900 | 0858 | 0800 | MAXI | HLT | |
| 1901 | 0859 | 0800 | NAROW | HLT | |
| 1902 | 085A | 0800 | PCT | HLT | |
| 1903 | 085B | 0800 | COOL | HLT | |
| 1904 | 085C | 0800 | COOL1 | HLT | |
| 1905 | 085D | 0800 | LOOK | HLT | |
| 1906 | 085E | 0800 | LOOK1 | HLT | |
| 1907 | 085F | 0800 | LOOK2 | HLT | |
| 1908 | 0860 | 0800 | LEAL | HLT | |

```
1909  0861  0800  FAULT  HLT
1910  0862  0800  CHT    HLT
1911  0863  0800  EJCT   HLT
1912  0864  0800  DUMPST HLT
1913  0865  0800  SEEVOL HLT
1914  0866  0800  SEECON HLT
1915  0867        EIGHT  RES   16
1916  0877  0800  WIRED1 HLT
1917  0878  0800  WIRED2 HLT
1918  0879  0800  TIP    HLT
1919  087A  0800  BURNE2 HLT
1920  087B  0800  BURNE1 HLT
1921  087C        FAT    RES   8
1922  0884  0800  BURN   HLT
1923  0885  0800  BUT    HLT
1924  0886  0800  SHORT  HLT
1925  0887  0800  REAL1  HLT
1926  0888  0800  ONLY   HLT
1927  0889  0800  AA     HLT
1928  088A        TIE    RES   4
1929  088E  0800  SEGMF  HLT
1930  088F  0800  RJSUMH HLT
1931  0890  0800  RJSUML HLT
1932  0891  0800  HOLD   HLT
1933  0892  0800  NOCOR  HLT
1934  0893  0800  WIFEH  HLT
1935  0894  0800  WIFEL  HLT
1936  0895  0800  CNTL   HLT
1937  0896  0800  CNTH   HLT
1938  0897        C1     RES   4
1939  089B        C2     RES   4
1940  089F        C3     RES   4
1941  08A3        C4     RES   4
1942  08A7        C5     RES   4
1943  08AB        C6     RES   4
1944  08AF        C7     RES   4
1945  08E3  087C  ONLITE DATA FAT
1946  08E4  0867  WIRE   DATA EIGHT
1947  08E5  0852  SINCE  DATA SEGCE
1948  08E6  084D  LAST   DATA DEFOR
1949  08E7  0848  CARY   DATA CURNT
1950  08E8  0040  FOR1   DATA :0040
1951  08E9  0001  FOR2   DATA :0001
1952  08EA  000F  STRIP  DATA :000F
1953  08EB  0004  FOUR   DATA :4
1954  08EC  0014  TOSMAL DATA :0014
1955  08ED  0064  TOBIG  DATA :0064
1956  08EE  0200  OFFSET DATA :0200
1957  08EF  07E7  PROC   DATA READ
1958  08C0  08C1  A      DATA A1
1959  08C1  4011  A1     DATA :4011
1960  08C2  4012         DATA :4012
1961  08C3  4013         DATA :4013
1962  08C4  4014         DATA :4014
1963  08C5  4015         DATA :4015
1964  08C6  4016         DATA :4016
1965  08C7  4017         DATA :4017
1966  08C8  4018         DATA :4018
1967  08C9  0800  DD     HLT
1968  08CA  08CB  B      DATA B1
1969  08CB  0811  B1     DATA :0811,:0812,:0813
      08CC  0812
```

```
             08CD   6813
    1970     08CE   6814            DATA  :6814,:6815,:6816
             08CF   6815
             08D0   6816
    1971     08D1   6817            DATA  :6817,:6818
             08D2   6818
    1972     08D3   0897    SETH    DATA  01
    1973     08D4   089B    SETL    DATA  02
    1974     08D5   089F    SETCH   DATA  03
    1975     08D6   08A3    SETCL   DATA  04
    1976     08D7   0008    DOWN    DATA  :0008
    1977     08D8   088A    CUMDMP  DATA  11E
    1978     08D9   08A7    SETHJH  DATA  05
    1979     08DA   08AB    SETHJL  DATA  06
    1980     08DB   08AF    NOSTOT  DATA  07
    1981     08DC           AVERG   REF
    1982     08DD           VALUE1  REF
    1983     08DE           VALUE2  REF
    1984     08DF           VOLCUR  REF
    1985     08E0           IMPAR   REF
    1986     08E1           REWITE  REF
    1987     08E2           PTRIN   REF
    1988     08E3           UFDIV:  REF
    1989     08E4           SQRT    REF
    1990     08E5           MPYS:   REF
    1991     08E6           ODEC    REF
    1992     08E7           OTT     REF
    1993                            END
0000 ERRORS
```

| | | | | | | | |
|---|---|---|---|---|---|---|---|
| AA | 0889 | AB | 0269 | ACCUM | 045B | AC | 021B |
| ADC | 0224 | ALARM | 0636 | ALL | 04BF | ALPHA | 07C5 |
| ANAL | 042E | ANLS | 0809 | AN1 | 0440 | AREGS | 080F |
| AREG | 080A | ASTOR | 080D | AS | 0647 | AUT01 | 0806 |
| AUT02 | 0807 | AVERG | 08DC | A | 08C0 | A1 | 08C1 |
| BADVOL | 0252 | BANK2 | 020E | BAN2 | 0386 | BB | 08C9 |
| BEFOR | 084D X | BEG | 01D9 | BIGER | 082F | BK1 | 0829 |
| BK2 | 082A | BMSK | 07DF | BNK2 | 080C | BS | 05ED |
| BURNB1 | 087B | BURNB2 | 087A | BURN | 0884 | BUT | 0885 |
| B | 08CA | B1 | 08CB | B5 | 05E5 | CALC | 04FC |
| CARY | 08B7 | CA | 0526 | CC | 051B | CHT | 0862 |
| CNTH | 0896 | CNTL | 0895 | CNT | 0844 | COLEC | 023B |
| CONV | 06EC | COOLOF | 05E0 | COOL | 085B | COOL1 | 085C |
| COPARE | 0110 | COPLOP | 0113 | CORECT | 0649 | CRLF | 075D |
| CUMDMP | 08D8 | CURNT | 0848 | CYL | 06C4 | C | 08C3 |
| DATCON | 014C | DATC1 | 0148 | DEC | 0847 | DEPART | 04FB |
| DIFSQR | 0474 | DIV | 0842 | DONE | 03B8 | DOWN | 08D7 |
| DO | 0590 | DUMPST | 0864 | DUMP | 0655 | D0 | 068E |
| D1 | 0699 | D2A | 065F | D2 | 065A | D3 | 0663 |
| D4 | 0670 | D5 | 0680 | D8 | 06C1 | EAT | 087C |
| EBK1 | 0316 | EBK2 | 030F | EIGHT | 0867 | EJCT | 0863 |
| ERROR1 | 02A2 | ERROR2 | 02A8 | EXIT | 0654 | FAULT | 0861 |
| FBK2 | 078E | FDMPM | 07CC | FILE | 046E | FIMP1 | 07CA |
| FIMP2 | 07CB | FINSH | 0804 | FIRST | 04B4 | FLAG | 0813 |
| FMEAN | 07CF | FMOIMD | 07D3 | FMOIMV | 07D0 | FMOIM | 07D2 |
| FMOIM1 | 07D1 | FOR1 | 08B8 | FOR2 | 08B9 | FOUR | 08BB |
| FPRA | 0791 | FPRNT | 07CE | FPRST | 031D | FROMH | 083E |
| FROML | 083F | FRSET | 0346 | FSETA | 0324 | FSET | 0308 |
| FSKFA | 0350 | FSKP | 034A | FVC11 | 07C8 | FVC12 | 07C9 |
| FVC1 | 07C6 | FVC2 | 07C7 | FWRKG | 07CD | GATHER | 022E |
| GETOUT | 0412 | HA | 05A8 | HD | 0834 | HEADS | 0822 |
| HIGH | 083C | HIT | 0596 | HOLD | 0891 | HOME | 07E5 |
| HOP | 05DC | HOTAUT | 05F5 | IMCT1 | 07FE | IMCT11 | 07FF |
| IMCT12 | 0800 | IMPAR | 08E0 | IMPBK1 | 07F4 | IMPBK2 | 07F5 |
| IMPE | 07F6 | IMPE1 | 07F7 | IMPE2 | 07F8 | IMPLES | 0835 |

| | | | | | | | |
|---|---|---|---|---|---|---|---|
| IMF | 0823 | IM | 0579 | INT | 01F2 | IN | 05AD |
| JMI | 0820 | K1 | 036B | K2 | 039D | K6 | 07E0 |
| LAST | 08F6 | LCTL1 | 0149 | LEAVE | 0220 | LOIMD | 07FD |
| LOIMD1 | 07FA | LOIMD2 | 07FB | LOIMV | 07F9 | LOIM | 0814 |
| LOIM1 | 07FC | LOIM2 | 0815 | LOOK | 085D | LOOK1 | 085E |
| LOOK2 | 085F | LOW | 083D | LO | 05CE | MARY | 084C |
| MAXPK | 0828 | MAXI | 0858 | MAX | 0857 | MEANFL | 04A1 |
| MEAN | 0839 | MINUS | 07E2 | MIN | 0846 | MOIMD | 0831 |
| MOIMV | 082D | MOIM | 082E | MOIM1 | 082C | MOV | 0534 |
| MYS: | 08F5 | NALOW | 0859 | NEGIMF | 0825 | NEGVL1 | 07F2 |
| NEGVL2 | 07F3 | NEWV | 0159 | NOCOR | 0892 | NOIMM | 0837 |
| NOIMI1 | 0819 | NOIMI2 | 081A | NOIMS | 0838 | NOIMV | 0836 |
| NOIM | 0833 | NOIM12 | 0832 | NOSFO1 | 08DD | NOWELD | 0802 |
| ODEC | 08F6 | OFFSET | 08BE | OFF | 0843 | OKPRO1 | 0264 |
| OKPRO2 | 02D6 | OLIN | 01FD | ONELS | 0816 | ONELS1 | 0817 |
| ONELS2 | 0818 | ONLITE | 08F3 | ONLY | 0868 | ON | 08E7 |
| OUT | 062D | OV | 0824 | PAST | 0851 | PC1 | 085A |
| PF | 0732 | PFAIL | 014D | PM | 073C | POINT | 07E4 |
| POF | 04F2 | PO | 071C | POINT | 06F3 | PNT | 076D |
| PROC | 08BF | PTRTN | 08E2 | PUSHR | 069A | PUSHL | 06AE |
| PUTT | 0573 | PUT | 0019 | P | 070A | P1 | 0897 |
| Q2 | 089B | Q3 | 089F | Q4 | 08A3 | Q5 | 08A7 |
| Q6 | 08AB | Q7 | 08AF | RC11 | 0130 | READ | 07E7 |
| REAL | 0860 | REAL1 | 0887 | RECOPY | 012A | REJCT | 05L7 |
| RERITE | 08E1 | RESET | 01F6 | RFTIN | 0503 |
| REWRIT | 011A | RE1 | 0123 | RF | 0845 | RJSOMH | 088F |
| RJSJML | 0090 | RJ | 0041 | RLOAD1 | 0822 | RLOAD2 | 0021 |
| RLOAD3 | 0022 | RLOAD4 | 0023 | RLOAD5 | 0824 | RLOAD6 | 0025 |
| ROOT | 0489 | RSL1 | 0157 | RSL5 | 0158 | R4 | 03D3 |
| R7 | 0411 | R8 | 0405 | SAMPL | 081D | SAMPL1 | 081E |
| SAMPL2 | 081F | SAMP | 0830 | SAMP1 | 081B | SAMP2 | 081C |
| SAVPKA | 07DA | SAVPK | 07D6 | SAVE | 0826 | SECOND | 06E5 |
| SECURA | 07D8 | SECUR | 0866 | SEEIMF | 07E1 | SEEVOL | 0865 |
| SEIMFA | 07D9 | SEGCE | 0852 | SEGLMD | 088E | SEG | 055E |
| SETANL | 0416 | SETCH | 08D5 | SETCL | 08D6 | SETH | 08D3 |
| SETL | 08D4 | SETTOH | 08D9 | SETRJL | 08DA | SEVOLA | 07D7 |
| SGNF | 0865 | SHORT | 0886 | SIGMA1 | 083A | SIGMA2 | 083B |
| SIMCT1 | 07DB | SIMCT2 | 07DC | SIMPCT | 07D5 | SINCE | 08E5 |
| SKIPF | 0139 | SKI1 | 07E3 | SPA | 0763 | SQRT | 08E4 |
| SSAVE | 07DE | SSA2 | 0147 | SSTOR | 07DD | STATUS | 07E6 |
| STAT1 | 0615 | STCON | 014B | STLMF | 07L4 | STEP | 082E |
| STOF | 05DD | STORAG | 014A | STOR | 0827 | STRIF | 08BA |
| S1 | 0551 | S5 | 0556 | TEE | 0793 | TEE1 | 0799 |
| TEE2 | 07A7 | TEE3 | 07E4 | TEE4 | 07DE | TEE5 | 07E6 |
| TEMIC | 0811 | TEMF | 0812 | TIE | 088A | TIF | 0879 |
| TOEIC | 08DD | TOSMAL | 081C | TO | 01E7 | UFDIV: | 08E3 |
| VALUE1 | 08DD | VALUE2 | 08DE | VALNCE | 0472 | VAR | 084E |
| VOLCOR | 08DF | V | 0801 | WADR | 0142 | WHEEL | 07EF |
| WHEEL1 | 07F0 | WHEEL2 | 07F1 | WINCE | 0856 | WIRR | 0893 |
| WIFEL | 0894 | WIREB1 | 0877 | WIREB2 | 0878 | WIRE | 08E4 |
| WLENG1 | 0143 | WLENG2 | 0144 | WLENG3 | 0145 | WORD | 0808 |
| WST2 | 0146 | XREGS | 0816 | XREG | 080B | XSTOR | 080F |
| ZAP | 0568 | Z8 | 06D4 | | | | |

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

I claim:

1. In combination, a welding control system and a pulse type welder wherein pulsed energy is fed from a source of varying voltage to a welding load during a weld period, the control system including sensing means for sensing the voltage and current flowing in the load, the improvement comprising means for generating a standard impedance characteristic from a first set of voltage and current values sensed by the sensing means and storing said characteristic, generating means for generating a subsequent impedance characteristic of the load from subsequently sensed voltage and current values sensed by the sensing means, means for comparing said subsequent and said standard impedance characteristic and altering the pulses of energy to the load in response to said comparison, interface means connected to the sensing means and the generating means for feeding the sensed voltage and current signals to the generating means, a signal generation circuit which generates a signal indicative of the start of the weld period, and a peak detector means connected to the sensing means for sensing a peak characteristic of at least one of the voltage and current and controlling the feeding of the voltage and current signals to the generating means, said peak detector means including a timing circuit and a clock circuit for generating a plurality of pulses which are counted by said timing circuit to time a period from the start of the weld period to an assumed peak, said timing circuit including a presettable counter circuit that is connected to said clock circuit and adapted to be preset to a predetermined number in response to said start of weld period signal, said clock circuit altering said counter to time out said counter upon counting a preselected number of pulses from said clock circuit.

2. The improvement of claim 1 wherein said presettable counter has a maximum count to which it can be incremented, said predetermined number of counts to which said presettable counter is preset, when added to the number of counts to be counted during said timing period, will be equal to said maximum number of counts.

3. In combination, a welding control system and a pulse welder having a welding cycle including heat portions and cool portions, the pulse welder including at least one welding head, a source of welding pulses, a standard control circuit connected between the source and the welding head for controlling the application of alternate of the heat and cool portions to a welding load by controlling the number of welding pulses fed to the load during the heat portion and the duration of the cool portion, the standard control circuit including means for generating a series of clock pulses for controlling the duration of the heat and cool portions of the welding cycle of the load by counting a preselected number of clock pulses in the heat and cool portions of the cycle, and means connected to the standard control circuit for altering the duration of the heat and/or cool portions of the cycle counted by the standard control, the improvement comprising start means for sensing the start of a heat portion and generating a start signal indicatative thereof, sensing means for sensing a first set of voltage and current characteristics flowing in the load during a heat portion, means for generating a standard impedance characteristic from said sensed first set of voltage and current characteristics flowing in the load and storing said standard characteristic, an interface circuit connected to the current and voltage sensing means and said impedance characteristic generating means for feeding the voltage and current signals to said impedance characteristic generating means, said sensing means sensing a second set of voltage and current characteristics flowing in the load during another heat portion, said generating means generating a second impedance characteristic from said second set for each welding pulse of said another heat portion, means for comparing said second impedance characteristics of each welding pulse with the standard impedance characteristic and generating an altering signal in response to the generated standard characteristics, said altering signal generating means connected to the standard control for altering the heat and/or cool portions of the welding cycle to maintain said second impedance characteristic within limits of said standard characteristic, and peak detector means for detecting a peak characteristic of at least one of said voltage and current and controlling the time of generation of said sensed voltage characteristic and sensed current characteristic in response to the detection of said peak characteristic, said peak detector means including a timing circuit and a clock circuit for generating a plurality of pulses which are counted by said timing circuit to time a period from the start of a heat portion to an assumed peak, said timing circuit including a presettable counter circuit that is connected to said clock circuit and adapted to be preset to a predetermined number in response to said start signal, said clock circuit altering said counter to time out said counter upon counting a preselected number of pulses from said clock circuit.

4. The improvement of claim 3 wherein said presettable counter has a maximum count to which it can be incremented, said predetermined number of counts to which said presettable counter is preset, when added to the number of counts to be counted during said timing period, will be equal to said maximum number of counts.

5. The improvement of calim 4 further including an end of weld generation circuit for generating an end of weld signal indicative of the end of the heat portion, said welding system providing welding pulses between said start signal and said end of weld signal.

6. The improvement of claim 5 wherein said end of weld signal is fed to said altering signal generating means to terminate the altering of said heat and/or cool portions.

7. The improvement of claim 6 wherein said end of weld generation circuit is fed said start signal, the termination of said start signal generating said end of weld signal.

8. The improvement of claim 7 wherein said start signal is a transition of a signal level from one level to another, said signal remaining at said another level during the heat portion of the weld and forming a weld signal.

9. The improvement of claim 8 wherein said end of weld signal generation circuit includes a trigger circuit responsive to a transitional edge of said weld signal, the transition from said another level to said one level generating said end of weld signal.

10. The improvement of claim 3 wherein said voltage and current characteristics flowing in the load are analog signals, the system further including an analog-to-digital converter circuit for converting said analog signal to digital signals.

11. The improvement of claim 10 wherein said analog-to-digital converter circuit includes first and second operational amplifiers connected to the welding load, said operational amplifiers generating an output signal in response to the magnitude of current flowing in the welding load.

12. The improvement of claim 11 wherein said analog-to-digital converter circuit is common to both said operational amplifiers, one of said operational amplifiers sensing the current flowing in the load and the other of said operational amplifiers sensing the voltage flowing in the load.

13. The improvement of claim 12 wherein said converter circuit includes a plurality of inputs, said converter circuit being adapted to be switched to convert any one of said inputs at the input circuits to said digital signals, said digital signals having a plurality of bits.

14. The improvement of claim 13 wherein said current sensing operational amplifier is connected to one of said input circuits and said voltage sensing operational amplifier is connected to another of said circuits, said converter circuit being adapted to be switched between said current input and said voltage input circuits.

15. The improvement of claim 14 wherein the output of said converter circuit is connected to a plurality of shift registers, the number of shift registers corresponding to the number of bits generated in said digital signal.

16. The improvement of claim 15 wherein said shift registers and said output of the converter circuit are common to both said current sensing and said voltage sensing operational amplifiers, said converter circuit being switched to provide one of said current and voltage signals and then switch to provide the other of said current and voltage signals.

17. The improvement of calim 16 wherein said welding system includes a computer for providing said impedance characteristic, said converter circuit and said shift register providing said computer with digital current and voltage signals to provide means for generating said impedance characteristic.

18. The improvement of claim 17 wherein said data is stored in said shift register upon sensing said current and voltage data, said computer generating a transmit data signal for outputting data from said shift registers to said computer.

* * * * *